United States Patent
Lee et al.

(10) Patent No.: US 9,840,010 B2
(45) Date of Patent: Dec. 12, 2017

(54) TOOL CHANGER

(71) Applicant: The Boeing Company, Chicago, IL (US)

(72) Inventors: Tristan E. Lee, Seattle, WA (US); David M. Foisy, Bellevue, WA (US)

(73) Assignee: THE BOEING COMPANY, Chicago, IL (US)

( * ) Notice: Subject to any disclaimer, the term of this patent is extended or adjusted under 35 U.S.C. 154(b) by 394 days.

(21) Appl. No.: 14/600,275

(22) Filed: Jan. 20, 2015

(65) Prior Publication Data
US 2016/0207202 A1 Jul. 21, 2016

(51) Int. Cl.
*B25J 15/04* (2006.01)
*B25J 15/00* (2006.01)
*B23Q 3/157* (2006.01)
*G05B 19/4093* (2006.01)
*B64F 5/10* (2017.01)

(52) U.S. Cl.
CPC ...... *B25J 15/0491* (2013.01); *B23Q 3/15713* (2013.01); *B25J 15/0057* (2013.01); *G05B 19/40938* (2013.01); *B64F 5/10* (2017.01); *G05B 2219/39057* (2013.01); *G05B 2219/39468* (2013.01); *Y02P 90/265* (2015.11); *Y10S 901/01* (2013.01); *Y10S 901/30* (2013.01); *Y10S 901/47* (2013.01)

(58) Field of Classification Search
CPC ............... B25J 15/0491; B25J 15/0028; B25J 15/0066; B25J 15/04; B25J 15/0433; B25J 15/0057; B25J 19/021; B25J 19/023; B23Q 3/15713; B23Q 3/155; G05B 19/40938; Y10S 901/01; Y10S 901/30; Y10S 901/31; Y10S 901/41; Y10S 901/47
See application file for complete search history.

(56) References Cited

U.S. PATENT DOCUMENTS

| | | | | |
|---|---|---|---|---|
| 4,685,850 A | * | 8/1987 | Ohta et al. ........... | B25J 15/0491 198/465.1 |
| 2010/0173762 A1 | * | 7/2010 | T llmann et al. ..... | B23Q 3/1554 483/44 |
| 2012/0014759 A1 | * | 1/2012 | Sarh et al. ........... | B62D 57/024 408/76 |

(Continued)

OTHER PUBLICATIONS

Day et al., "Crawler Robot and Supporting Platform," U.S. Appl. No. 14/558,850, filed Dec. 3, 2014, 78 pages.

(Continued)

*Primary Examiner* — Dennis M Butler
(74) *Attorney, Agent, or Firm* — Yee & Associates, P.C.

(57) ABSTRACT

A system, method, and apparatus for changing a set of old tools for a set of new tools may be presented. The system may comprise a crawler robot, a robotic arm, a tool changer, a vision system, and at least one of a tool rack or a storage area. The tool changer may be an end effector of the robotic arm. The tool changer may comprise a number of grippers and a number of movement assemblies. The number of grippers may perform at least one of moving a set of new tools to the crawler robot or removing the set of old tools from the crawler robot. The number of movement assemblies may be associated with the number of grippers. The vision system may be associated with at least one of the robotic arm and the tool changer.

28 Claims, 52 Drawing Sheets

(56) References Cited

U.S. PATENT DOCUMENTS

| | | | | |
|---|---|---|---|---|
| 2013/0158697 A1* | 6/2013 | Stone et al. | .......... | B64F 5/0036 700/114 |
| 2015/0018179 A1* | 1/2015 | Scheffler | ............ | B23Q 3/15513 483/1 |
| 2016/0039059 A1* | 2/2016 | Takla et al. | ........ | B23Q 3/15506 700/179 |

OTHER PUBLICATIONS

Reid et al., "System and Method for Positioning an Automated Assembly Tool Relative to a Structure," U.S. Appl. No. 14/558,853, filed Dec. 3, 2014, 128 pages.
Reid et al., "Mobile Automated Assembly Tool for Aircraft Structures," U.S. Appl. No. 14/558,859, filed Dec. 3, 2014, 76 pages.
Day et al., "Flexible Manufacturing System for Aircraft Structures," U.S. Appl. No. 14/558,867, filed Dec. 3, 2014, 153 pages.
Stepan, "Systems and Methods for Delivery of Devices Along a Transport Path," U.S. Appl. No. 13/925,488, filed Jun. 24, 2013, 31 pages.
Larson et al., "Modular Stanchion System," U.S. Appl. No. 14/265,946, filed Apr. 30, 2014, 34 pages.

\* cited by examiner

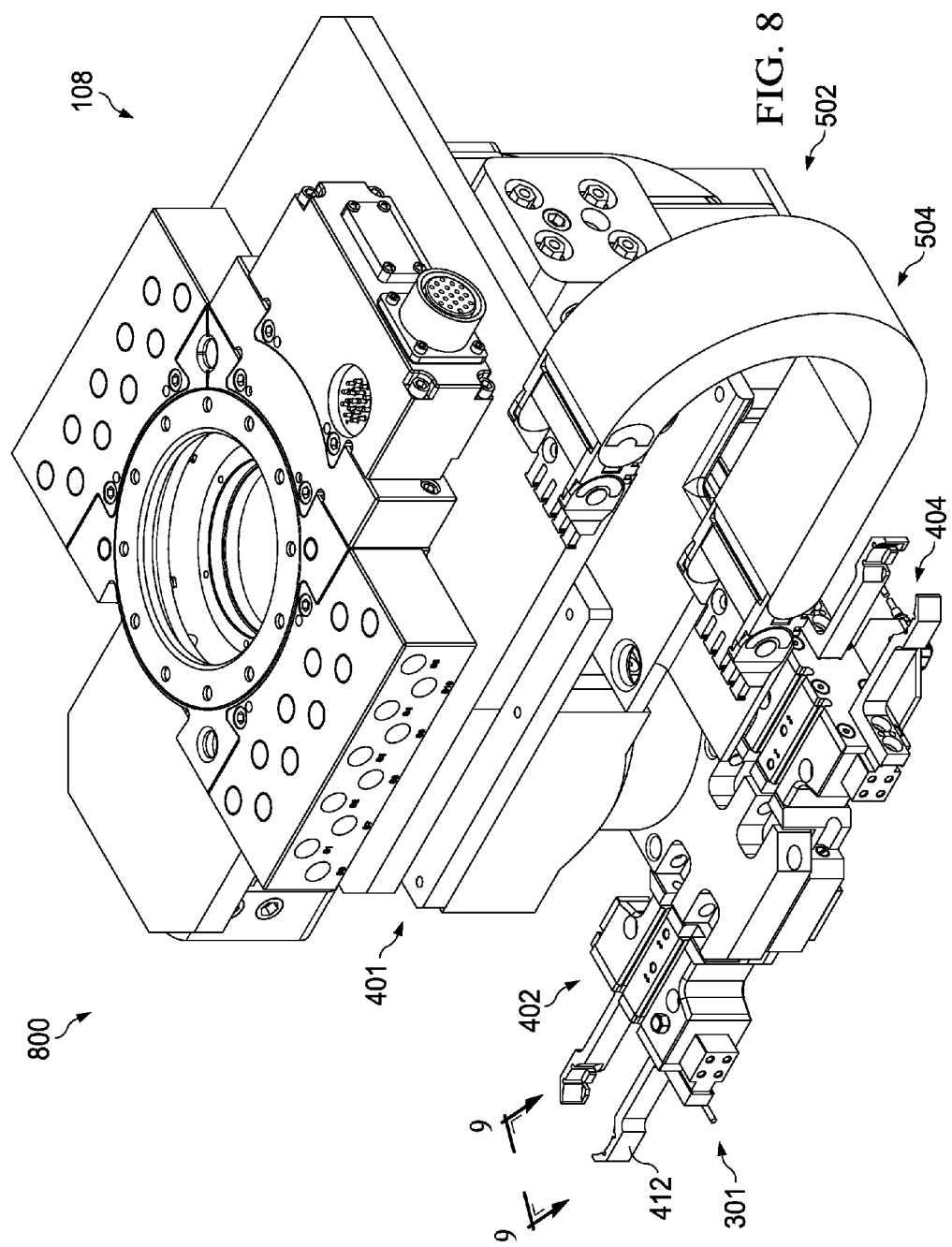

TOOL CHANGER

BACKGROUND INFORMATION

1. Field

The present disclosure generally relates to manufacturing and, in particular, to the manufacturing of structures using robots. Still more particularly, the present disclosure relates to a method and apparatus for exchanging tools in a robot.

2. Background

Manufacturing aircraft structures may be a complex and time-consuming process. Thousands of parts may be designed and assembled to complete an aircraft structure. Further, aircraft structures may be of considerable size.

Human operators may perform operations on an aircraft structure. For instance, human operators may perform operations such as drilling, fastening, coating, and inspecting, among others. Countless labor hours are needed for human operators to assemble and inspect the aircraft structure. Further, due to the size of an aircraft structure, human operators may have limited access to areas of the aircraft structure. Yet further, performing operations by human operators may increase the time, complexity, and cost of assembling the aircraft more than desired.

As a result, robots may be used to perform some operations. Manufacturing aircraft structures may include operations performed by robots traveling across a surface of an aircraft structure. For example, a robot may travel across a surface of an aircraft wing to drill, fasten, coat, inspect, or perform another desirable operation on the surface of an aircraft structure. A robot may use a set of tools to perform operations on the surface of the aircraft structure. The set of tools may be interchangeable. As a result, a set of tools may be exchanged for a set of new tools prior to performing an operation.

Currently, to exchange a set of tools, a human operator must remove a set of old tools and insert a set of new tools. At least one of the human operator and the robot must move towards the other so that the human operator may exchange the set of tools. Using human operators to exchange a set of tools may increase the time, complexity, or cost of assembling the aircraft more than desired. Further, using a human operator to exchange a set of tools may not be ergonomically desirable. For example, a human operator may have to climb onto an aircraft wing if the robot is present on the aircraft wing.

Therefore, it would be desirable to have a method and apparatus that take into account at least some of the issues discussed above, as well as other possible issues. Specifically, one issue may be to find a method and apparatus for exchanging a set of old tools for a set of new tools.

SUMMARY

An illustrative embodiment of the present disclosure may provide a system. The system may comprise a crawler robot, a robotic arm, a tool changer, a vision system, and at least one of a tool rack or a storage area. The tool changer may be an end effector of the robotic arm. The tool changer may comprise a number of grippers and a number of movement assemblies. The number of grippers may perform at least one of moving a set of new tools to the crawler robot or removing a set of old tools from the crawler robot. The number of movement assemblies may be associated with the number of grippers. The vision system may be associated with at least one of the robotic arm and the tool changer.

Another illustrative embodiment of the present disclosure may provide a method of changing a set of old tools for a set of new tools. The method may comprise moving a tool changer to a location relative to a crawler robot. The method may also initiate a frame adjustment routine. The method may further move the tool changer to an adjusted frame from the frame adjustment routine. The method may also determine an operating location. The method may further move the tool changer to the operating location. The method may also transfer at least one of a set of new tools or a set of old tools between the tool changer and the crawler robot at the operating location.

A further illustrative embodiment of the present disclosure may provide a tool changer. The tool changer may comprise a number of grippers and a number of movement assemblies associated with the number of grippers. The number of movement assemblies may be configured to move the number of grippers relative to the crawler robot.

Another illustrative embodiment of the present disclosure may provide a method of changing a set of old tools for a set of new tools. The method may comprise taking a set of new tools from a tool rack or storage area using a tool changer. The method may also move the set of new tools towards a crawler robot using the tool changer. The method may further remove the set of old tools from the crawler robot using the tool changer. The method may also insert the set of new tools into the crawler robot.

Yet another illustrative embodiment of the present disclosure may provide an apparatus. The apparatus may comprise a base, a sliding section, a rotating section, a first set of grippers, and a second set of grippers. The sliding section may be moveably connected to the base and slidable relative to the base. The rotating section may be moveably connected to the sliding section and rotatable relative to the base. The first set of grippers may be associated with the rotating section, and the first set of grippers may remove a set of old tools from a crawler robot. The first set of grippers may comprise a first gripper, a second gripper, and a first distance separating the first gripper and the second gripper. The second set of grippers may be associated with the rotating section and facing about 180 degrees from the first set of grippers. The second set of grippers may insert a set of new tools into the crawler robot. The second set of grippers may comprise a third gripper, a fourth gripper, and a second distance separating the third gripper and the fourth gripper. The first distance and the second distance may be substantially the same.

A further illustrative embodiment of the present disclosure may provide a method of changing a set of old tools for a set of new tools. The method may comprise taking the set of new tools from a tool rack or storage area using a second set of grippers of a tool changer. The method also may move the tool changer to a position relative to a crawler robot. The method further may move a sliding section of the tool changer towards the set of old tools on the crawler robot after moving the tool changer to the position relative to the crawler robot. A rotating section of the tool changer may be associated with the sliding section. The method may also remove the set of old tools from the crawler robot with a first set of grippers associated with the rotating section. The method may further rotate the rotating section such that the second set of grippers holding the set of new tools are in a position for installing the set of new tools on the crawler robot. The method may also insert the set of new tools into the crawler robot.

A yet further illustrative embodiment of the present disclosure may provide an apparatus. The apparatus may comprise a rotating section, a first set of grippers, a second set of grippers, and a third set of grippers. The rotating section may be moveably connected to a base. The first set of grippers may be associated with the rotating section, in which the first set of grippers inserts a first set of tools into a crawler robot. The second set of grippers may be associated with the rotating section, in which the second set of grippers inserts a second set of tools into the crawler robot. The third set of grippers may be associated with the rotating section, in which the third set of grippers removes a first set of old tools from the crawler robot.

Another illustrative embodiment of the present disclosure may provide a method of changing out a first set of old tools and a second set of old tools. The method may comprise moving a tool changer having a rotating section towards a crawler robot having a first set of old tools and a second set of old tools. The method may also remove the first set of old tools from the crawler robot with a third set of grippers associated with the rotating section. The method may also rotate the rotating section such that a first set of grippers holding a first set of tools are in a position for installing the first set of tools on the crawler robot. The method may also insert the first set of tools into the crawler robot. The method may further move the tool changer towards the second set of old tools on the crawler robot. The method may also remove the second set of old tools from the crawler robot with the first set of grippers associated with the rotating section. The method may further rotate the rotating section such that a second set of grippers holding a second set of tools are in a position for installing the second set of tools on the crawler robot. The method may also insert the second set of tools into the crawler robot.

A further illustrative embodiment of the present disclosure may provide an apparatus. The apparatus may comprises a base, a rotating section moveably connected to the base, a first set of grippers, a second set of grippers, and a third set of grippers. The first set of grippers may be associated with the rotating section. The first set of grippers may insert a first set of tools into a crawler robot. The second set of grippers may be associated with the rotating section and facing about 120 degrees from the first set of grippers. The second set of grippers may insert a second set of tools into the crawler robot. The third set of grippers may be associated with the rotating section and facing about 120 degrees from the second set of grippers. The third set of grippers may remove a first set of old tools from the crawler robot.

Another illustrative embodiment of the present disclosure may provide a method of changing out a first set of old tools and a second set of old tools. The method may comprise taking a first set of tools from a tool rack or a storage area using a first set of grippers of a tool changer, in which the first set of grippers is associated with a rotating section of the tool changer. The method may also rotate the rotating section such that a second set of grippers are in a position to take a second set of tools from the tool rack or storage area. The method may further take the second set of tools from the tool rack or a storage area using the second set of grippers of the tool changer. The method may also move the tool changer to a position relative to the crawler robot. The method may further remove the first set of old tools from the crawler robot with a third set of grippers associated with the rotating section. The method may rotate the rotating section such that a first set of grippers holding the first set of tools are in a position for installing the first set of tools on the crawler robot. The method may also insert the first set of tools into the crawler robot. The method may further move the tool changer towards the second set of old tools on the crawler robot. The method may also remove the second set of old tools from the crawler robot with the first set of grippers associated with the rotating section. The method may also rotate the rotating section such that a second set of grippers holding the second set of tools are in a position for installing the second set of tools on the crawler robot. The method may further insert the second set of tools into the crawler robot.

The features and functions may be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 8 is an illustration of a side isometric view of a tool changer in accordance with an illustrative embodiment;

DETAILED DESCRIPTION

The illustrative embodiments recognize and take into account one or more different considerations. The illustrative embodiments recognize and take into account that a human operator may undesirably drop a tool while exchanging a set of old tools for a set of new tools. Undesirably dropping a tool may undesirably impact manufacturing safety. Undesirably dropping a tool may produce an inconsistency in the object being worked upon. For example, the dropped tool may impact the object and produce an inconsistency. Further, the dropped tool may be lost. Yet further, the dropped tool may present a foreign object debris issue. The illustrative embodiments further recognize and take into account that by reducing the likelihood of undesirably dropping a tool, manufacturing costs due to reworking inconsistencies and replacing lost tools may be reduced. Yet further, the illustrative embodiments recognize and take into account that a human operator may install tools which are undesirable for an operation. As a result, the operation may be performed undesirably. Alternatively, the tools may need to be exchanged for the desired tools, adding to manufacturing time. Reducing the likelihood of installing incorrect tools into a crawler robot may reduce at least one of the manufacturing time or manufacturing cost.

Thus, the illustrative embodiments recognize and take into account that it may be desirable to replace human operators in exchanging tools in a crawler robot. Specifically, the illustrative embodiments recognize and take into account that using a tool changer rather than a human operator may reduce at least one of manufacturing time and manufacturing cost.

Figure 1:
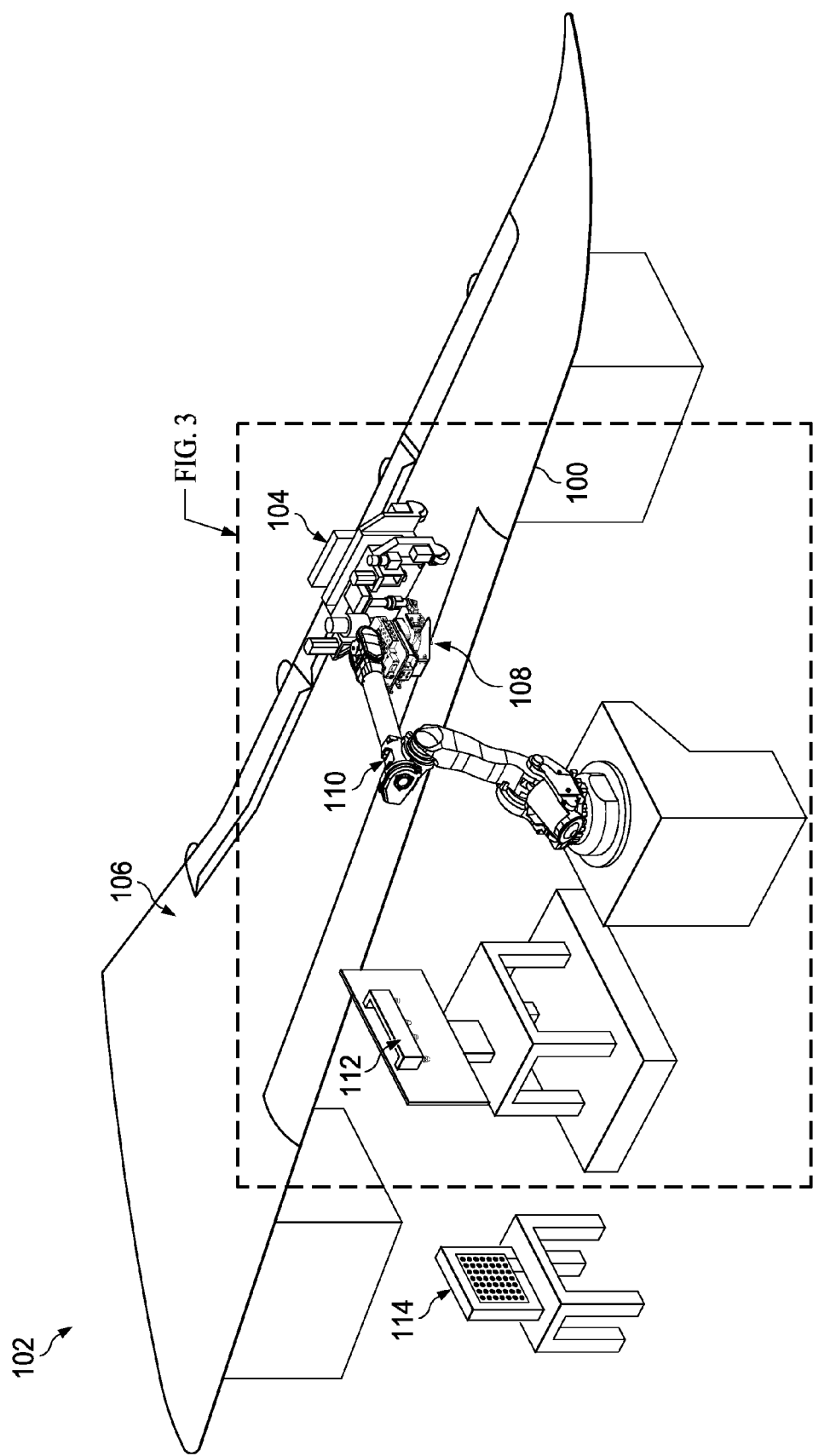
FIG. 1 is an illustration of a manufacturing environment in accordance with an illustrative embodiment.

With reference now to the Figures, and in particular, with reference to FIG. 1, an illustration of a manufacturing environment is depicted in accordance with an illustrative embodiment. In this illustrative example, wing 100 is manufactured in manufacturing environment 102. As depicted, wing 100 may be a wing of an aircraft.

As depicted, crawler robot 104 may be positioned on skin panel 106 of wing 100. Crawler robot 104 may travel along skin panel 106. Crawler robot 104 may perform operations on skin panel 106 of wing 100.

Further, tool changer 108 is connected to robotic arm 110. Tool changer 108 may remove a set of old tools from crawler robot 104. Further, tool changer 108 may insert a set of new tools into crawler robot 104. Tool changer 108 may take the set of new tools from tool rack 112. Tool changer 108 may place the set of old tools in tool rack 112.

A vision system associated with at least one of tool changer 108 or robotic arm 110 may determine a location of crawler robot 104. The determined location of crawler robot 104 may be used to move tool changer 108 to remove the set of old tools. To determine a location of crawler robot 104 on skin panel 106 of wing 100 with sufficient accuracy to remove the set of old tools, a vision system may first be calibrated. The vision system may be calibrated using calibration plate 114.

The illustration of manufacturing environment 102 is provided for purposes of illustrating one environment in which the different illustrative embodiments may be implemented. The illustration of manufacturing environment 102 in FIG. 1 is not meant to imply architectural limitations to the manner in which different illustrative embodiments may be implemented. For example, manufacturing environment 102 is shown with wing 100 prior to installation on an aircraft. In some illustrative examples, crawler robot 104 may operate on wing 100 after installation on an aircraft.

Further, although crawler robot 104 and tool changer 108 are performing operations on wing 100, crawler robot 104 may perform operations on a different portion of an aircraft. For example, crawler robot 104 may perform operations on one of a body, a vertical stabilizer, a wing, a door, a horizontal stabilizer, or other desirable portion of an aircraft.

Yet further, crawler robot 104 and tool changer 108 may be used on other components other than aircraft components. Although the illustrative examples for an illustrative embodiment are described with respect to an aircraft, an illustrative embodiment may be applied to other types of platforms. The platform may be, for example, a mobile platform, a stationary platform, a land-based structure, an aquatic-based structure, and a space-based structure. More specifically, the platform may be a surface ship, a tank, a personnel carrier, a train, a spacecraft, a space station, a satellite, a submarine, an automobile, a power plant, a bridge, a dam, a house, a manufacturing facility, a building, and other suitable platforms.

Figure 2:
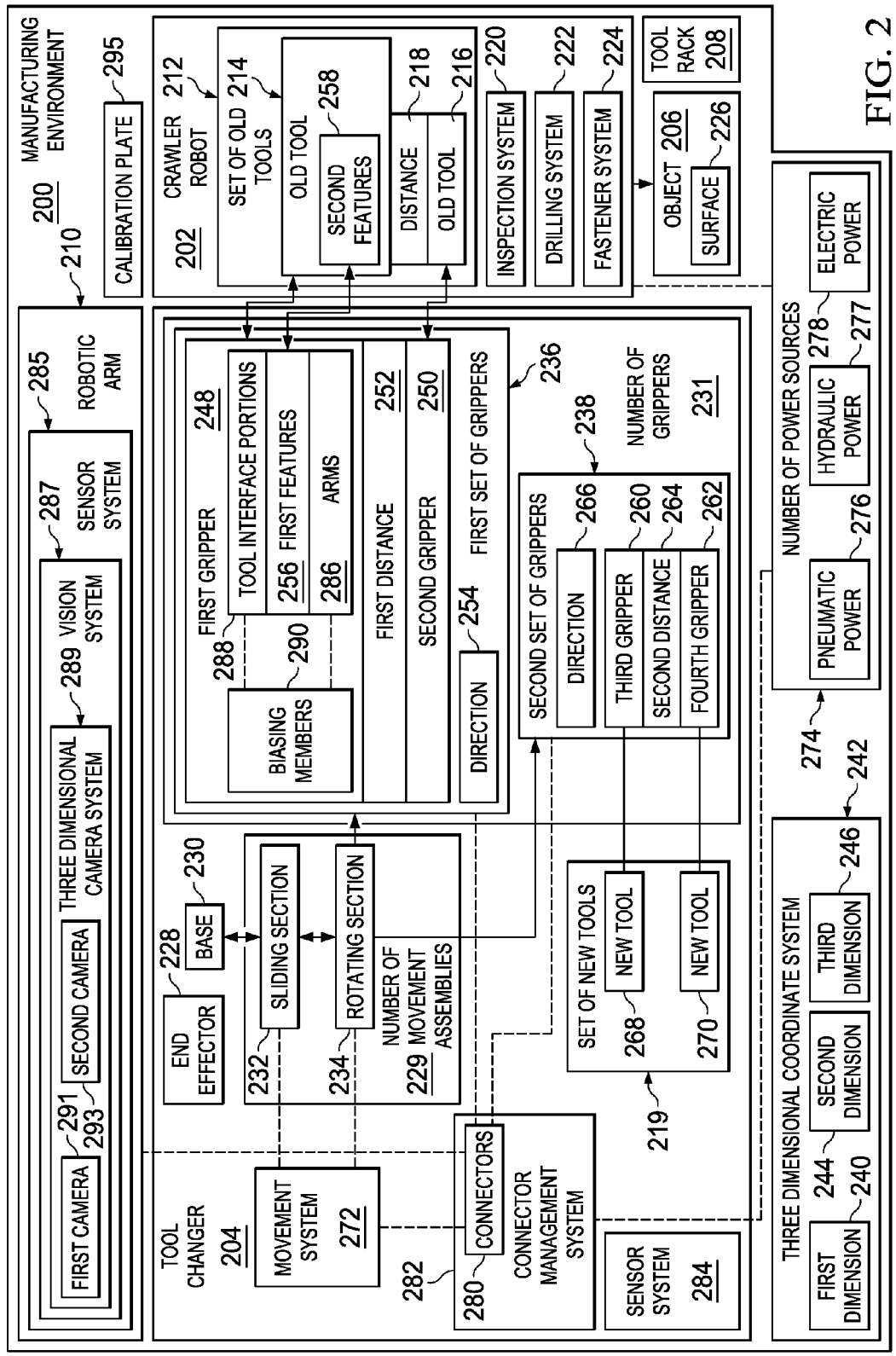
FIG. 2 is an illustration of a block diagram of a manufacturing environment in accordance with an illustrative embodiment.

Turning now to FIG. 2, an illustration of a block diagram of a manufacturing environment is depicted in accordance with an illustrative embodiment. Manufacturing environment 102 in FIG. 1 may be an example of one implementation of manufacturing environment 200 in FIG. 2.

Manufacturing environment 200 may include crawler robot 202, tool changer 204, object 206, tool rack 208, and robotic arm 210. As depicted, crawler robot 202 may have set of old tools 212. As used herein, a "set of" means one or more of an item. For example, set of old tools 212 may include only one tool. In other examples, set of old tools 212 may include multiple tools. As depicted, set of old tools 212 may include old tool 214 and old tool 216, which may be separated by distance 218. Old tool 214 may be an interchangeable part. In other words, old tool 214 may be replaced with another tool capable of being used or placed in place of old tool 214 within crawler robot 202. Old tool 216 may be an interchangeable part. In other words, old tool 216 may be replaced with another tool capable of being used or placed in place of old tool 216 within crawler robot 202. In some illustrative examples, it may be desirable to exchange set of old tools 212 for set of new tools 219.

Crawler robot 202 may include inspection system 220, drilling system 222, and fastener system 224. In some illustrative examples, old tool 214 may be part of one of inspection system 220 or drilling system 222. In one illustrative example, old tool 214 may be an interchangeable drill bit for drilling system 222. In some illustrative examples, old tool 216 may be a part of one of inspection system 220 or drilling system 222. In one illustrative example, old tool 216 may be an interchangeable probe for inspection system 220. Old tool 214 may be related to old tool 216. For example, old tool 216 may be an interchangeable probe to inspect a size of a hole drilled using old tool 214.

Crawler robot 202 may traverse surface 226 of object 206. Crawler robot 202 may move in at least one dimension on object 206. In some illustrative examples, crawler robot 202 may move in two dimensions on object 206. Crawler robot 202 may be driven across surface 226 of object 206 from one location to another location while surface 226 of object 206 is a compound contour. In some illustrative examples, object 206 may take the form of an aircraft structure, such as wing 100 of FIG. 1. Crawler robot 202 may travel across surface 226 of object 206 using rails, wheels, tracks, or any other desirable movement system.

Crawler robot 202 may move independently across object 206. Crawler robot 202 may move independent of a position of robotic arm 210. Crawler robot 202 may move independent of a position of tool changer 204.

Crawler robot 202 may be initially placed on object 206 by at least one of an operator, a dedicated placement system, robotic arm 210, another robotic arm, or other desired placement system. Crawler robot 202 may receive utilities through a number of connectors. Crawler robot 202 may receive utilities through connectors associated with at least one of robotic arm 210, another robotic arm, a dedicated robotic utilities system, or other desired utility management system.

Robotic arm 210 may be used to transport set of new tools 219 to and from crawler robot 202. Further, robotic arm 210 may also be used to transport crawler robot 202 to surface 226 on which it will work and traverse.

Tool changer 204 may exchange set of old tools 212 for set of new tools 219. For example, tool changer 204 may exchange set of old tools 212 so that crawler robot 202 may drill a desired sized hole in surface 226 of object 206 using drilling system 222. In another example, tool changer 204 may exchange set of old tools 212 so that crawler robot 202 may inspect a hole in surface 226 of object 206 for a desired size using inspection system 220.

Tool changer 204 may be end effector 228 for robotic arm 210. Tool changer 204 may have number of movement assemblies 229, base 230, and number of grippers 231. Number of movement assemblies 229 may include sliding section 232 and rotating section 234. Number of grippers 231 may include first set of grippers 236 and second set of grippers 238. Sliding section 232 may be moveably connected to base 230. Further, sliding section 232 may be slidable relative to base 230. Specifically, sliding section 232 may be configured to slide in first dimension 240 relative to base 230. First dimension 240 may be part of three-dimensional coordinate system 242 of manufacturing environment 200.

Rotating section 234 may be moveably connected to sliding section 232. Further, rotating section 234 may be rotatable relative to base 230. Specifically, rotating section 234 may be configured to rotate in a plane formed by first dimension 240 and second dimension 244.

To position tool changer 204 relative to crawler robot 202, robotic arm 210 may move tool changer 204 in at least one of first dimension 240, second dimension 244, or third dimension 246. As used herein, the phrase "at least one of" when used with list of items, means different combinations of one or more of the listed items may be used and only one of each item in the list may be needed. For example, "at least one of item A, item B, or item C" may include, without limitation, item A, item A and item B, or item B. This example also may include item A, item B, and item C or item B and item C. Of course, any combinations of these items may be present. In other examples, "at least one of" may be, for example, without limitation, two of item A; one of item B; and ten of item C; four of item B and seven of item C; or other suitable combinations. The item may be a particular object, thing, or a category. In other words, at least one of means any combination items and number of items may be used from the list but not all of the items in the list are required.

Once tool changer 204 is positioned relative to crawler robot 202, sliding section 232 may slide toward set of old tools 212 on crawler robot 202. Sliding section 232 may slide in a first direction in first dimension 240 towards crawler robot 202 and may slide in a second direction in first dimension 240 away from crawler robot 202 when tool changer 204 is positioned relative to crawler robot 202.

First set of grippers 236 may be associated with rotating section 234. First set of grippers 236 may remove set of old tools 212 from crawler robot 202. First set of grippers 236 may include first gripper 248 and second gripper 250 separated by first distance 252. First set of grippers 236 may face direction 254. Although first set of grippers 236 is depicted as having two grippers, in some illustrative examples, first set of grippers 236 may contain greater than or less than two grippers.

When one component is "associated" with another component, the association is a physical association in the depicted examples. For example, a first component may be considered to be associated with a second component by being secured to the second component, bonded to the second component, mounted to the second component, welded to the second component, fastened to the second component, and/or connected to the second component in some other suitable manner. The first component also may be connected to the second component using a third component. The first component may also be considered to be associated with the second component by being formed as part of and/or an extension of the second component.

First gripper 248 in first set of grippers 236 may have first features 256. First features 256 may engage second features 258 of old tool 214 in set of old tools 212. In some illustrative examples, second gripper 250 in first set of grippers 236 may have features that engage features in old tool 216 in set of old tools 212.

Second set of grippers 238 may be associated with rotating section 234. Second set of grippers 238 may insert set of new tools 219 into crawler robot 202. Second set of grippers 238 may include third gripper 260 and fourth gripper 262 separated by second distance 264.

Second set of grippers 238 may face direction 266. In some illustrative examples, direction 266 may be about 180 degrees from direction 254. As a result, in those illustrative examples, first set of grippers 236 faces about 180 degrees from second set of grippers 238. In some illustrative examples, direction 266 may be about 90 degrees from direction 254. As a result, in those illustrative examples, first set of grippers 236 faces about 90 degrees from second set of grippers 238. Although second set of grippers 238 is depicted as having two grippers, in some illustrative examples, second set of grippers 238 may contain greater than or less than two grippers.

In some illustrative examples, third gripper 260 in second set of grippers 238 may have features that engage features in new tool 268 in set of new tools 219. In some illustrative examples, fourth gripper 262 in second set of grippers 238 may have features that engage features in new tool 270 in set of new tools 219.

Tool rack 208 may store sets of tools. Set of new tools 219 may be stored in tool rack 208 prior to being inserted into crawler robot 202. Prior to moving sliding section 232 of tool changer 204 towards crawler robot 202, second set of grippers 238 may take set of new tools 219 from tool rack 208. First set of grippers 236 may place set of old tools 212 in tool rack 208 after second set of grippers 238 inserts set of new tools 219 into crawler robot 202. Tool rack 208 may store additional sets of tools other than just set of new tools 219 and set of old tools 212.

Tool changer 204 may have movement system 272. Movement system 272 may be associated with at least one of sliding section 232 or rotating section 234. Movement system 272 may move at least one of sliding section 232 or rotating section 234. Movement system 272 may comprise at least one of a number of belts, a number of motors, a number of gears, or any other desirable components.

Manufacturing environment 200 may have number of power sources 274. Number of power sources 274 may provide at least one of pneumatic power 276, hydraulic power 277, or electric power 278. Number of power sources 274 may provide power to at least one of crawler robot 202, robotic arm 210, or movement system 272. Specifically, connectors 280 may connect number of power sources 274 and movement system 272. Connectors 280 may be conduits to channel power from number of power sources 274 to at least one of movement system 272, robotic arm 210, first set of grippers 236, or second set of grippers 238. Connectors 280 may take the form of wires, cables, tubes, channels, pipes, or other suitable power conduits.

Connectors 280 may be managed by connector management system 282. Connector management system 282 may keep connectors 280 from obstructing or interfering with movement of at least one of sliding section 232, rotating section 234, first set of grippers 236, or second set of grippers 238. Further, connector management system 282 may protect connectors 280 from damage during movement of at least one of sliding section 232, rotating section 234, first set of grippers 236, or second set of grippers 238. Portions of connectors 280 may be encompassed by connector management system 282. Portions of connector management system 282 may be flexible. By portions of connector management system 282 being flexible, portions of connector management system 282 may move as at least one of sliding section 232, rotating section 234, first set of grippers 236, second set of grippers 238, or robotic arm 210 moves.

Tool changer 204 may have sensor system 284. Sensor system 284 may detect at least one of when a tool is in range of a gripper in one of first set of grippers 236 and second set of grippers 238, a position of at least one of sliding section 232 or rotating section 234, or a location of crawler robot 202. Further, sensor system 284 may detect when a gripper in first set of grippers 236 or second set of grippers 238 is open or closed. Sensor system 284 may contain any number of sensors. Further, sensor system 284 may contain any number of types of sensors. For example, sensor system 284 may contain at least one of a vision sensor, a piezoelectric sensor, an inductive sensor, a capacitive sensor, a laser sensor, or a magnetic sensor.

Robotic arm 210 may have sensor system 285. In some illustrative examples, sensor system 285 may take the form of vision system 287. Vision system 287 may be implemented as three-dimensional camera system 289. Three-dimensional camera system 289 may include any desirable number of cameras. In some illustrative examples, three-dimensional camera system 289 may include two or more cameras. In some illustrative examples, three-dimensional camera system 289 may include first camera 291 and second camera 293

Three-dimensional camera system 289 may be used to determine a position of crawler robot 202 within manufacturing environment 200. Three-dimensional camera system 289 may first be calibrated using calibration plate 295. Calibration plate 295 may be an optical measuring tool used as a basis for calibrating an X-Y-Z table. In other words, calibration plate 295 may be used to calibrate three-dimensional camera system 289 in all three dimensions of three-dimensional coordinate system 242.

Calibration plate 295 may be positioned in manufacturing environment 200. Calibration plate 295 may be positioned in manufacturing environment 200 away from object 206 such that robotic arm 210 may move relative to calibration plate 295 without impacting object 206. Calibration plate 295 may be positioned in manufacturing environment 200 away from object 206 such that robotic arm 210 may move relative to calibration plate 295 without impacting crawler robot 202.

A calibration process may align three-dimensional camera system 289 to calibration plate 295. For example, first camera 291 and second camera 293 of three-dimensional camera system 289 may be aligned to a calibration plate 295. During the calibration process, three-dimensional camera system 289 may be aligned to calibration plate 295 in a plurality of locations within manufacturing environment 200. For example, three-dimensional camera system 289 may be aligned to calibration plate 295 in a first location and then may be aligned to calibration plate 295 in a second location. Three-dimensional camera system 289 may be aligned to calibration plate 295 in a desired number of locations. In some illustrative examples, the desired number of locations may be eight locations. In some illustrative examples, the desired number of locations may be more than eight locations. The desired number of locations may be selected based on a calibration routine. The desired number of locations may be pre-selected by calibration software.

Although three-dimensional camera system 289 is associated with robotic arm 210, in some illustrative examples three-dimensional camera system 289 may be associated with tool changer 204. When three-dimensional camera system 289 is associated with tool changer 204, three-dimensional camera system 289 may be an example of sensor system 284.

In some illustrative examples, first gripper 248 may have arms 286 which may directly interact with old tool 214. In these illustrative examples, arms 286 may have first features 256.

In other illustrative examples, first gripper 248 may have arms 286 and tool interface portions 288. In these illustrative examples, tool interface portions 288 may have first features 256. In these illustrative examples, arms 286 may be associated with tool interface portions 288 through biasing members 290. Biasing members 290 may take the form of at least one of ball plungers, compression springs, or other desirable biasing mechanisms.

Biasing members 290 may allow for movement of tool interface portions 288 after first gripper 248 engages old tool 214. For example, biasing members 290 may compensate for the tolerances in movements of at least one of tool changer 204 or robotic arm 210. For example, biasing members 290 may compensate for tolerances of at least one of sliding section 232 of tool changer 204, rotating section 234 of tool changer 204, or the movement of robotic arm 210.

A gripper, such as first gripper 248, may open to release a tool, such as old tool 214. A gripper, such as first gripper 248, may close to hold a tool, such as old tool 214. To open first gripper 248, the distance between arms 286 may change. To change the distance between arms 286, at least one of arms 286 moves relative to base 230. In some illustrative examples, to change the distance between arms 286, only one arm of arms 286 may move. In some illustrative examples, to change the distance between arms 286, both of arms 286 may move.

Figure 3:
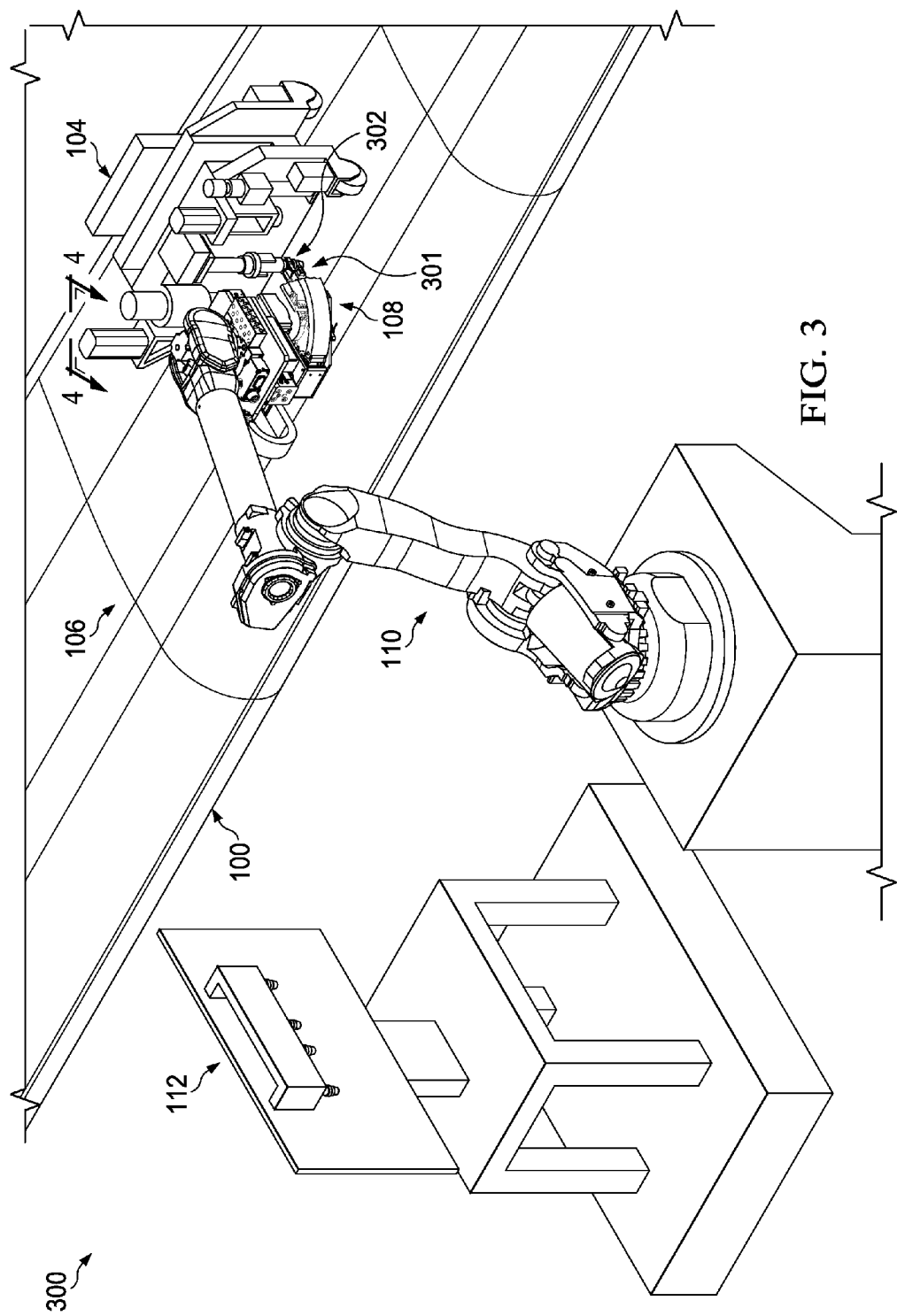
FIG. 3 is an illustration of a manufacturing environment in accordance with an illustrative embodiment.

Turning now to FIG. 3, an illustration of a manufacturing environment is depicted in accordance with an illustrative embodiment. View 300 is a view of a portion of manufacturing environment 102 of FIG. 1. Specifically, view 300 is a view within box 3-3 of FIG. 1. As depicted, tool changer 108 is positioned such that first set of grippers 301 may remove set of old tools 302.

Figure 4:
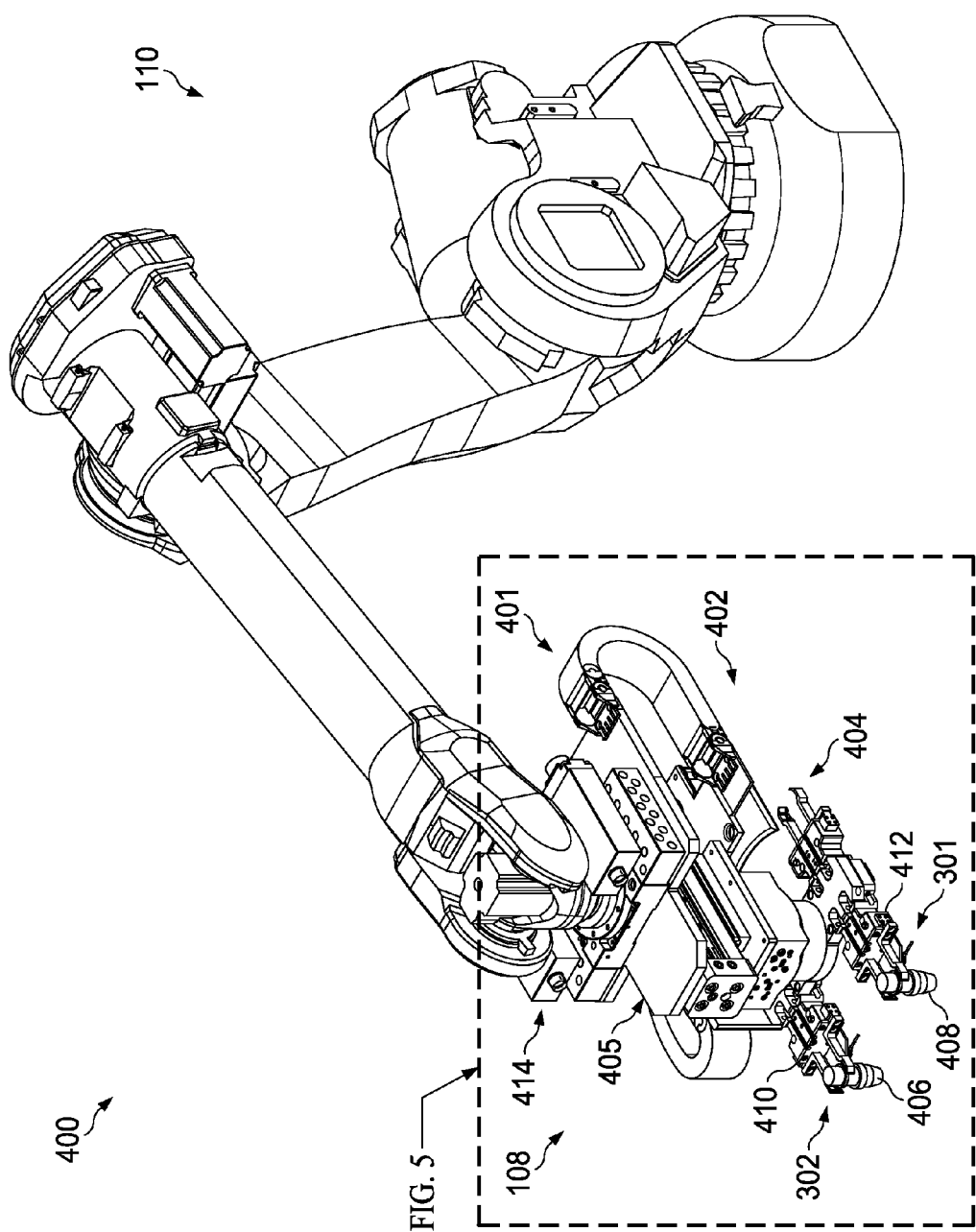
FIG. 4 is an illustration of a tool changer and a robotic arm in accordance with an illustrative embodiment.

Turning now to FIG. 4, an illustration of a tool changer and a robotic arm is depicted in accordance with an illustrative embodiment. View 400 is a view of tool changer 108, robotic arm 110, and set of old tools 302 from direction 4-4 of FIG. 3. For clarity, in view 400, crawler robot 104, wing 100, and other structures in manufacturing environment 102 are not depicted.

Tool changer 108 has sliding section 401, rotating section 402, first set of grippers 301, and second set of grippers 404. Sliding section 401 is moveably connected to base 405 and slidable relative to base 405. First set of grippers 301 may hold set of old tools 302. As depicted, set of old tools 302 may include old tool 406 and old tool 408. As depicted, first set of grippers 301 may include first gripper 410 and second gripper 412. First gripper 410 may remove old tool 406 from crawler robot 104 (not depicted in FIG. 4). Second gripper 412 may remove old tool 408 from crawler robot 104 (not depicted in FIG. 4).

Figure 5:
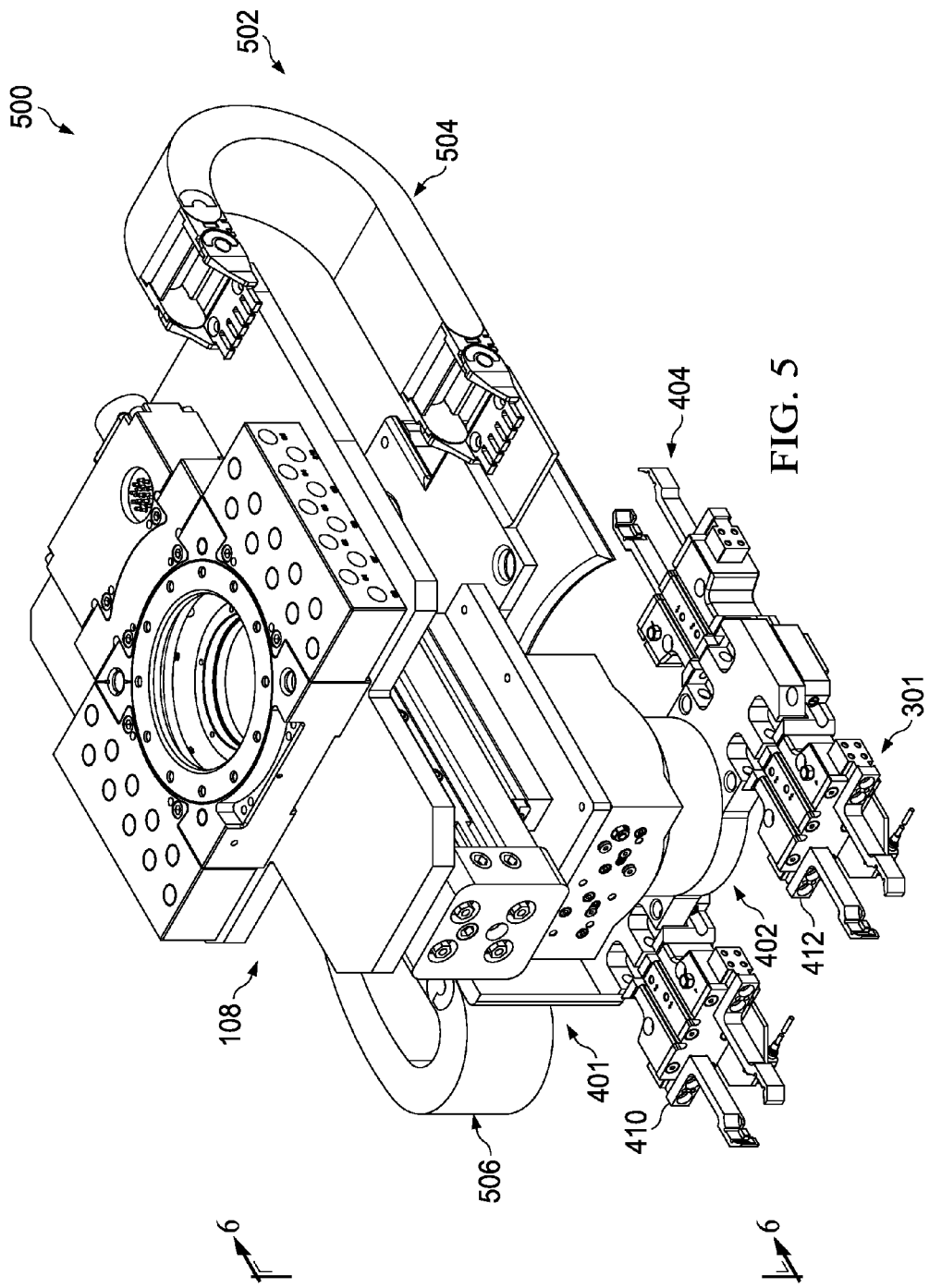
FIG. 5 is an illustration of a front isometric view of a tool changer in accordance with an illustrative embodiment.

Turning now to FIG. 5, an illustration of a front isometric view of a tool changer is depicted in accordance with an illustrative embodiment. View 500 is a view of tool changer 108 within box 5-5 of FIG. 4. For clarity, robotic arm 110 and set of old tools 302 are not depicted.

As depicted, connector management system 502 may include first connector manager 504 and second connector manager 506. First connector manager 504 and second connector manager 506 may each contain a number of connectors. The connectors may take the form of cables, tubes, or other suitable connectors. The connectors may provide power from a number of power sources to portions of tool changer 108. In some illustrative examples, the connectors may provide power to at least one of sliding section 401, rotating section 402, first set of grippers 301, or second set of grippers 404.

Connector management system 502 may keep connectors from obstructing or interfering with movement of at least one of sliding section 401, rotating section 402, first set of grippers 301, or second set of grippers 404. First connector manager 504 and second connector manager 506 may keep connectors out of the way during movement of sliding section 401 and rotating section 402.

Figure 6:
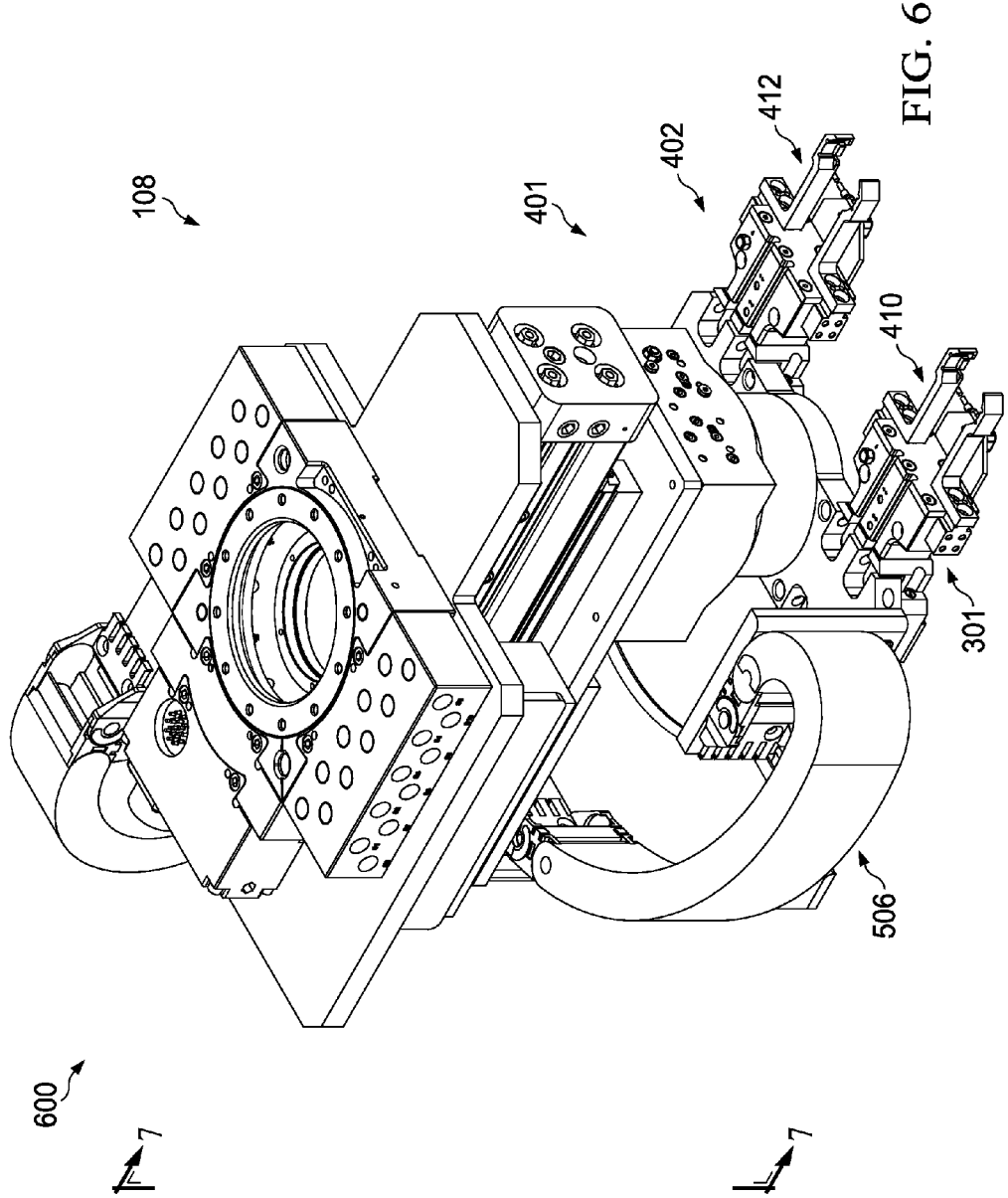
FIG. 6 is an illustration of a front isometric view of a tool changer in accordance with an illustrative embodiment.

Turning now to FIG. 6, an illustration of an isometric view of a tool changer is depicted in accordance with an illustrative embodiment. View 600 is a view of tool changer 108 from direction 6-6 of FIG. 5.

Figure 7:
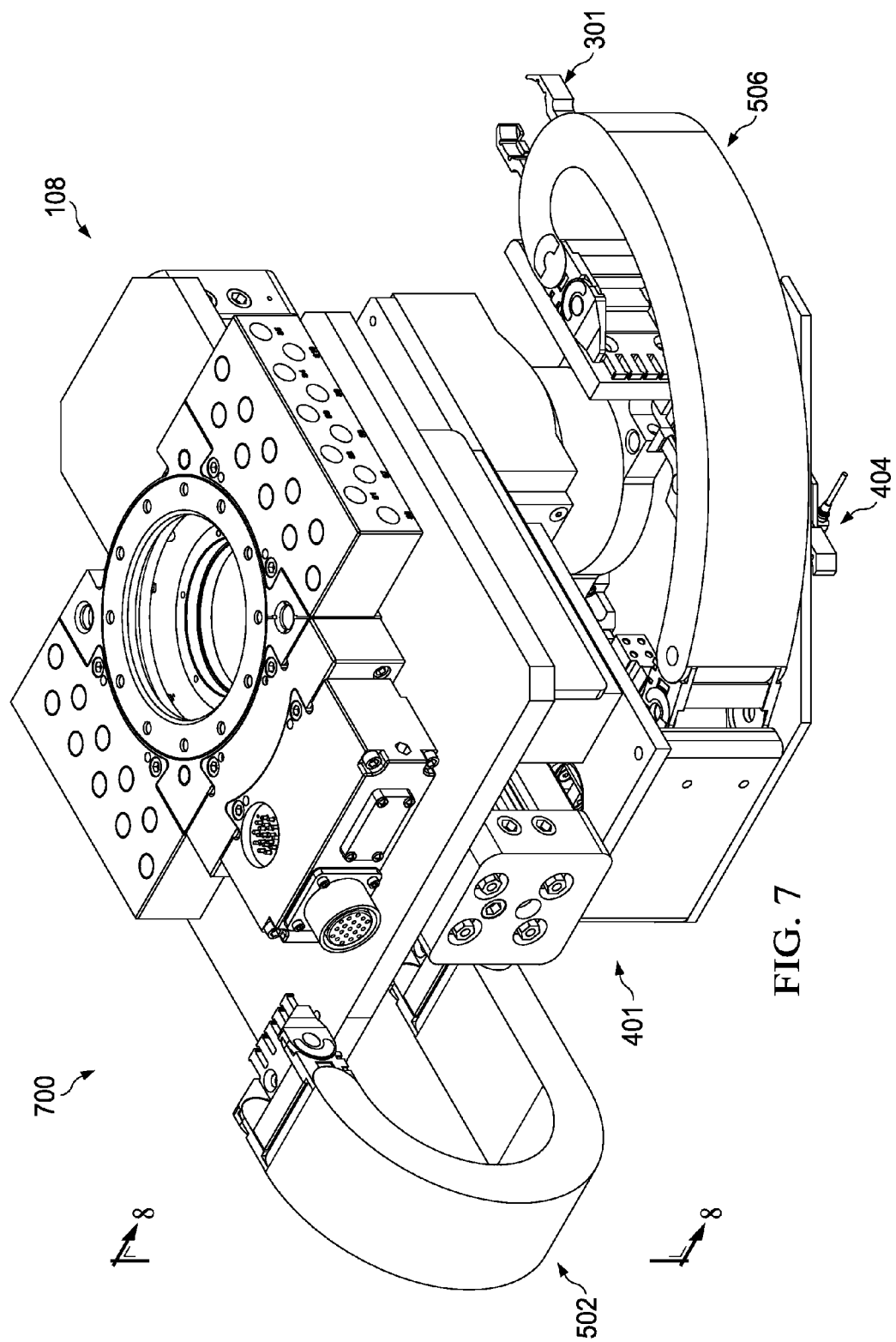
FIG. 7 is an illustration of a back isometric view of a tool changer in accordance with an illustrative embodiment.

Turning now to FIG. 7, an illustration of a back isometric view of a tool changer is depicted in accordance with an illustrative embodiment. View 700 is a view of tool changer 108 from direction 7-7 of FIG. 6.

Turning now to FIG. 8, an illustration of a side isometric view of a tool changer is depicted in accordance with an illustrative embodiment. View 800 is a view of tool changer 108 from direction 8-8 of FIG. 7.

Figure 9:
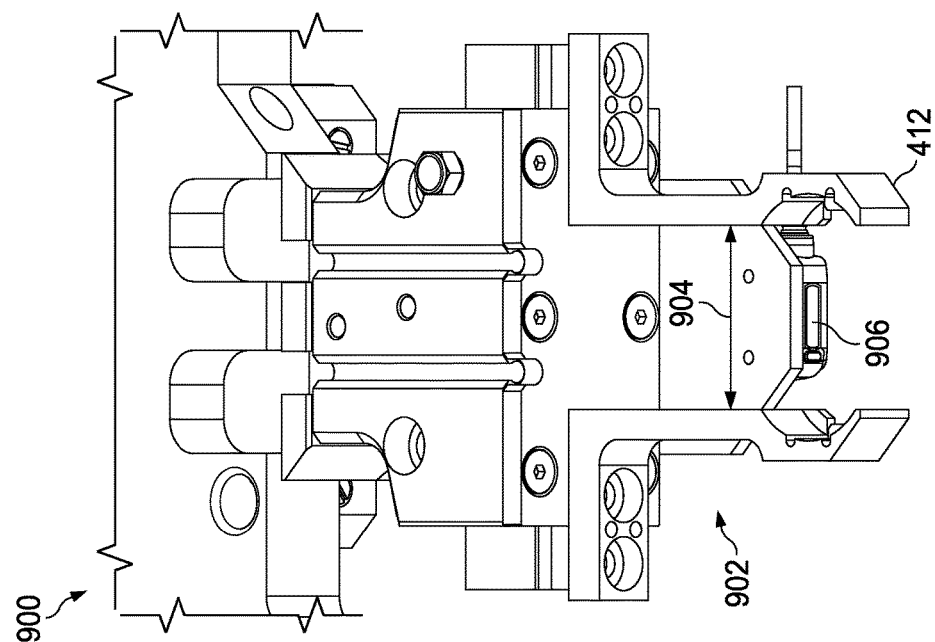
FIG. 9 is an illustration of a front view of a gripper in an open position in accordance with an illustrative embodiment.

Turning now to FIG. 9, an illustration of a front view of a gripper in an open position is depicted in accordance with an illustrative embodiment. View 900 is a view of second gripper 412 from direction 9-9 of FIG. 8. View 900 is a view of second gripper 412 in open position 902. In open position 902, second gripper 412 may not hold a tool. In open position 902, width 904 may be too great to hold a tool.

To pick up a tool, second gripper 412 may be positioned relative to the tool in open position 902. Second gripper 412 may then be moved into a closed position. Afterwards, second gripper 412 may be moved holding the tool.

Second gripper 412 may have sensor 906. Sensor 906 may detect when a tool is in range of second gripper 412. Sensor 906 may detect when second gripper 412 is in open position 902. Sensor 906 may detect when a tool is held by second gripper 412. Sensor 906 may take the form of at least one of a piezoelectric sensor, an inductive sensor, a capacitive sensor, a laser sensor, or a magnetic sensor. In some illustrative examples, second gripper 412 may have a second sensor such that sensor 906 may detect a first condition and the second sensor may detect a second condition. Sensor 906 may be a physical embodiment of a component of sensor system 284 of FIG. 2. In some illustrative examples, sensor 906 may be a physical embodiment of sensor system 284 of FIG. 2.

Figure 10:
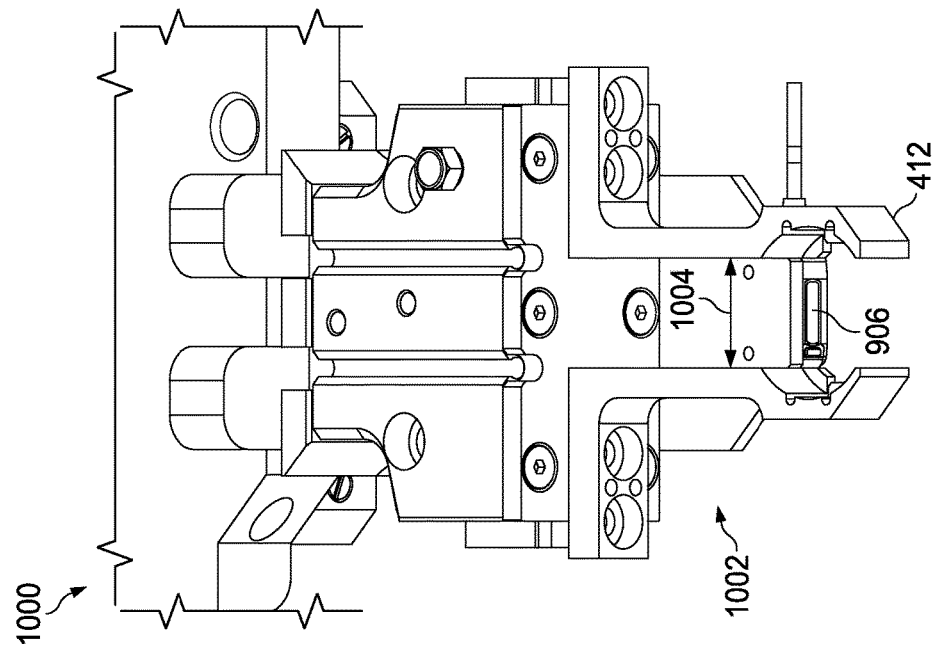
FIG. 10 is an illustration of a front view of a gripper in a closed position in accordance with an illustrative embodiment.

Turning now to FIG. 10, an illustration of a front view of a gripper in a closed position is depicted in accordance with an illustrative embodiment. View 1000 is a view of second gripper 412 in closed position 1002. In closed position 1002, second gripper 412 may hold a tool. In closed position 1002, width 1004 is less than width 904 of second gripper 412 in open position 902 as depicted in FIG. 9.

In FIGS. 9 and 10 both arms of second gripper 412 may move to change second gripper 412 from open position 902 to closed position 1002. FIGS. 9 and 10 are not to imply physical or architectural limitations to the manner in which an illustrative embodiment may be implemented. In some illustrative examples, only one of the arms of second gripper 412 may move to change second gripper 412 from open position 902 to closed position 1002.

Turning now to FIGS. 11-18, illustrations of a tool changer operating within a manufacturing environment are depicted in accordance with an illustrative embodiment. Specifically, FIGS. 11-18 are illustrations of tool changer 108 operating within box 3-3 of FIG. 1.

Figure 11:
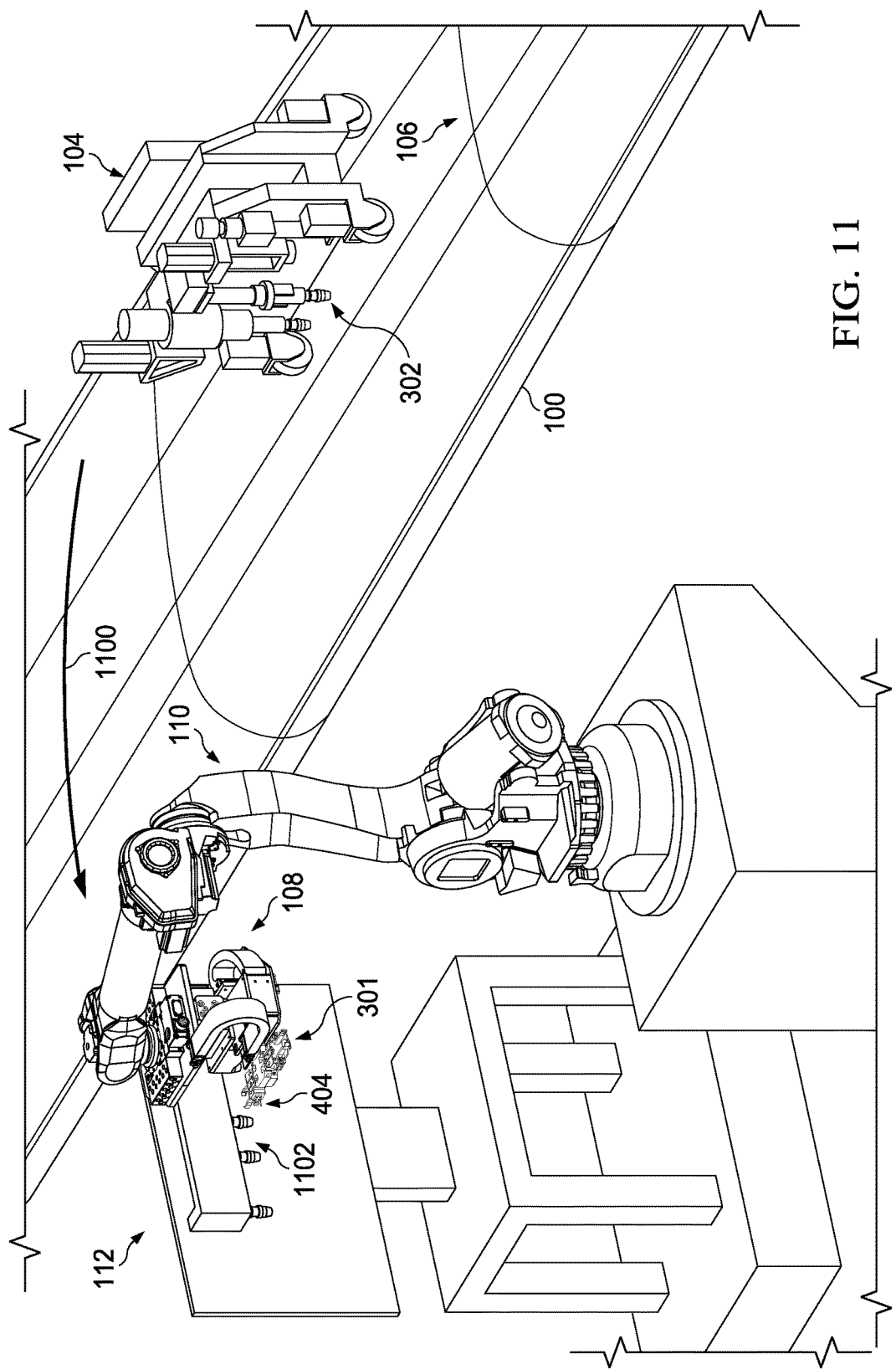
FIG. 11 is an illustration of a tool changer operating within a manufacturing environment in accordance with an illustrative embodiment.

As depicted in FIG. 11, robotic arm 110 may move tool changer 108 in direction 1100 towards tool rack 112. At least one of robotic arm 110 and tool changer 108 may position second set of grippers 404 relative to set of new tools 1102.

Figure 12:
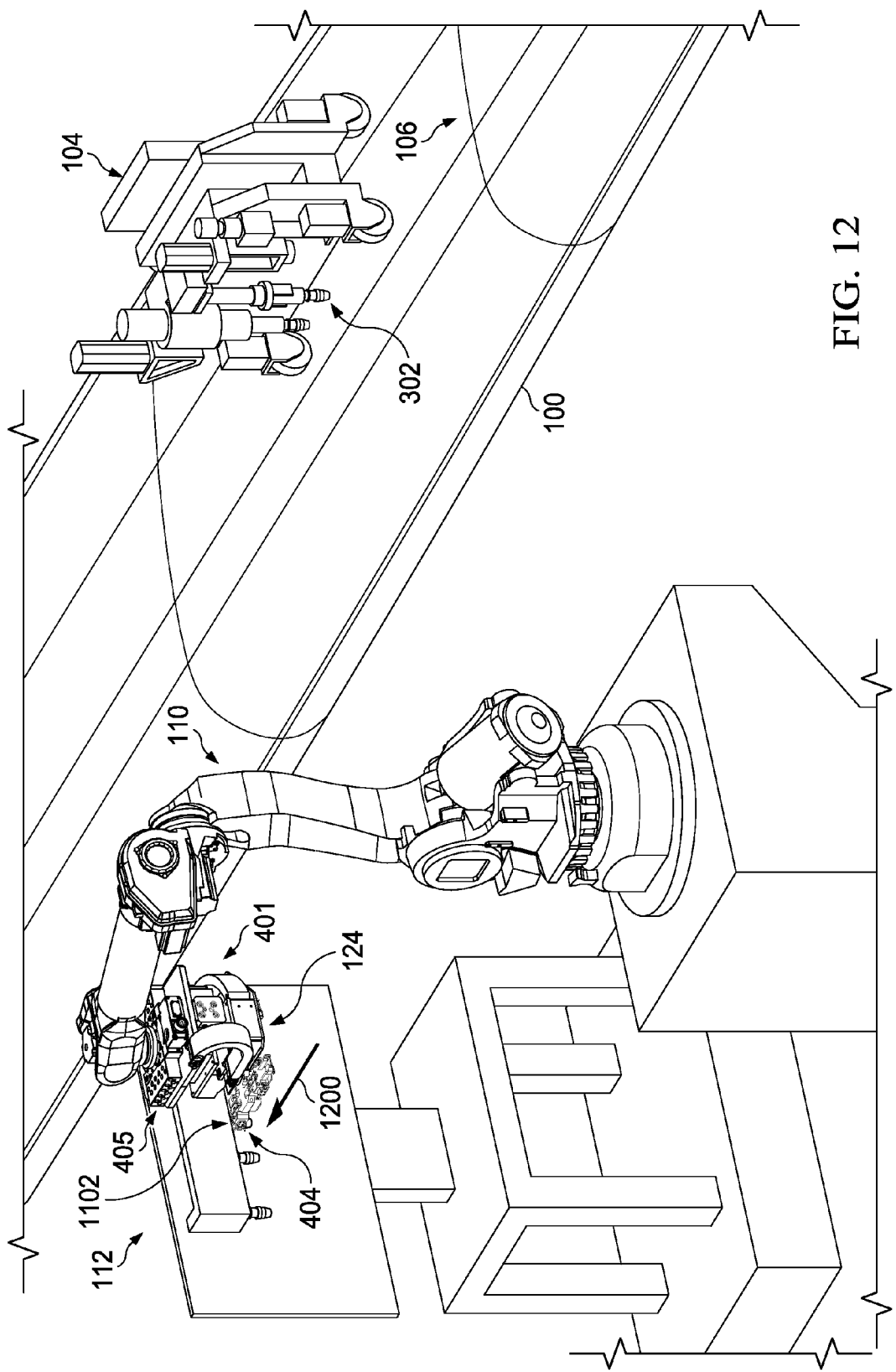
FIG. 12 is an illustration of a tool changer operating within a manufacturing environment in accordance with an illustrative embodiment.

As depicted in FIG. 12, sliding section 401 of tool changer 108 may move in direction 1200 towards tool rack 112 and set of new tools 1102. Sliding section 401 may move in direction 1200 relative to base 405 of tool changer 108 and relative to robotic arm 110. Tool changer 108 may have a sensor system, such as sensor 906 of FIG. 9, that detects when a tool is in range of a gripper in second set of grippers 404. Sliding section 401 of tool changer 108 may move in direction 1200 towards tool rack 112 and set of new tools 1102 until a tool is in range of a gripper in second set of grippers 404.

Robotic arm 110 may have a vision system (not depicted) that may detect a location of crawler robot 104. The vision system may take the form of a three-dimensional camera system, such as three-dimensional camera system 4006. Robotic arm 110 may move tool changer 108 based on a location detected by the vision system (not depicted).

After moving in direction 1200, second set of grippers 404 may be placed into a closed position to hold set of new tools 1102. Afterwards, tool changer 108 may move away from tool rack 112 to take set of new tools 1102 from tool rack 112 using second set of grippers 404 of tool changer 108.

Figure 13:
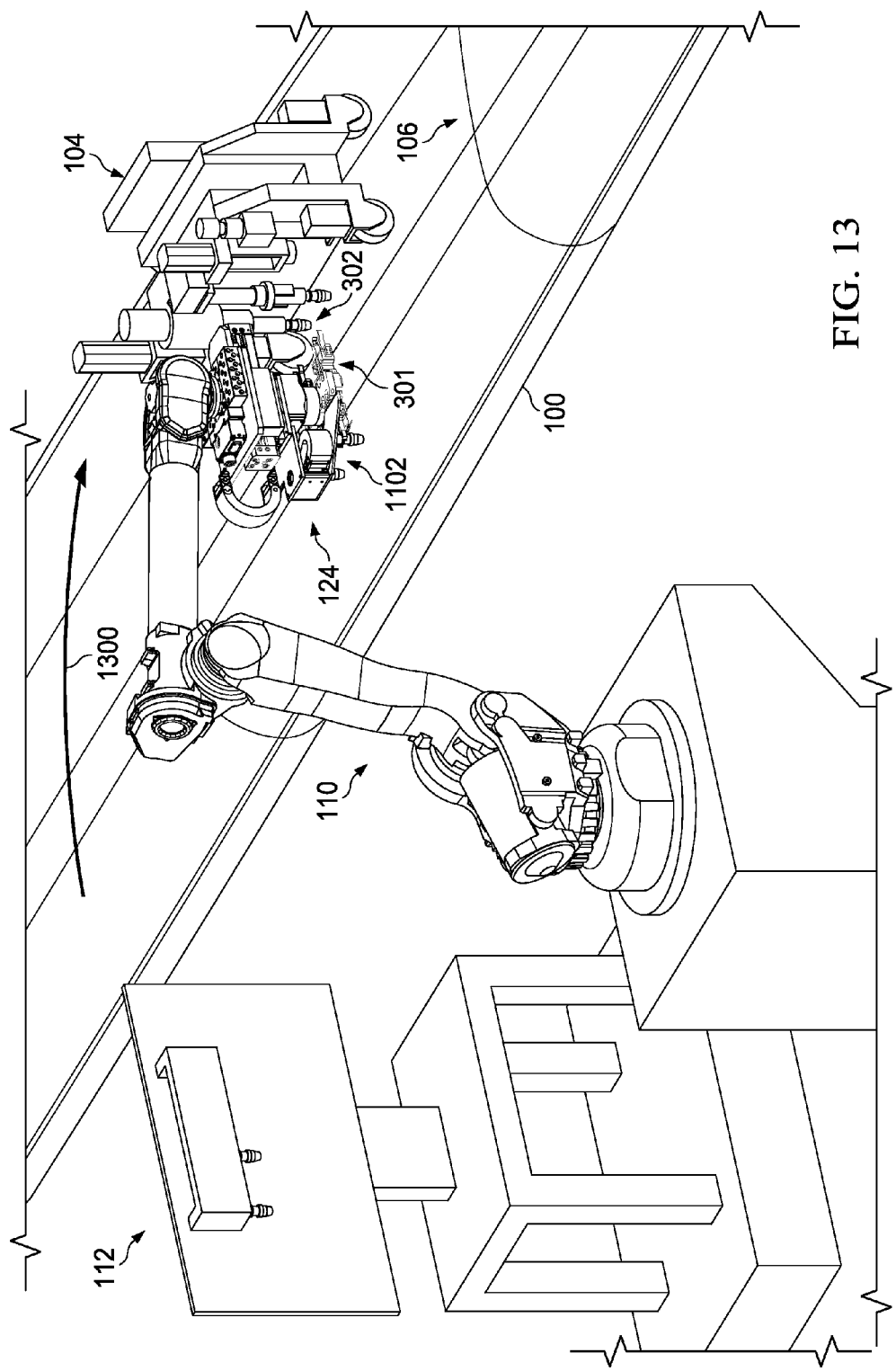
FIG. 13 is an illustration of a tool changer operating within a manufacturing environment in accordance with an illustrative embodiment.

As depicted in FIG. 13, robotic arm 110 may move tool changer 108 in direction 1300. At least one of robotic arm 110 or tool changer 108 may position first set of grippers 301 relative to set of old tools 302.

Tool changer 108 may have a sensor system, such as a vision system that detects a location of crawler robot 104. The vision system may take the form of a three-dimensional camera system. Tool changer 108 may position first set of grippers 301 relative to set of old tools 302 using the location of crawler robot 104 detected using the sensor system.

Figure 14:
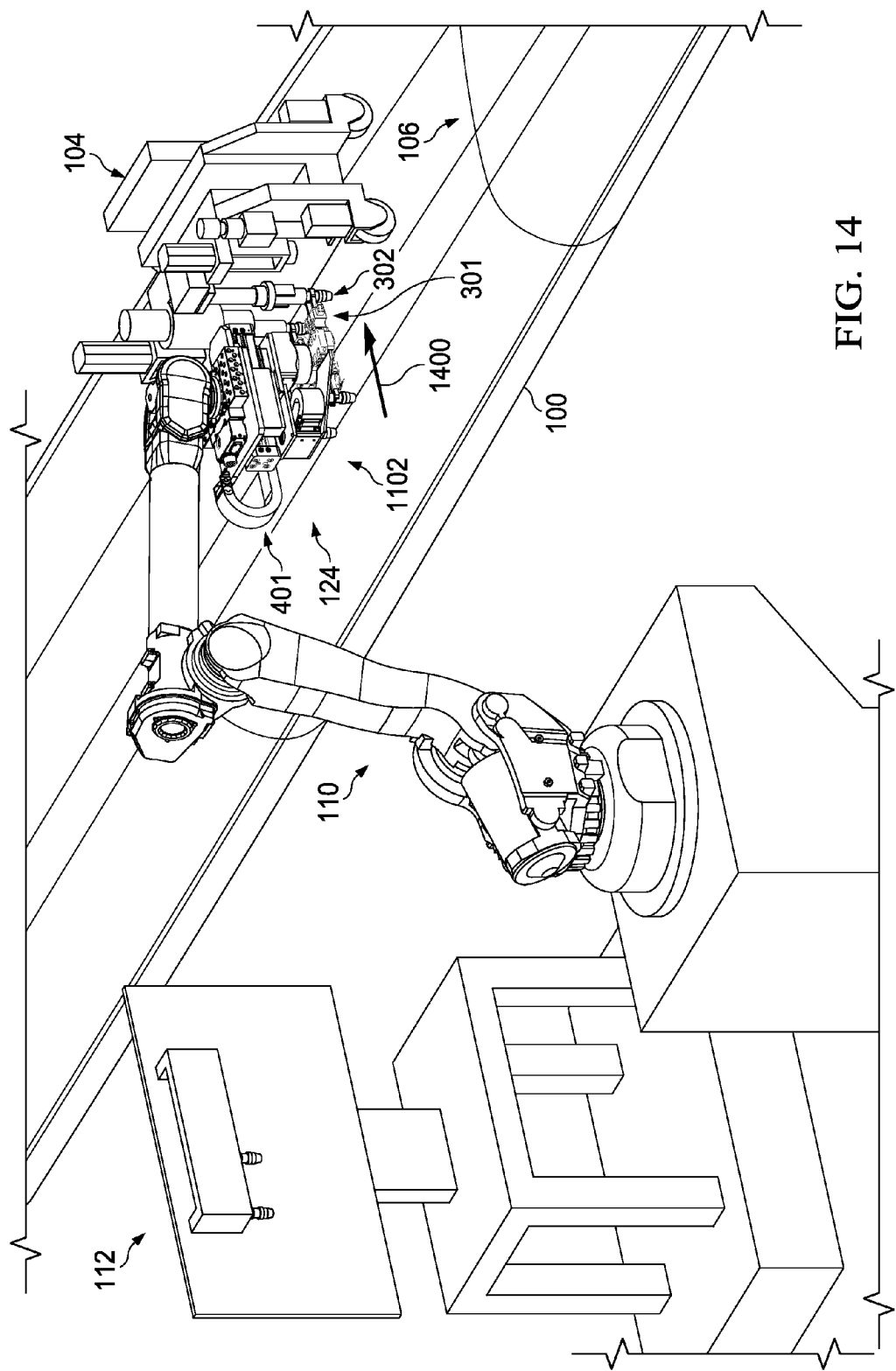
FIG. 14 is an illustration of a tool changer operating within a manufacturing environment in accordance with an illustrative embodiment.

As depicted in FIG. 14, sliding section 401 of tool changer 108 may move in direction 1400 towards set of old tools 302 on crawler robot 104. Sliding section 401 of tool changer 108 may move in direction 1400 towards set of old tools 302 on crawler robot 104 after moving tool changer 108 to the position relative to crawler robot 104 as in FIG. 13.

Tool changer 108 may have a sensor system, such as sensor 906 of FIG. 9, that detects when a tool is in range of a gripper in first set of grippers 301. Sliding section 401 of tool changer 108 may move in direction 1400 towards set of old tools 302 on crawler robot 104 until at least one tool in set of old tools 302 is in range of at least one gripper in first set of grippers 301.

After sliding section 401 of tool changer 108 moves in direction 1400, first set of grippers 301 may be placed into a closed position around set of old tools 302. First set of grippers 301 may hold set of old tools 302 when in the closed position.

Figure 15:
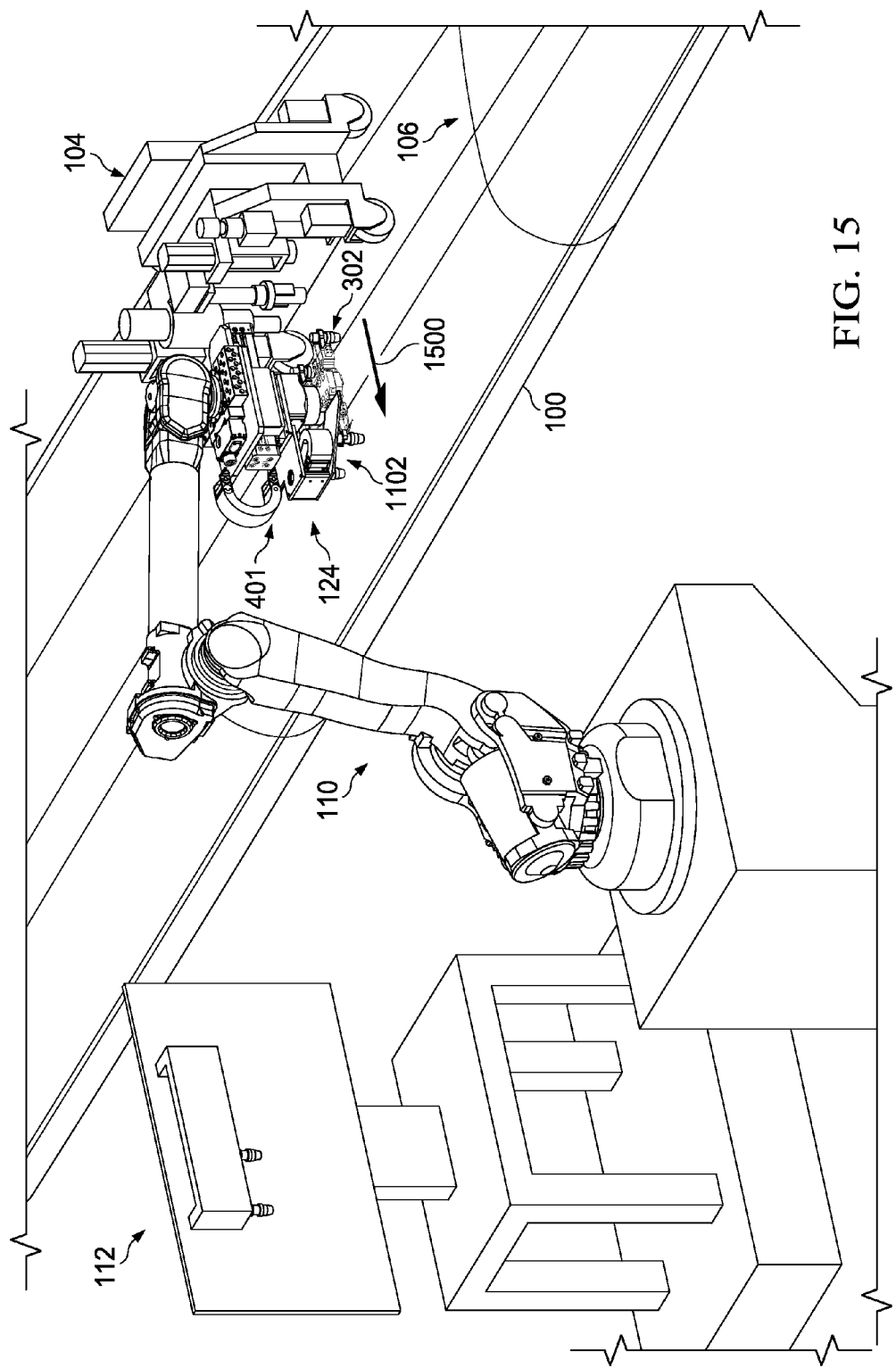
FIG. 15 is an illustration of a tool changer operating within a manufacturing environment in accordance with an illustrative embodiment.

As depicted in FIG. 15, sliding section 401 of tool changer 108 may move in direction 1500 away from crawler robot 104. Moving sliding section 401 of tool changer 108 in direction 1500 may remove set of old tools 302 from crawler robot 104 with first set of grippers 301.

Figure 16:
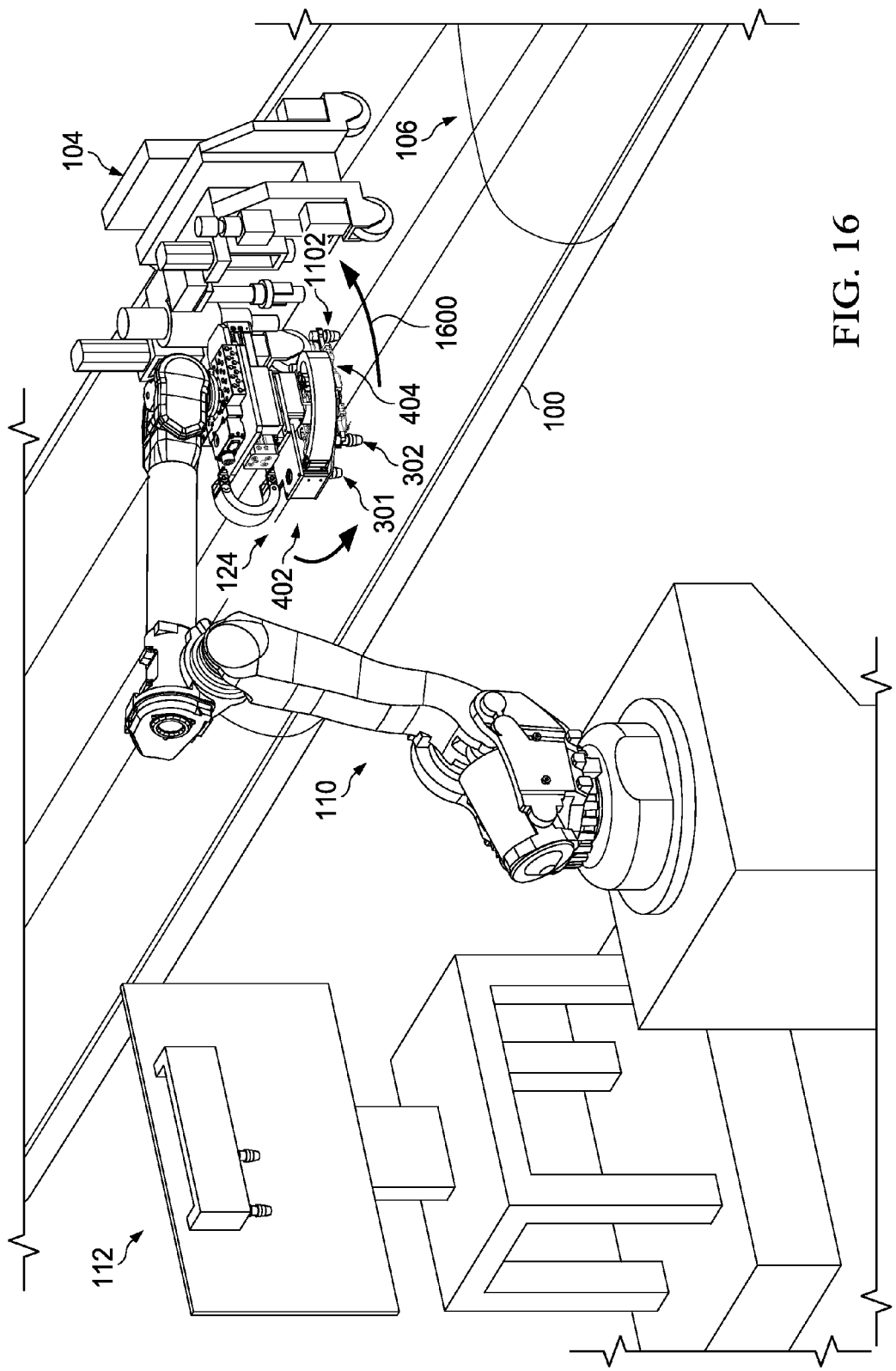
FIG. 16 is an illustration of a tool changer operating within a manufacturing environment in accordance with an illustrative embodiment.

As depicted in FIG. 16, rotating section 402 may be rotated in direction 1600. By rotating in direction 1600, rotating section 402 may be rotated such that second set of grippers 404 holding set of new tools 1102 are in a position for installing set of new tools 1102 on crawler robot 104.

Figure 17:
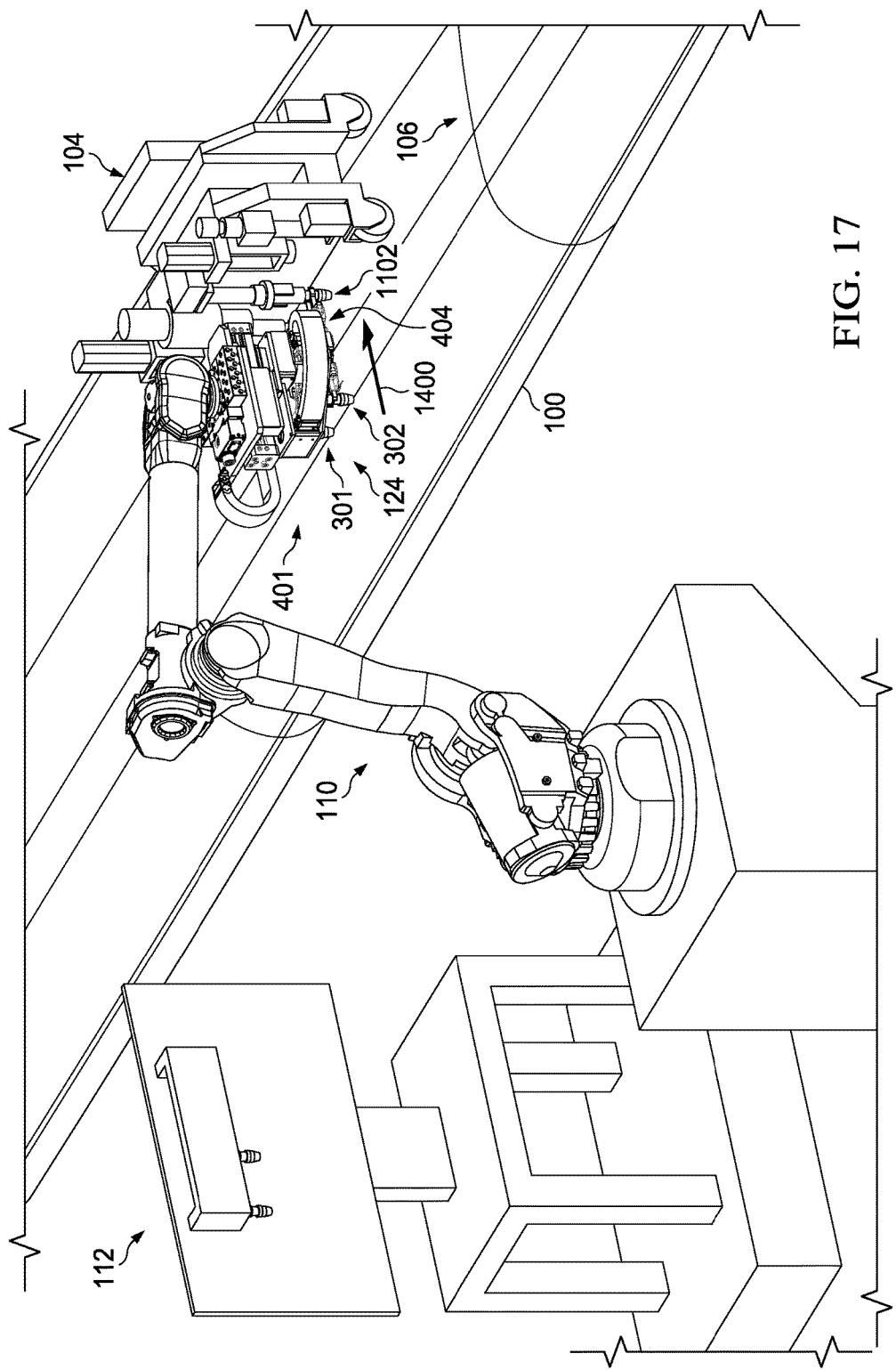
FIG. 17 is an illustration of a tool changer operating within a manufacturing environment in accordance with an illustrative embodiment.

As depicted in FIG. 17, sliding section 401 of tool changer 108 may move in direction 1400 towards crawler robot 104. In some illustrative examples, tool changer 108 may have a sensor system, such as sensor system 284 of FIG. 2, that detects a location of crawler robot 104. In some illustrative examples, robotic arm 110 may have a sensor system, such as sensor system 285 of FIG. 2, that detects a location of crawler robot 104. Sliding section 401 of tool changer 108 may move in direction 1400 towards crawler robot 104 until second set of grippers 404 reach a position relative to the location of crawler robot 104 detected using the sensor system, such as a vision system. The vision system may take the form of three-dimensional camera system 4006. Sliding section 401 of tool changer 108 may move in direction 1400 towards crawler robot 104 until set of new tools 1102 and second set of grippers 404 are positioned such that set of new tools 1102 may be inserted into crawler robot 104.

After moving sliding section 401 of tool changer 108 in direction 1400, set of new tools 1102 may be inserted into crawler robot 104. After inserting set of new tools 1102 into crawler robot 104, second set of grippers 404 may be placed into an open position.

Figure 18:
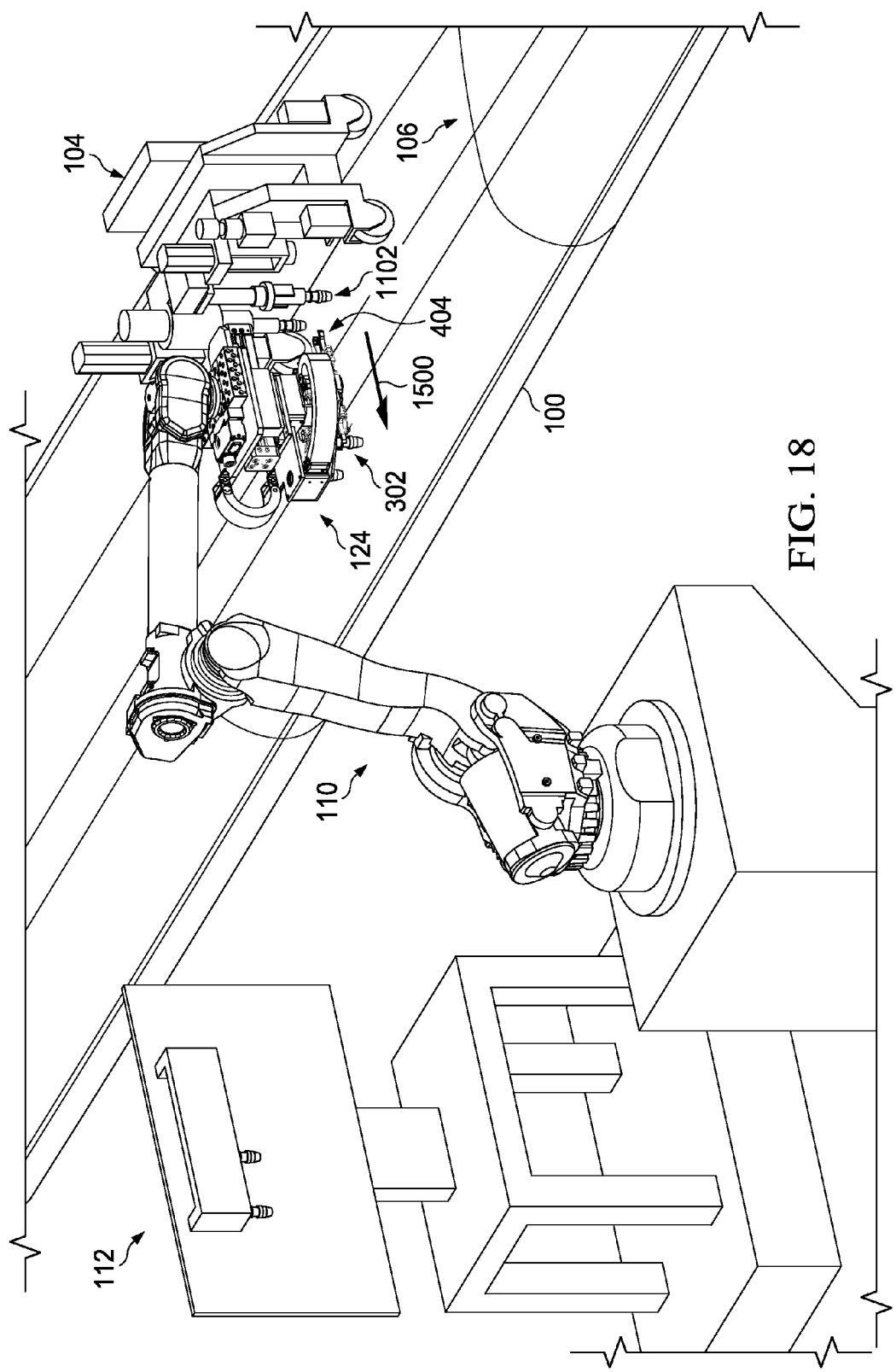
FIG. 18 is an illustration of a tool changer operating within a manufacturing environment in accordance with an illustrative embodiment.

As depicted in FIG. 18, after inserting set of new tools 1102 into crawler robot 104, sliding section 401 may move in direction 1500. Afterwards, crawler robot 104 may perform operations on wing 100 using set of new tools 1102. After inserting set of new tools 1102 into crawler robot 104, robotic arm 110 may move tool changer 108 towards tool rack 112. Tool changer 108 may then store set of old tools 302 in tool rack 112.

Figure 19:
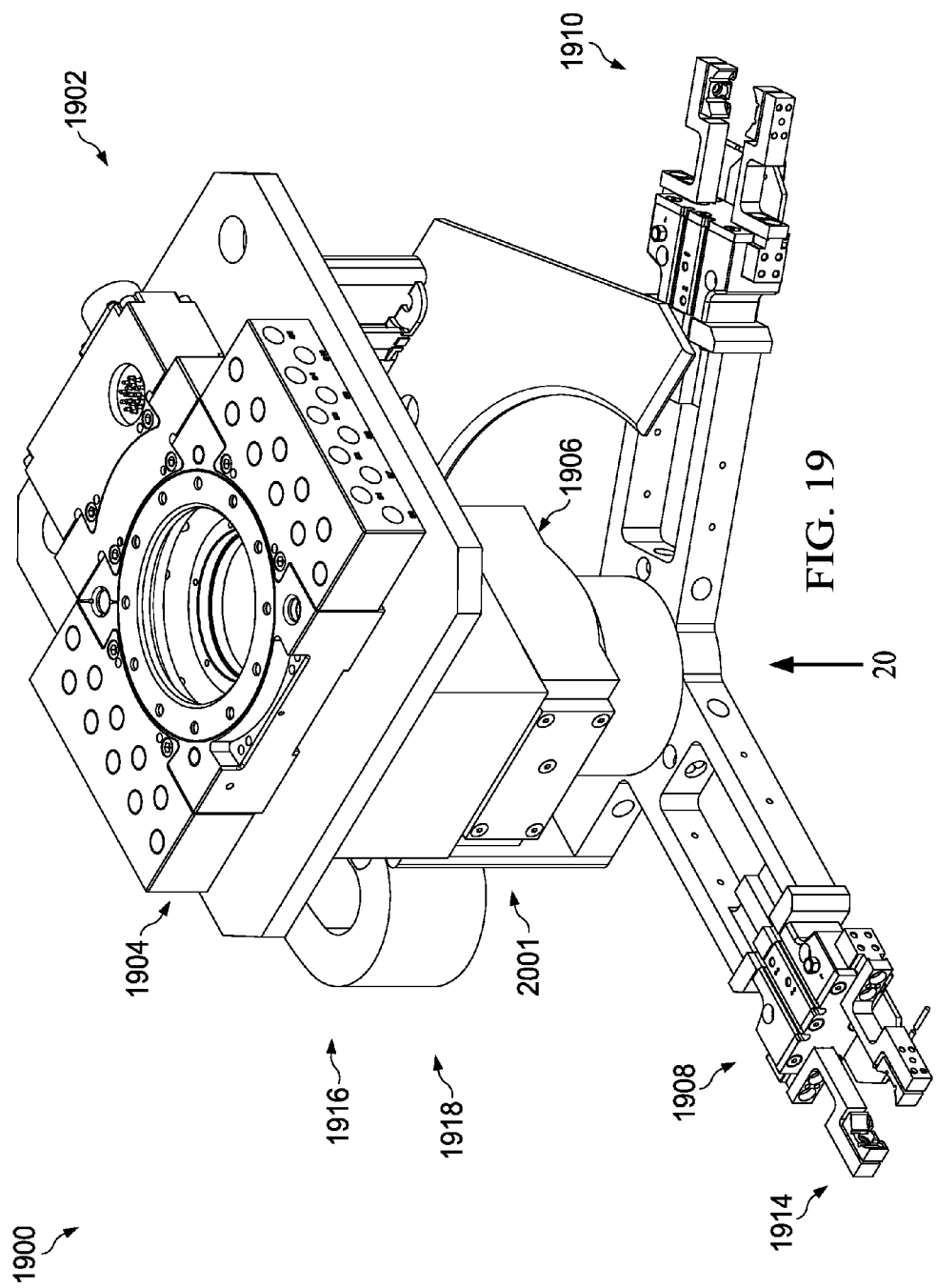
FIG. 19 is an illustration of a front isometric view of a tool changer in accordance with an illustrative embodiment.

Turning now to FIG. 19, an illustration of a front isometric view of a tool changer is depicted in accordance with an illustrative embodiment. View 1900 is a view of tool changer 1902. Tool changer 1902 may be a physical implementation of tool changer 204 of FIG. 2.

Figure 20:
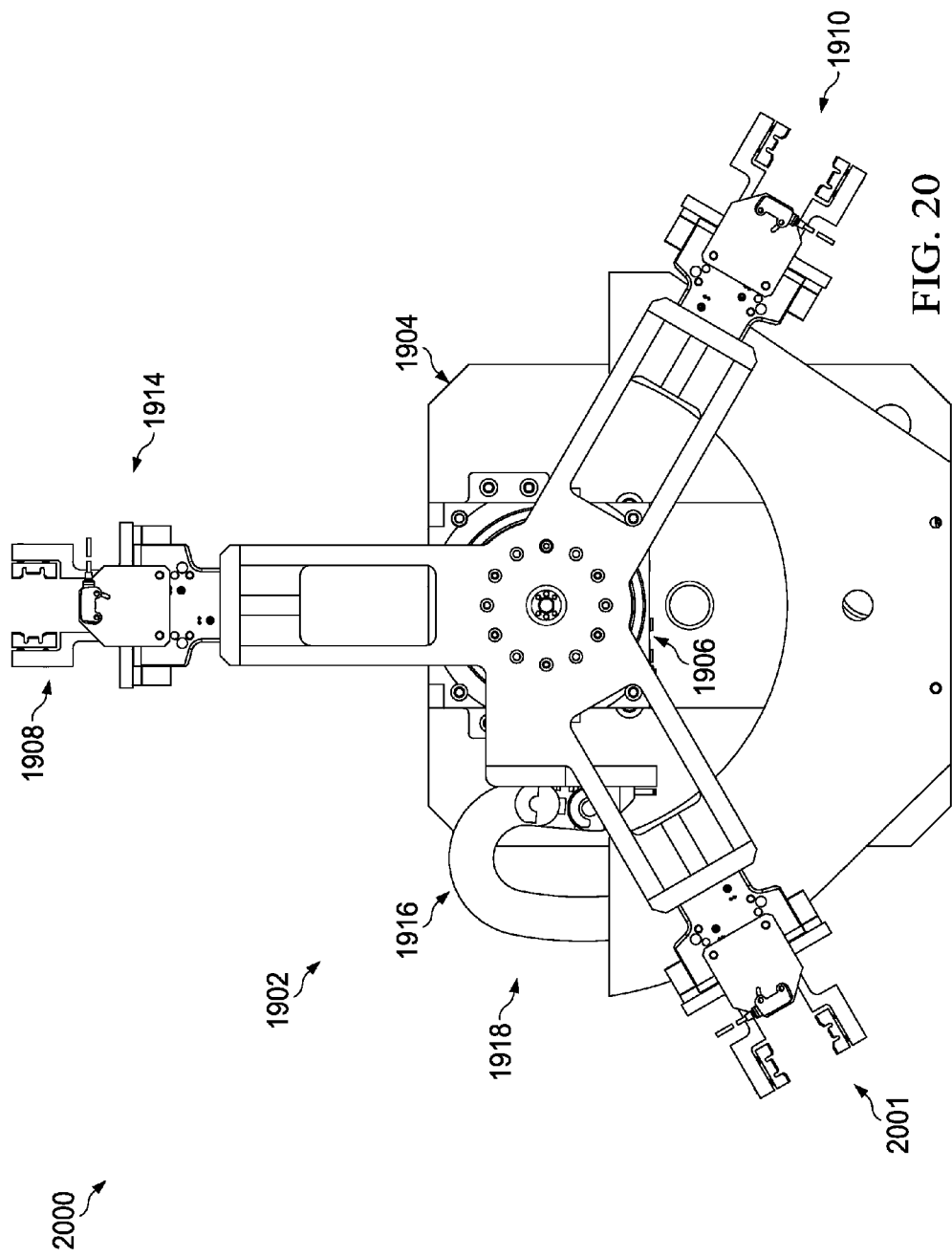
FIG. 20 is an illustration of a bottom view of a tool changer in accordance with an illustrative embodiment.

Tool changer 1902 has base 1904, rotating section 1906, first set of grippers 1908, second set of grippers 1910, and third set of grippers shown in FIG. 20. Rotating section 1906 may be moveably connected to base 1904 and rotatable relative to base 1904. First set of grippers 1908 may hold a set of old tools. As depicted, first set of grippers 1908 has a single gripper, first gripper 1914. As a result, a set of old tools may contain only one tool.

Tool changer 1902 also has connector management system 1916. Connector management system 1916 may include first connector manager 1918. First connector manager 1918 may contain a number of connectors. The connectors may take the form of cables, tubes, or other suitable connectors. The connectors may provide power from a number of power sources to portions of tool changer 1902. In some illustrative examples, the connectors may provide power to at least one of rotating section 1906, first set of grippers 1908, second set of grippers 1910, or the third set of grippers. In some illustrative examples, the connectors may provide control signals to at least one of rotating section 1906, first set of grippers 1908, second set of grippers 1910, or the third set of grippers. In some illustrative examples, the connectors may provide power to a number of actuators that move at least one of rotating section 1906, first set of grippers 1908, second set of grippers 1910, or the third set of grippers.

Connector management system 1916 may keep connectors from obstructing or interfering with movement of at least one of rotating section 1906, first set of grippers 1908, second set of grippers 1910, or the third set of grippers. First connector manager 1918 may keep connectors out of the way during movement of rotating section 1906.

Turning now to FIG. 20, an illustration of a bottom view of a tool changer is depicted in accordance with an illustrative embodiment. View 2000 is a view of tool changer 1902 from direction 20-20 of FIG. 19.

As can be seen in FIG. 20, second set of grippers 1910 may face about 120 degrees from first set of grippers 1908. Third set of grippers 2001 may face about 120 degrees from second set of grippers 1910 and about 120 degrees from first set of grippers 1908.

Turning now to FIGS. 21-33, illustrations of a tool changer operating within a manufacturing environment are depicted in accordance with an illustrative embodiment. Specifically, FIGS. 21-33 may be illustrations of tool changer 1902 operating within box 3-3 of FIG. 1.

Figure 21:
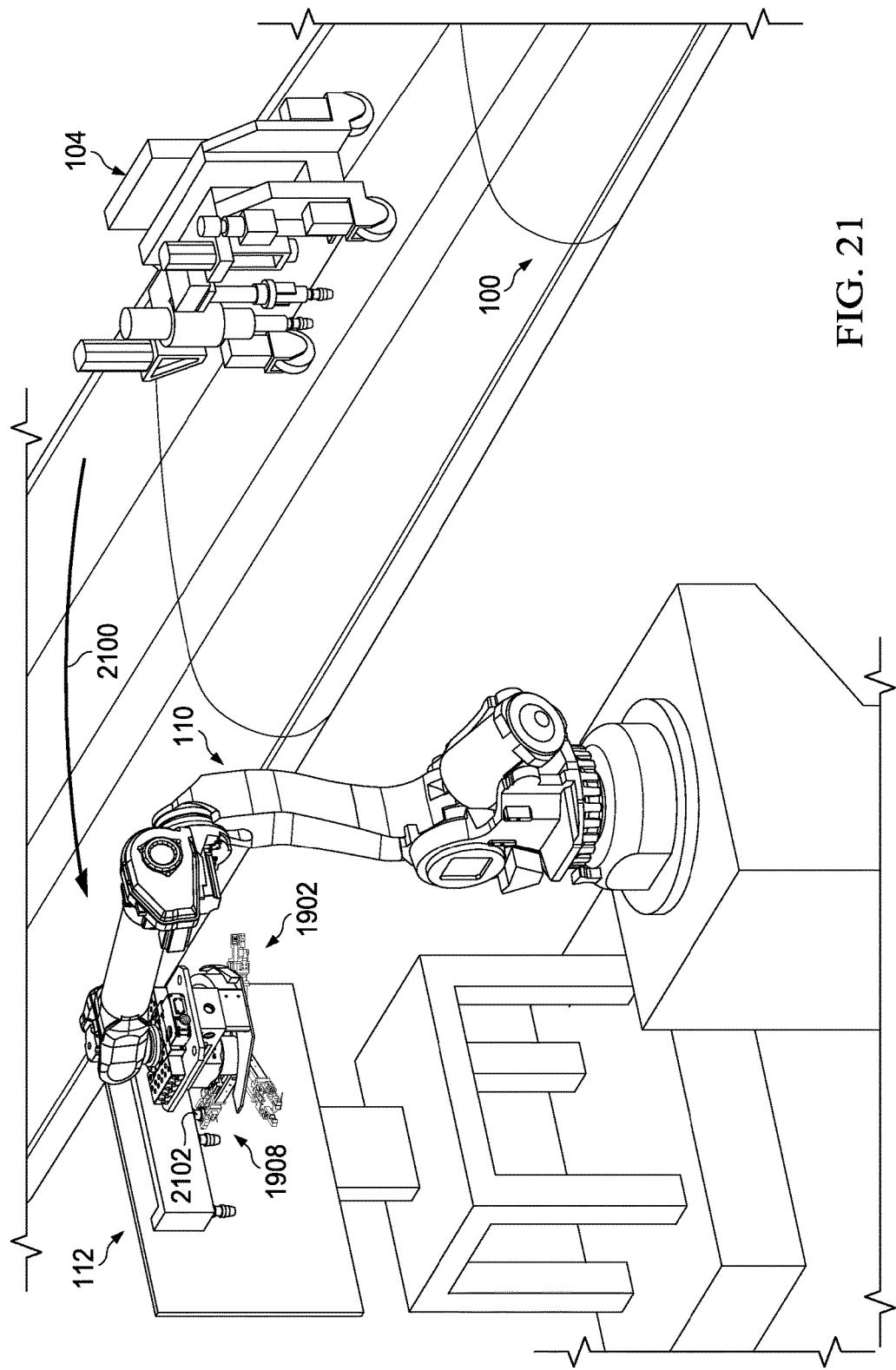
FIG. 21 is an illustration of a tool changer operating within a manufacturing environment in accordance with an illustrative embodiment.

As depicted in FIG. 21, robotic arm 110 may move tool changer 1902 in direction 2100 towards tool rack 112. Robotic arm 110 may position first set of grippers 1908 relative to first set of tools 2102. First set of grippers 1908 may then be placed into a closed position to hold first set of tools 2102.

Tool changer 1902 may have a sensor system, such as sensor 906 of FIG. 9, that detects when a tool is in range of a gripper in first set of grippers 1908. The sensor system may be a physical implementation of sensor system 284 of FIG. 2. Robotic arm 110 may move tool changer 1902 in direction 2100 towards first set of tools 2102 and tool rack 112 until a tool is in range of a gripper in first set of grippers 1908.

Robotic arm 110 may have a vision sensor system (not depicted) that may detect a location of tool rack 112. In some illustrative examples, the vision sensor system may be a three-dimensional camera system. Robotic arm 110 may move tool changer 1902 based on a location detected by the three-dimensional camera system (not depicted).

Figure 22:
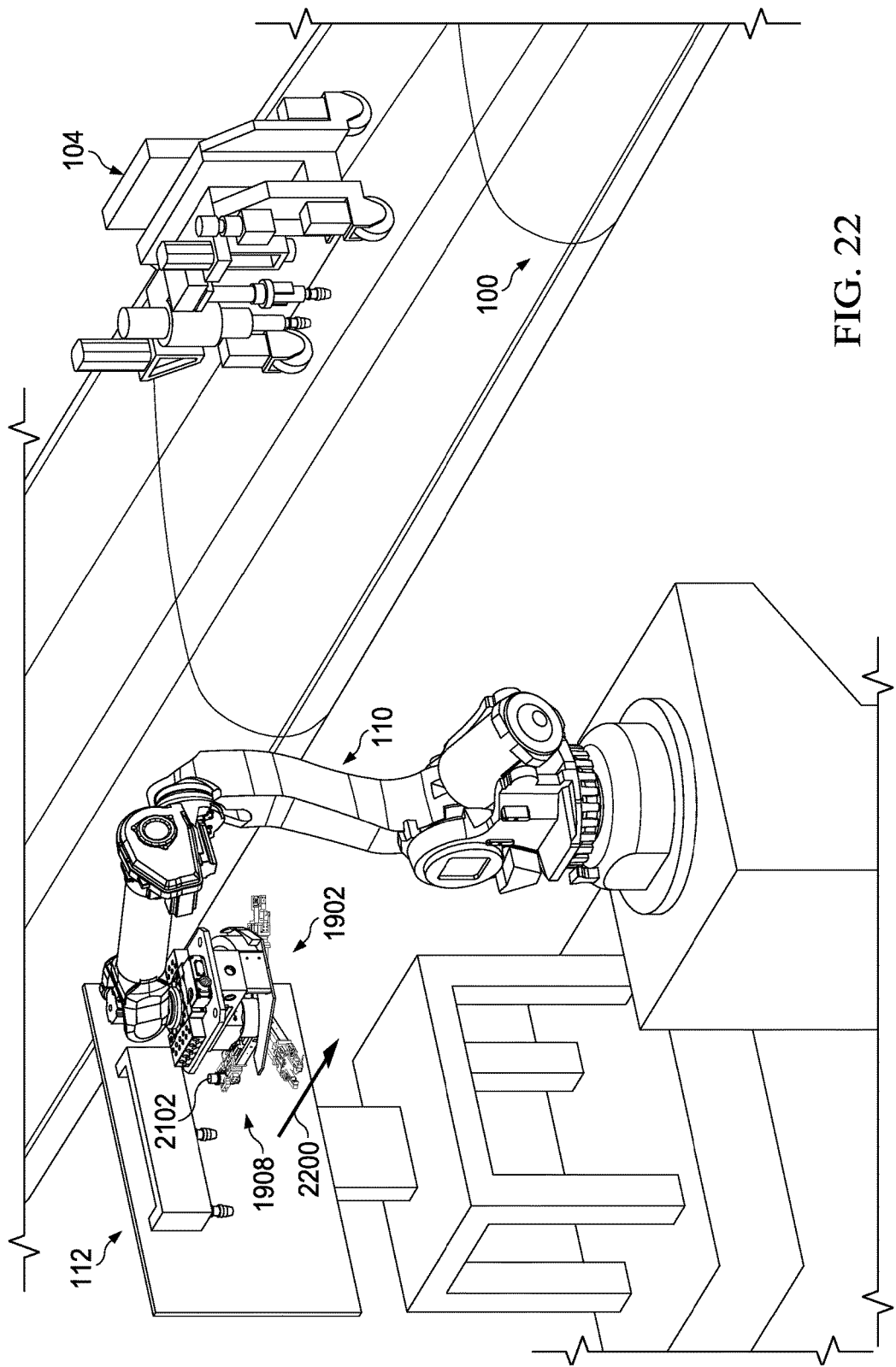
FIG. 22 is an illustration of a tool changer operating within a manufacturing environment in accordance with an illustrative embodiment.

As depicted in FIG. 22, robotic arm 110 may move tool changer 1902 in direction 2200 away from tool rack 112 to take first set of tools 2102 from tool rack 112. First set of tools 2102 may be taken from tool rack 112 using first set of grippers 1908 of tool changer 1902.

Figure 23:
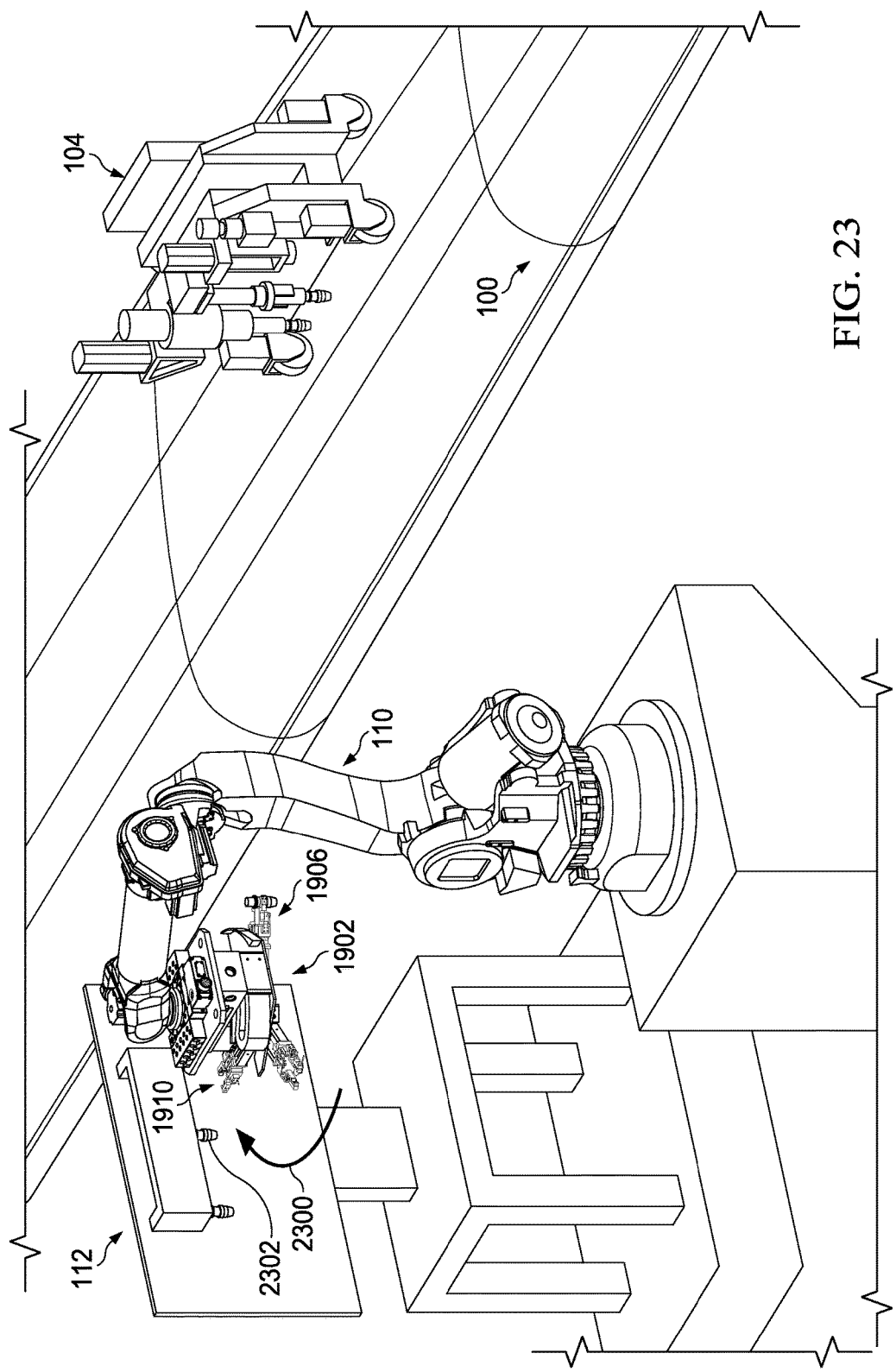
FIG. 23 is an illustration of a tool changer operating within a manufacturing environment in accordance with an illustrative embodiment.

As depicted in FIG. 23, rotating section 1906 may be rotated in direction 2300. By rotating in direction 2300, rotating section 1906 may be rotated such that second set of grippers 1910 are in a position for taking second set of tools 2302 from tool rack 112.

Figure 24:
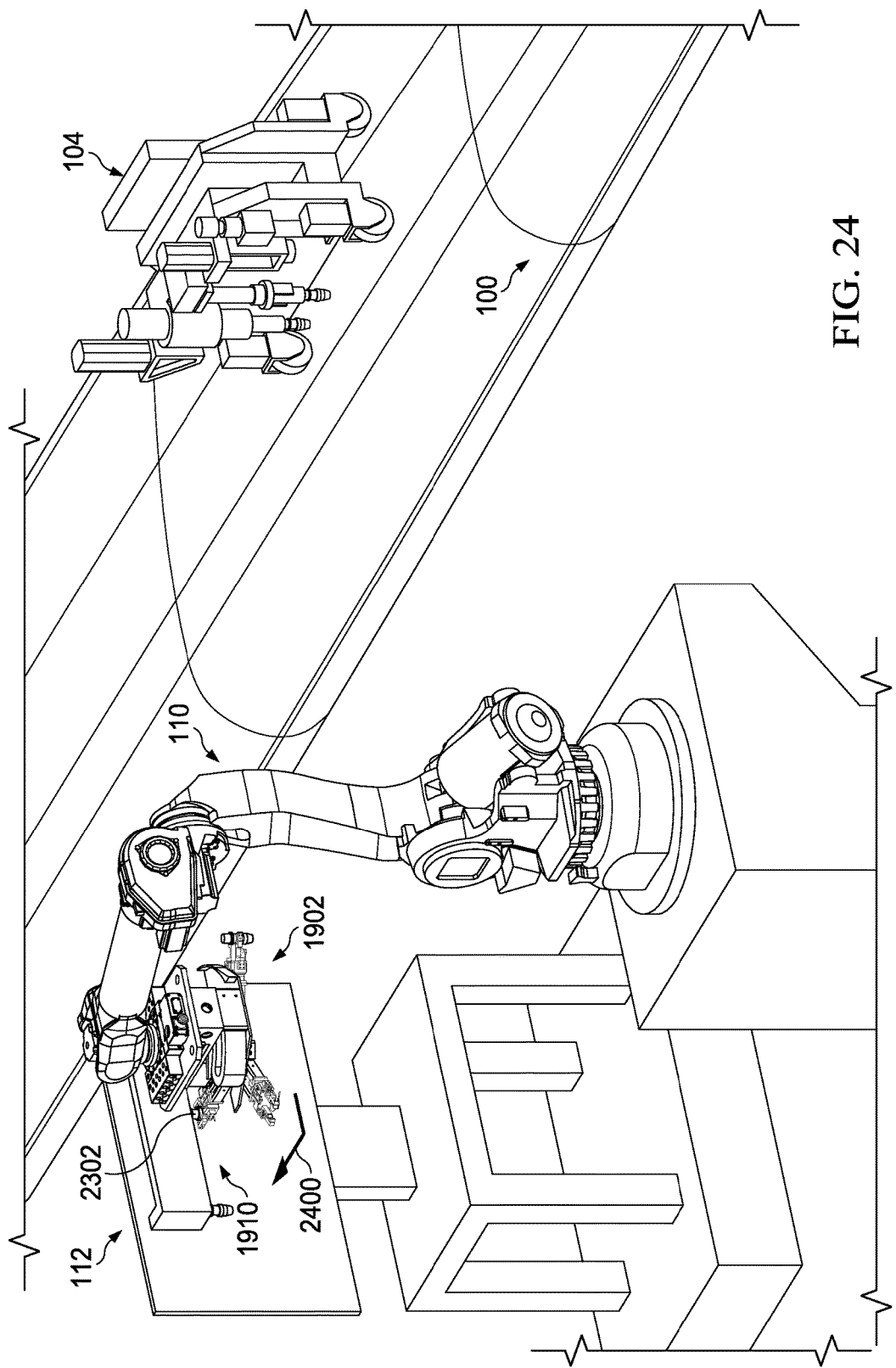
FIG. 24 is an illustration of a tool changer operating within a manufacturing environment in accordance with an illustrative embodiment.

As depicted in FIG. 24, robotic arm 110 may move tool changer 1902 in direction 2400 towards tool rack 112. Robotic arm 110 may position second set of grippers 1910 relative to second set of tools 2302. Second set of grippers 1910 may then be placed into a closed position to hold second set of tools 2302.

Tool changer 1902 may have a sensor system (not depicted) that detects when a tool is in range of a gripper in second set of grippers 1910. Robotic arm 110 may move tool changer 1902 in direction 2400 towards second set of tools 2302 and tool rack 112 until a tool is in range of a gripper in second set of grippers 1910.

Figure 25:
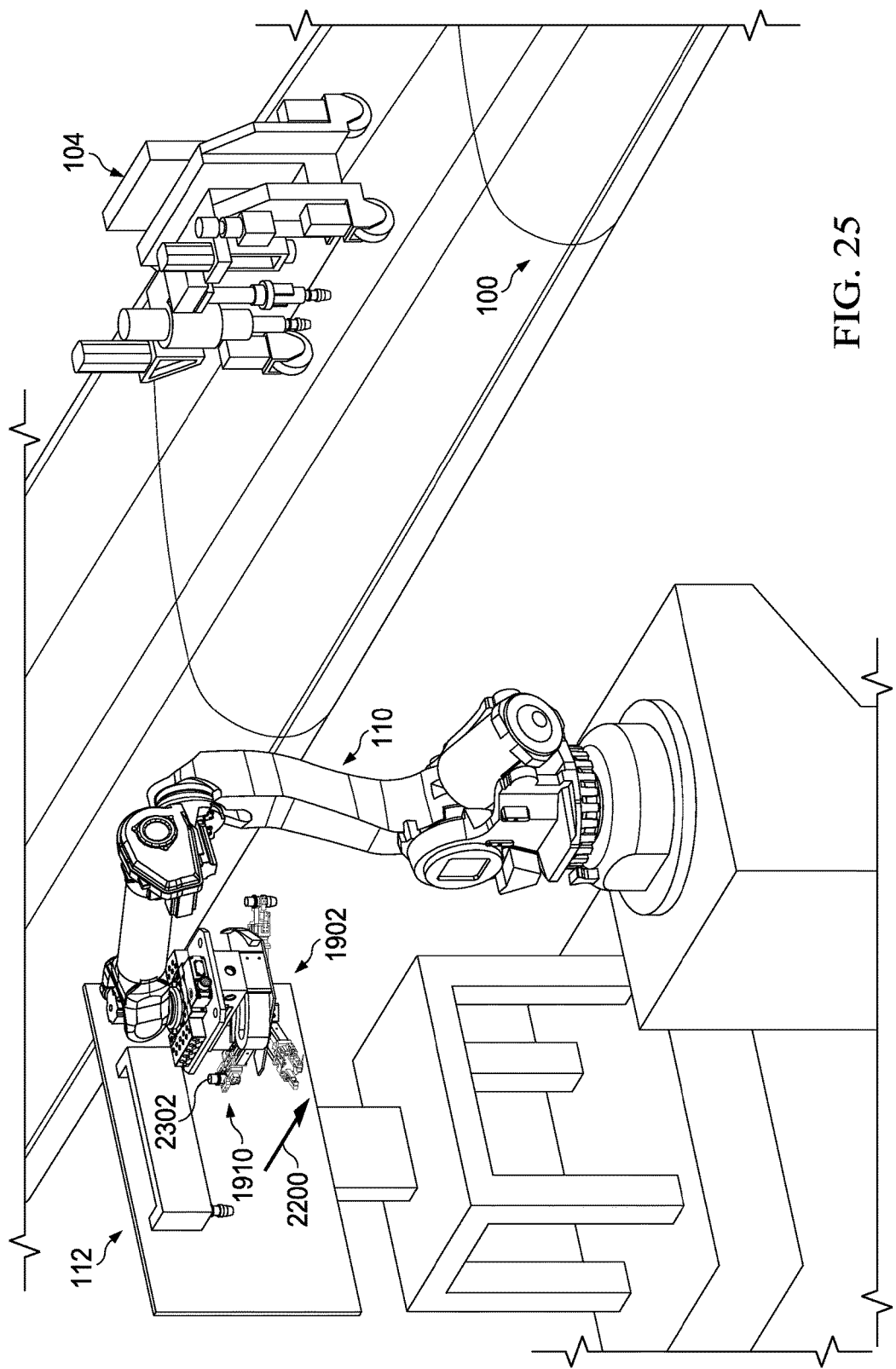
FIG. 25 is an illustration of a tool changer operating within a manufacturing environment in accordance with an illustrative embodiment.

As depicted in FIG. 25, robotic arm 110 may move tool changer 1902 in direction 2200 away from tool rack 112 to take second set of tools 2302 from tool rack 112. Second set of tools 2302 may be taken from tool rack 112 using second set of grippers 1910 of tool changer 1902.

Figure 26:
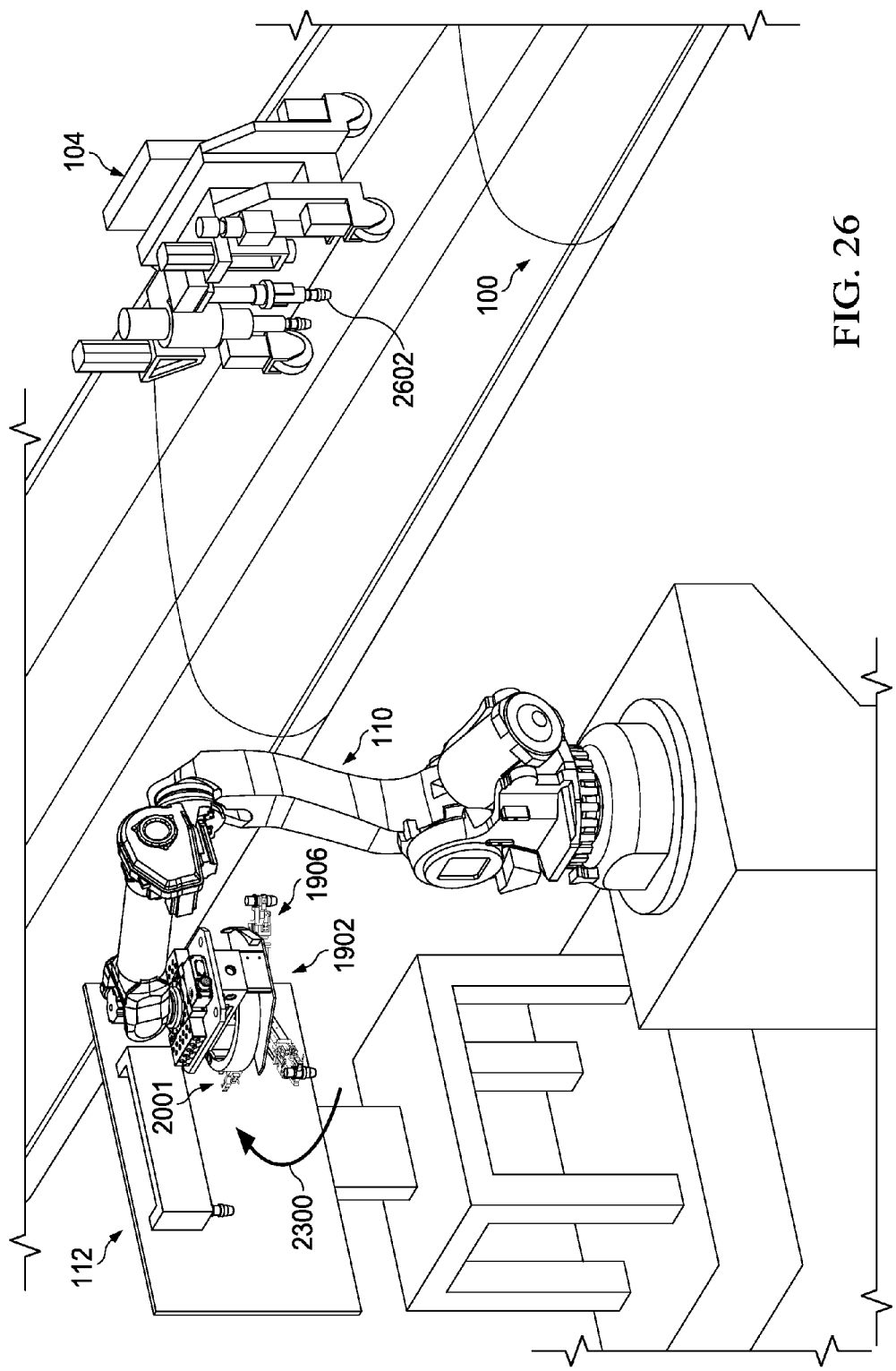
FIG. 26 is an illustration of a tool changer operating within a manufacturing environment in accordance with an illustrative embodiment.

As depicted in FIG. 26, rotating section 1906 may be rotated in direction 2300. By rotating in direction 2300, rotating section 1906 may be rotated such that third set of grippers 2001 are in a position for taking first set of old tools 2602 from crawler robot 104.

Figure 27:
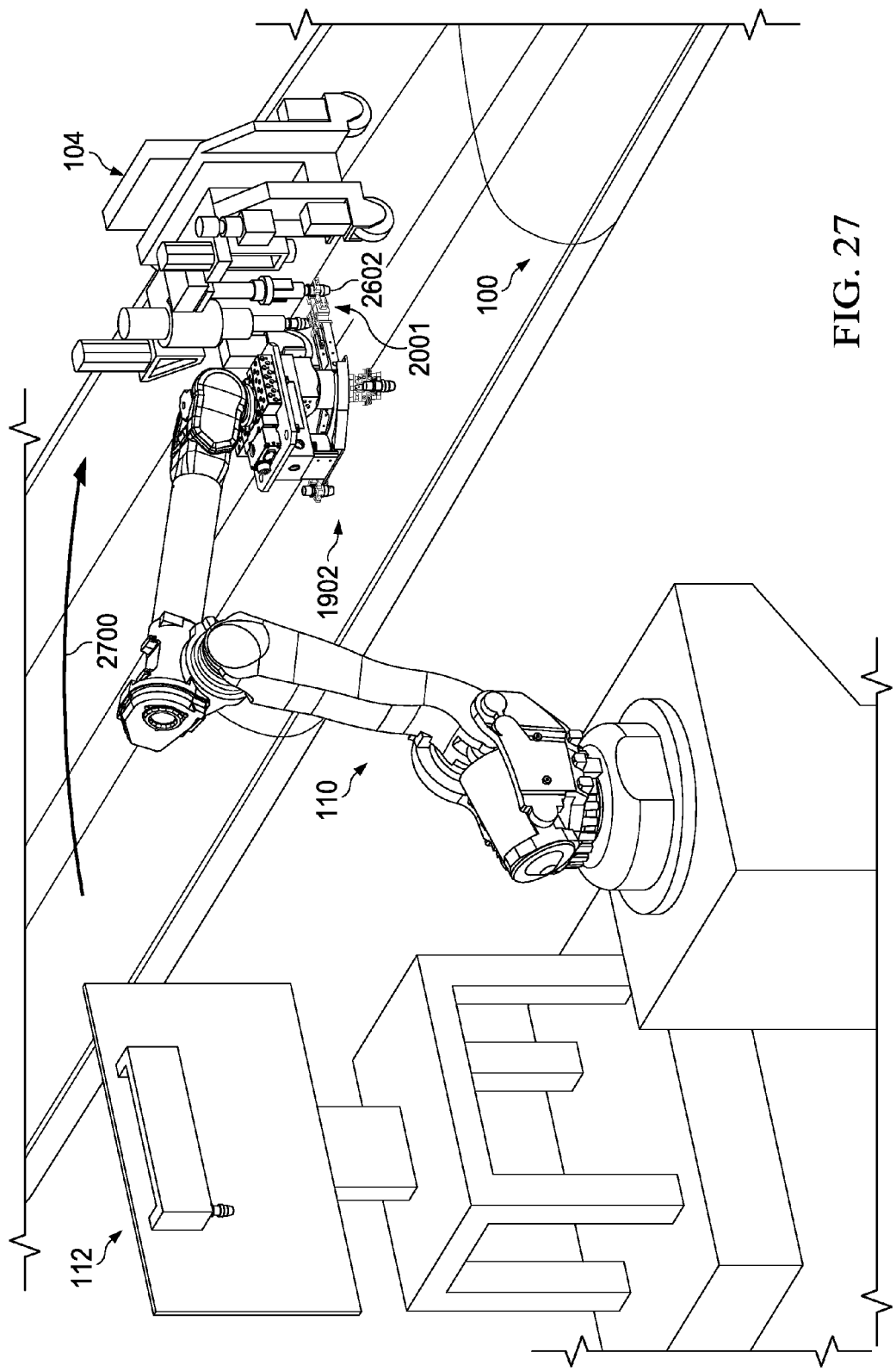
FIG. 27 is an illustration of a tool changer operating within a manufacturing environment in accordance with an illustrative embodiment.

As depicted in FIG. 27, robotic arm 110 may move tool changer 1902 in direction 2700. Robotic arm 110 may position third set of grippers 2001 relative to first set of old tools 2602.

Robotic arm 110 may have a vision system (not depicted) that may detect a location of crawler robot 104. Robotic arm 110 may move tool changer 1902 based on a location detected by the vision system (not depicted). In some illustrative examples, the vision system may be a three-dimensional camera system, such as three-dimensional camera system 4006 of FIG. 40.

Tool changer 1902 may have a sensor system, such as sensor system 906 of FIG. 9, that detects when a tool is in range of a gripper in third set of grippers 2001. Robotic arm 110 may move tool changer 1902 in direction 2700 towards first set of old tools 2602 and crawler robot 104 until a tool is in range of a gripper in third set of grippers 2001.

After positioning tool changer 1902 relative to crawler robot 104, third set of grippers 2001 may be placed into a closed position around first set of old tools 2602. Third set of grippers 2001 may hold first set of old tools 2602 when in the closed position.

Figure 28:
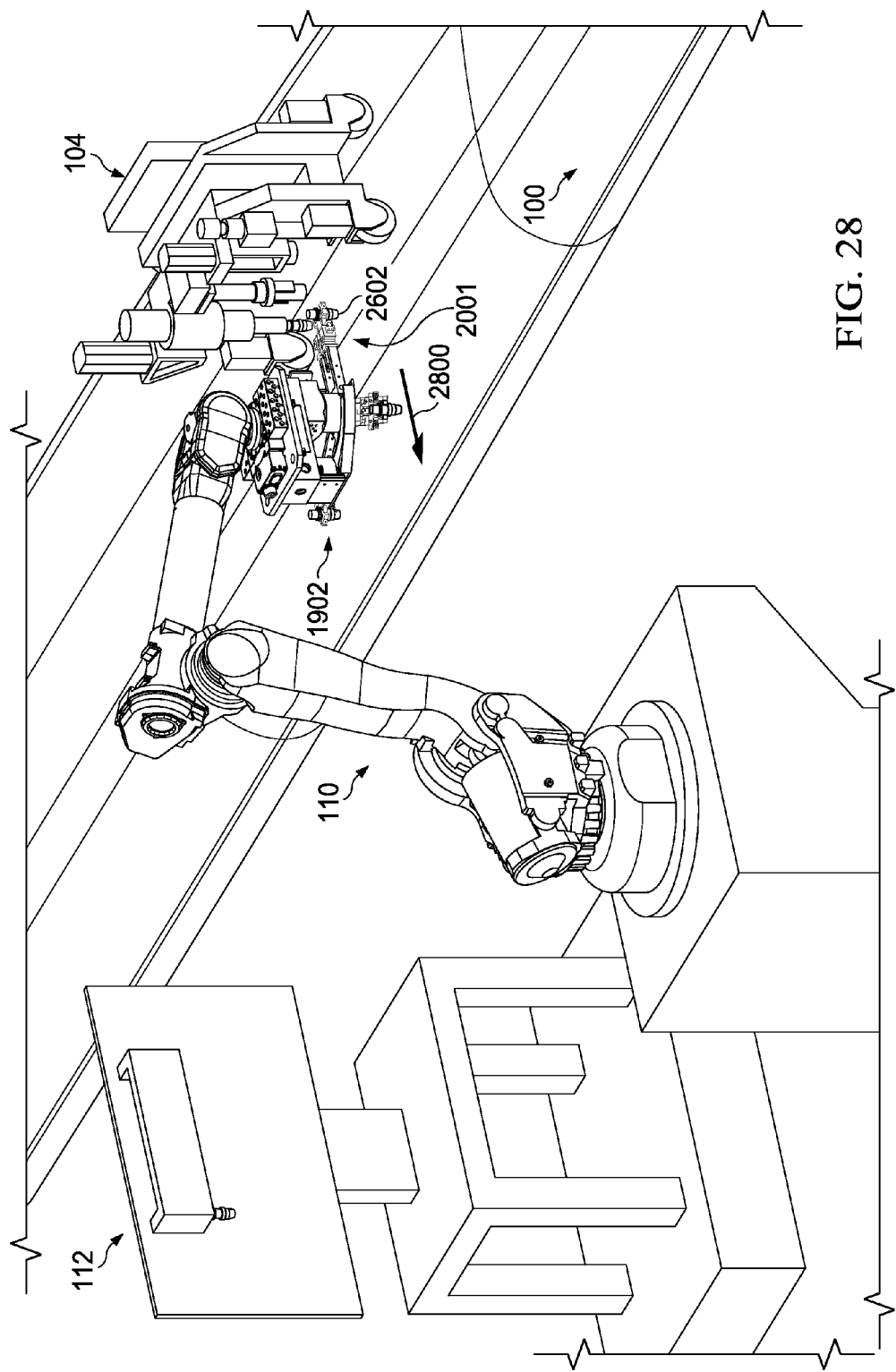
FIG. 28 is an illustration of a tool changer operating within a manufacturing environment in accordance with an illustrative embodiment.

As depicted in FIG. 28, robotic arm 110 may move tool changer 1902 in direction 2800 away from crawler robot 104 to take first set of old tools 2602 from crawler robot 104. First set of old tools 2602 may be taken from crawler robot 104 using third set of grippers 2001 of tool changer 1902.

Figure 29:
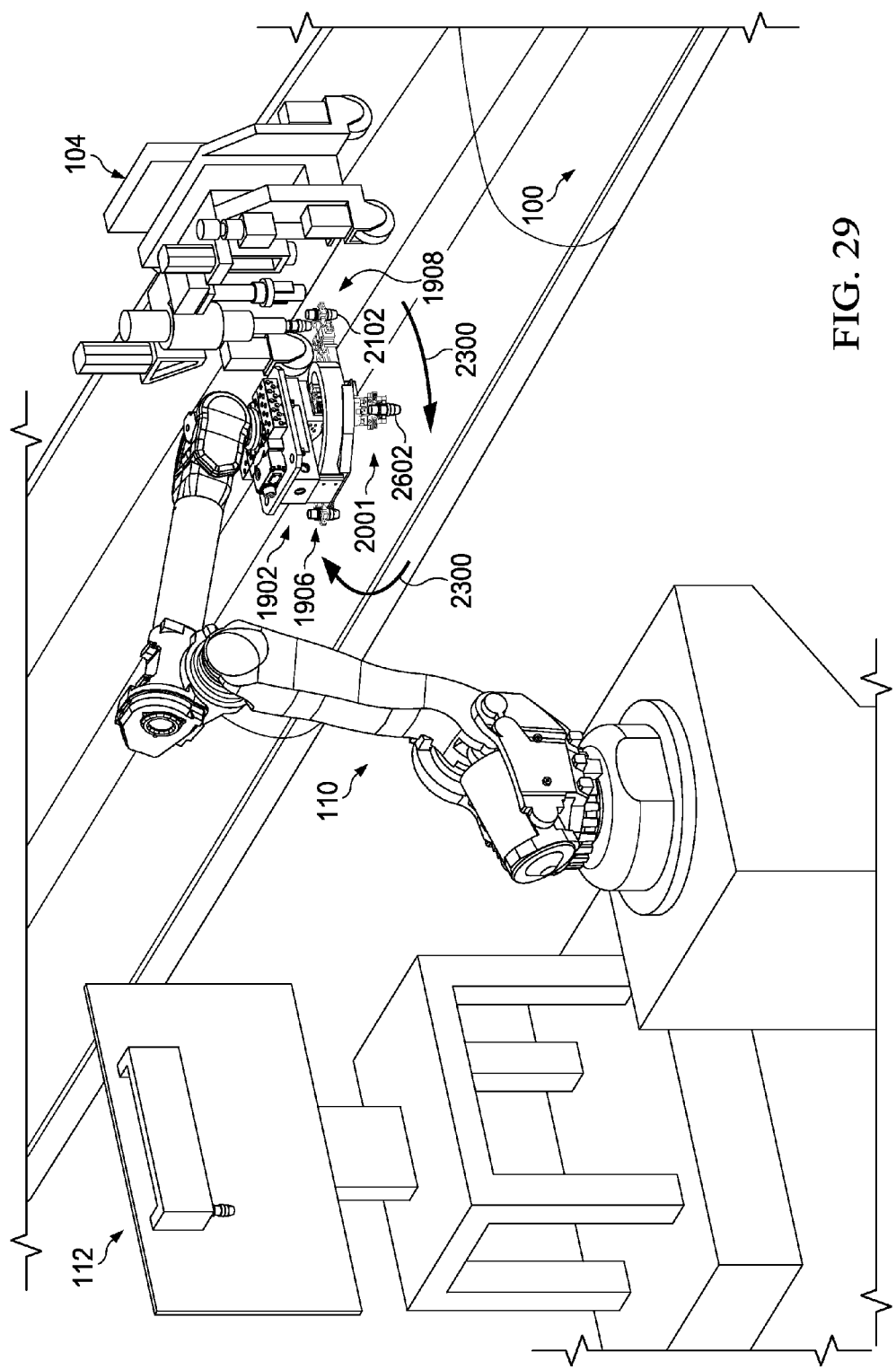
FIG. 29 is an illustration of a tool changer operating within a manufacturing environment in accordance with an illustrative embodiment.

As depicted in FIG. 29, rotating section 1906 may be rotated in direction 2300. By rotating in direction 2300, rotating section 1906 may be rotated such that first set of grippers 1908 are in a position for installing first set of tools 2102 into crawler robot 104.

Figure 30:
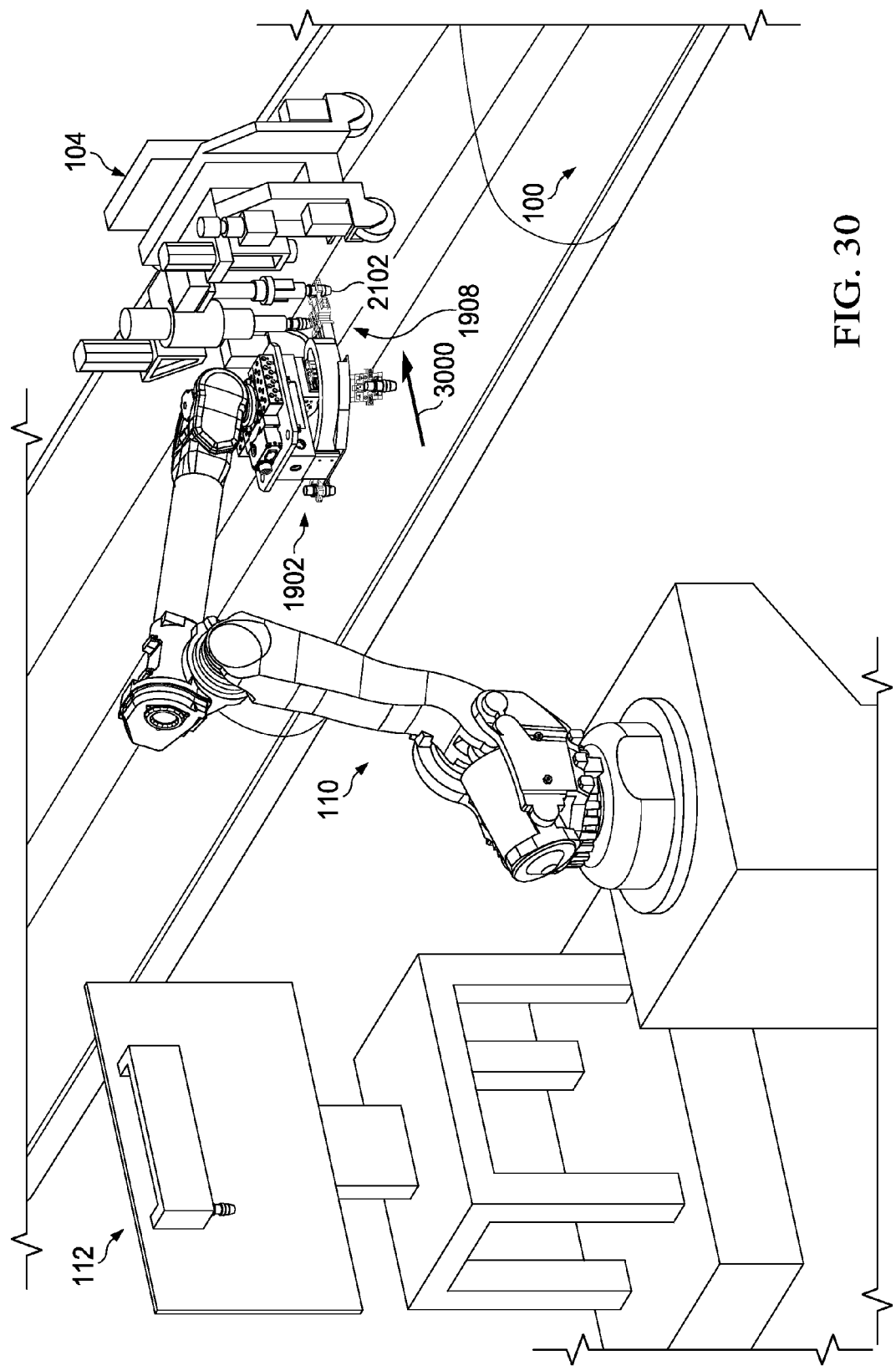
FIG. 30 is an illustration of a tool changer operating within a manufacturing environment in accordance with an illustrative embodiment.

As depicted in FIG. 30, robotic arm 110 may move tool changer 1902 in direction 3000 towards crawler robot 104. Robotic arm 110 may position first set of grippers 1908 relative to crawler robot 104. Tool changer 1902 may have a sensor system (not depicted) that detects a location of crawler robot 104. In some illustrative examples, robotic arm 110 may have a sensor system that detects a location of crawler robot 104. In some illustrative examples, the sensor system may be a vision system, such as three-dimensional camera system 4006 of FIG. 40. In some illustrative examples, robotic arm 110 may move tool changer 1902 in direction 3000 towards crawler robot 104 until first set of grippers 1908 reach a position relative to the location of crawler robot 104 detected using a sensor system (not depicted) associated with either tool changer 1902 or robotic arm 110. Robotic arm 110 may move tool changer 1902 in direction 3000 towards crawler robot 104 until first set of tools 2102 and first set of grippers 1908 are positioned such that first set of tools 2102 may be inserted into crawler robot 104.

After moving tool changer 1902 in direction 3000 towards crawler robot 104, first set of tools 2102 may be inserted into crawler robot 104. After inserting first set of tools 2102 into crawler robot 104, first set of grippers 1908 may be placed into an open position.

Figure 31:
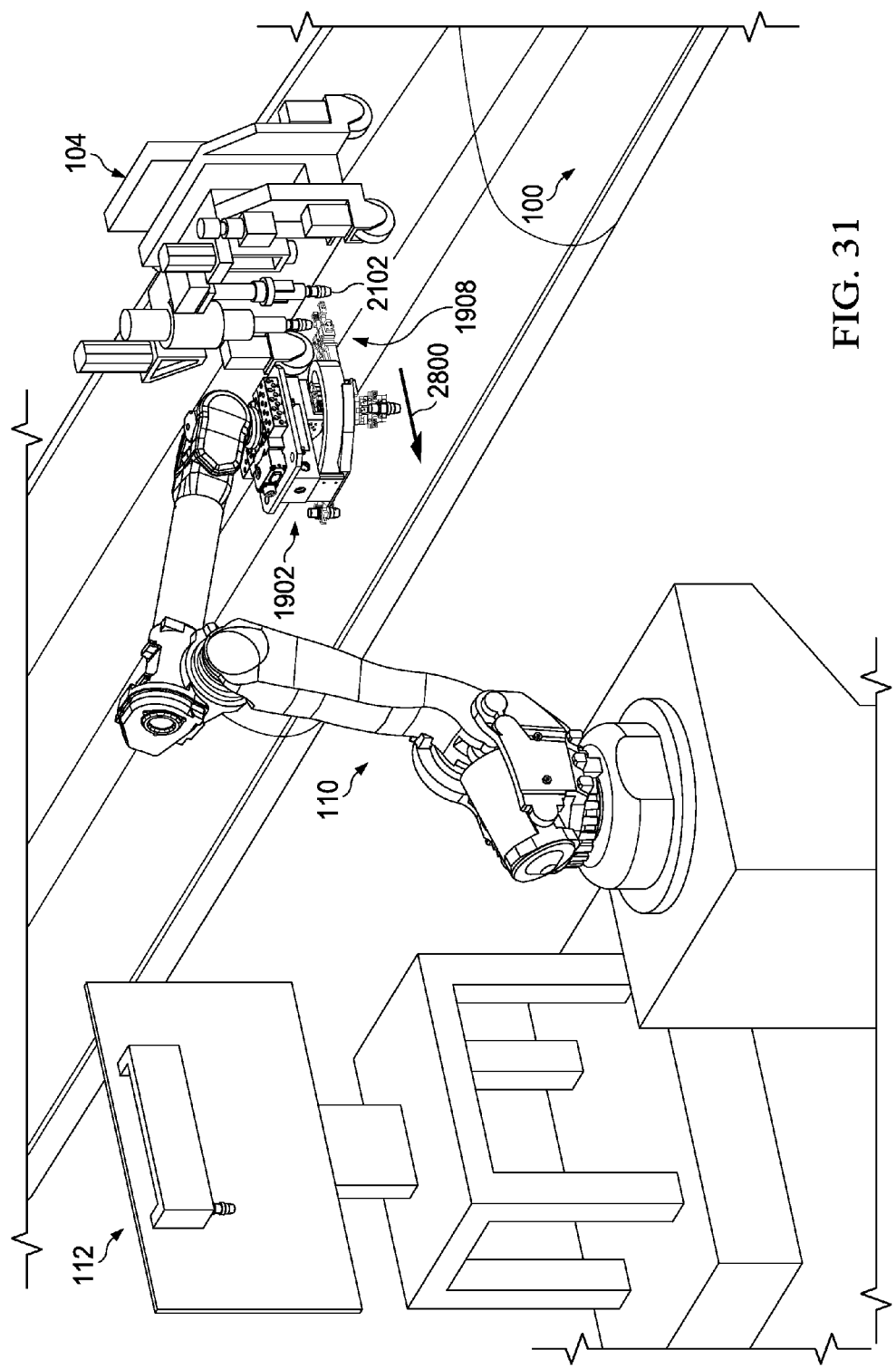
FIG. 31 is an illustration of a tool changer operating within a manufacturing environment in accordance with an illustrative embodiment.
Figure 32:
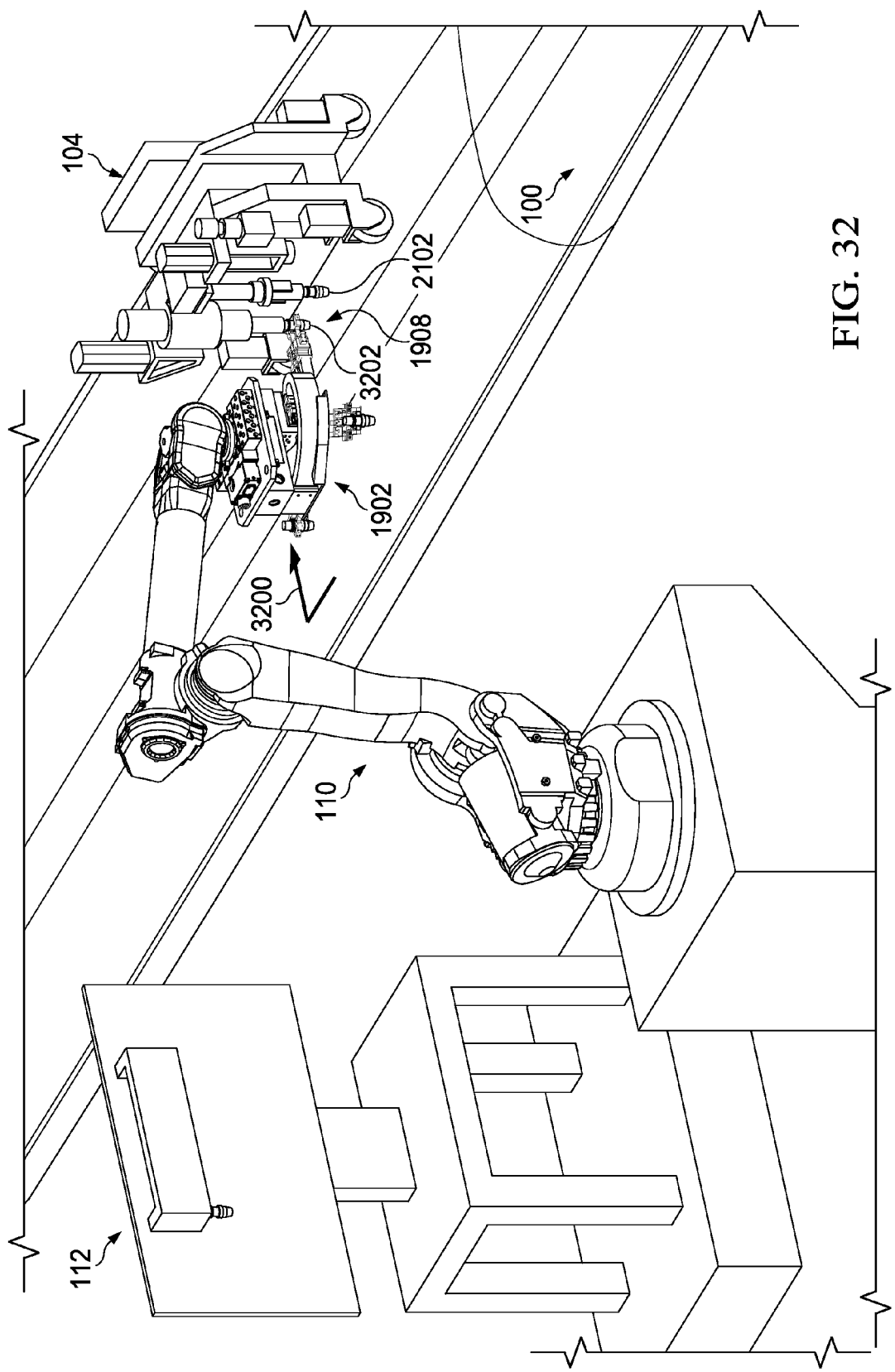
FIG. 32 is an illustration of a tool changer operating within a manufacturing environment in accordance with an illustrative embodiment.

As depicted in FIG. 31, robotic arm 110 may move tool changer 1902 in direction 2800 away from crawler robot 104. As depicted in FIG. 32, robotic arm 110 may move tool changer 1902 in direction 3200 towards crawler robot 104. Robotic arm 110 may position first set of grippers 1908 relative to second set of old tools 3202.

After positioning tool changer 1902 relative to crawler robot 104, first set of grippers 1908 may be placed into a closed position around second set of old tools 3202. First set of grippers 1908 may hold second set of old tools 3202 when in the closed position.

Figure 33:
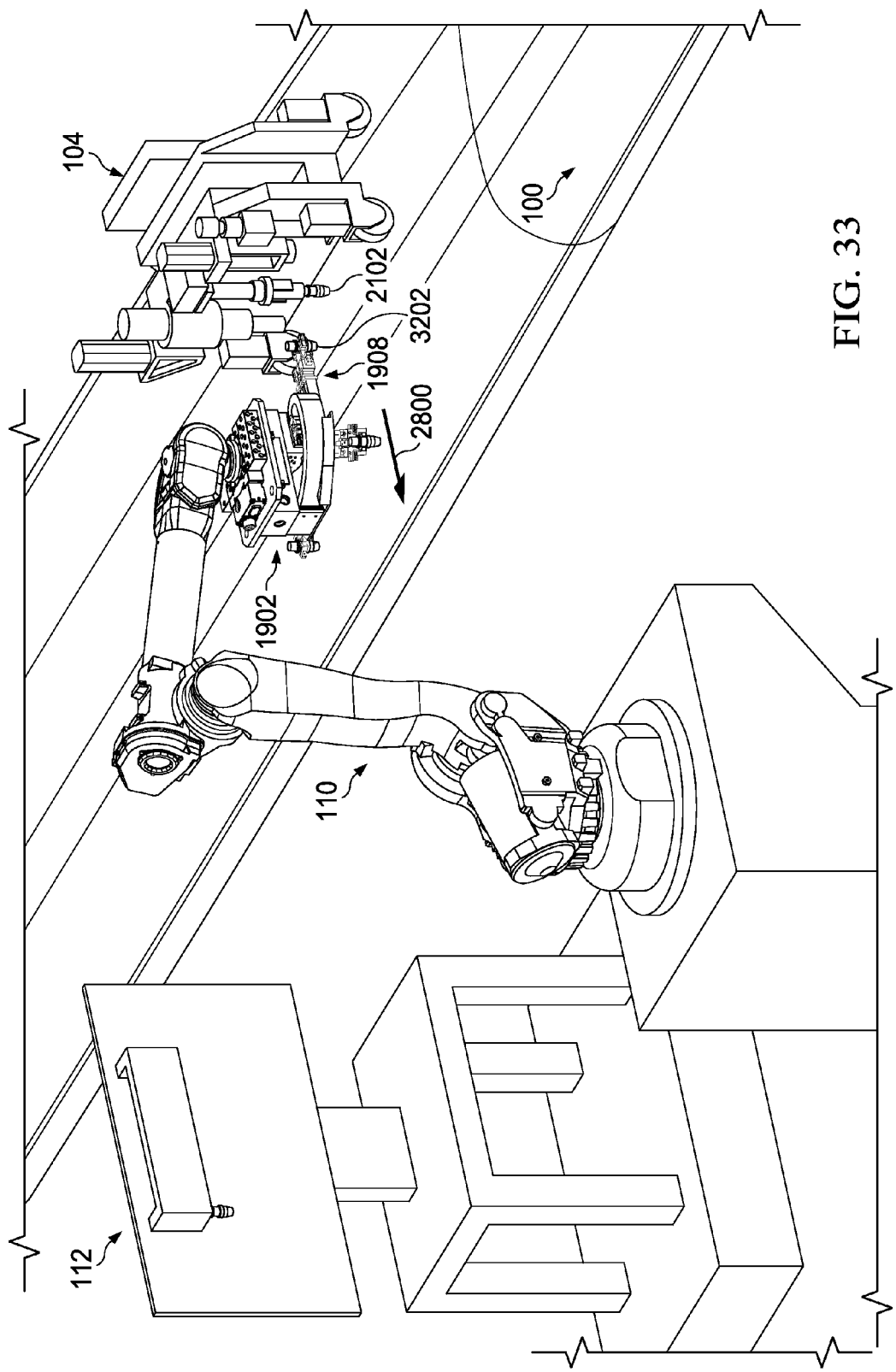
FIG. 33 is an illustration of a tool changer operating within a manufacturing environment in accordance with an illustrative embodiment.

As depicted in FIG. 33, robotic arm 110 may move tool changer 1902 in direction 2800 away from crawler robot 104 to take second set of old tools 3202 from crawler robot 104. Second set of old tools 3202 may be taken from crawler robot 104 using first set of grippers 1908 of tool changer 1902.

Figure 34:
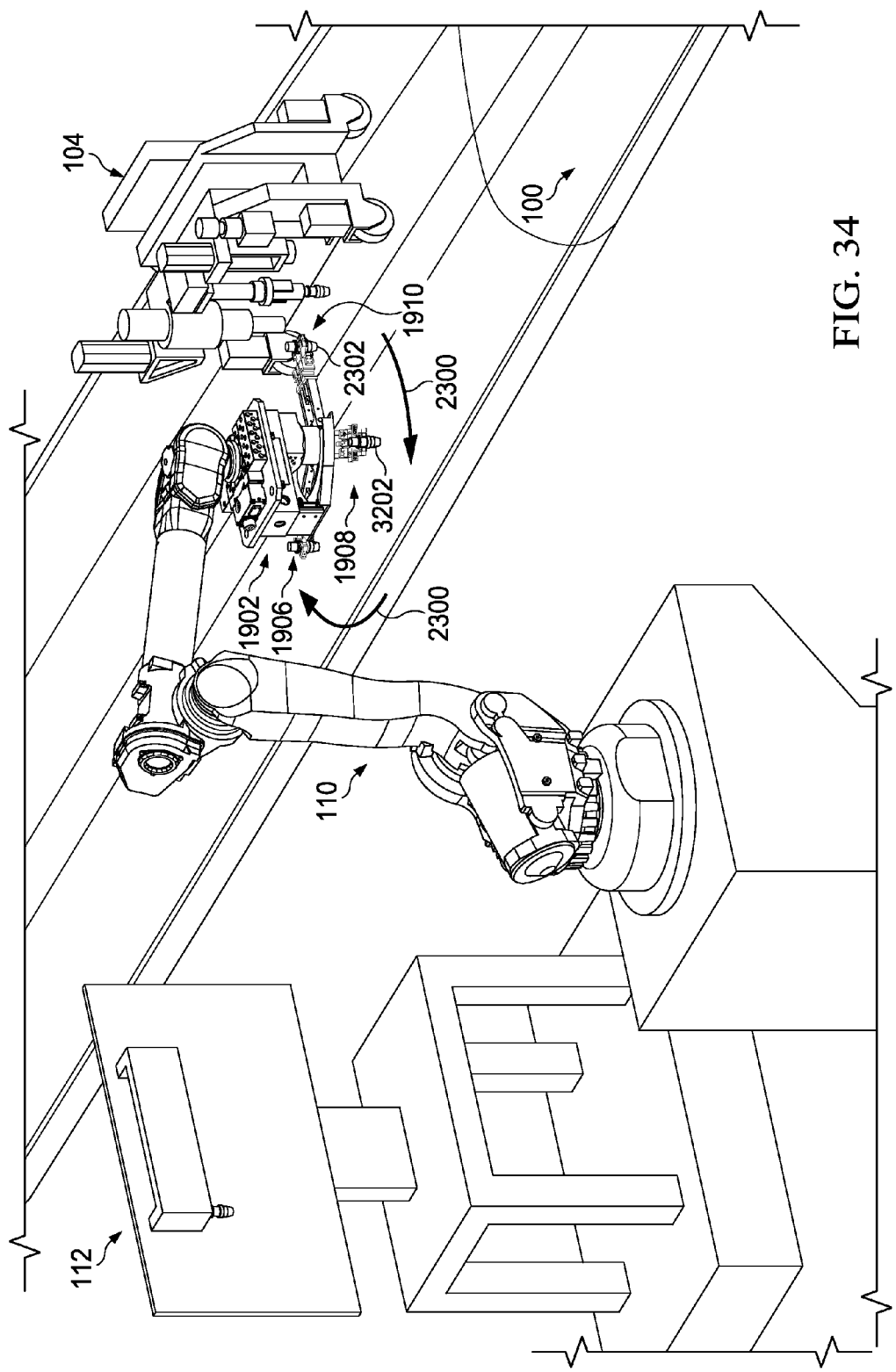
FIG. 34 is an illustration of a tool changer operating within a manufacturing environment in accordance with an illustrative embodiment.

As depicted in FIG. 34, rotating section 1906 may be rotated in direction 2300. By rotating in direction 2300, rotating section 1906 may be rotated such that second set of grippers 1910 are in a position for installing second set of tools 2302 into crawler robot 104.

Figure 35:
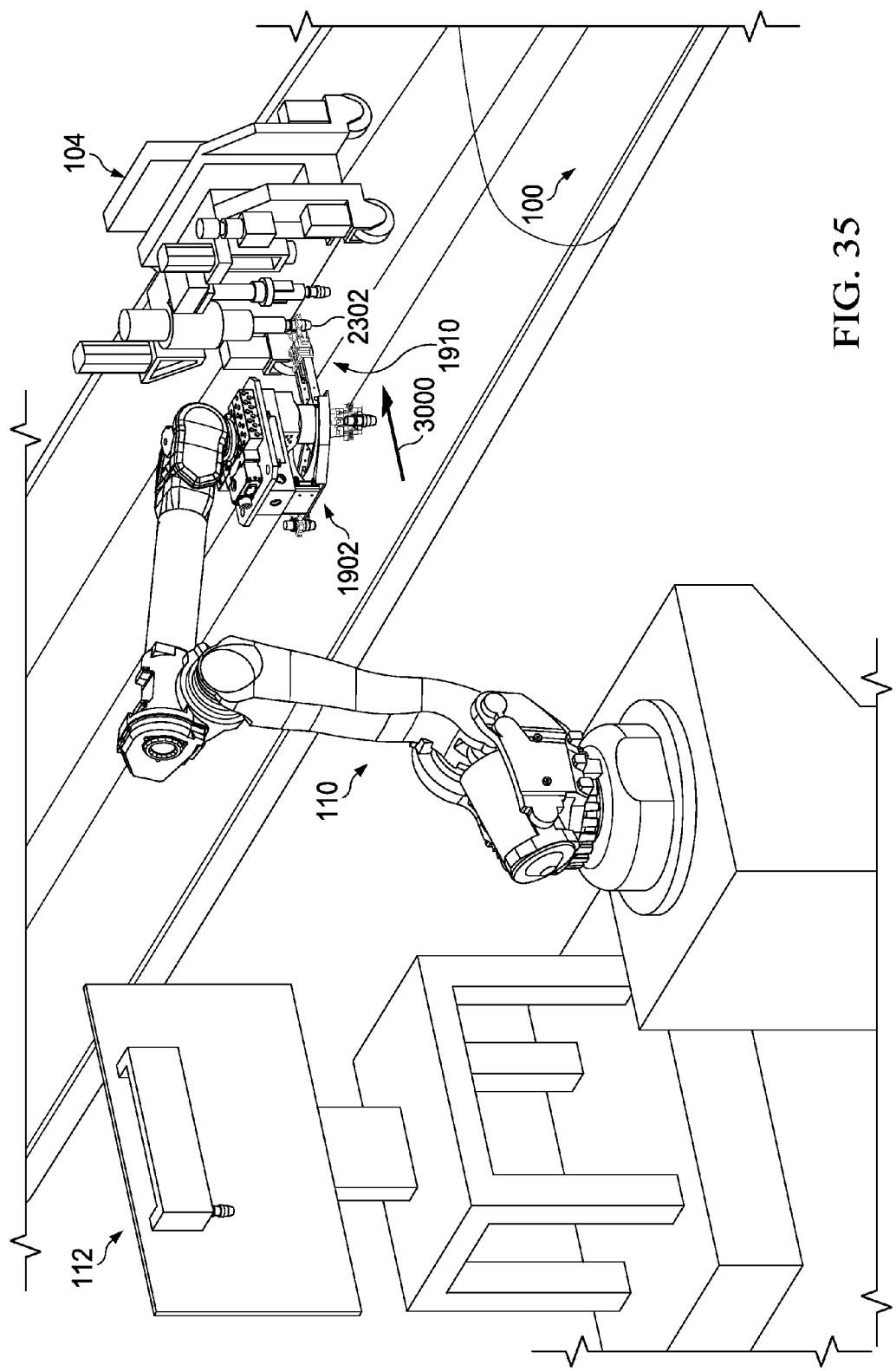
FIG. 35 is an illustration of a tool changer operating within a manufacturing environment in accordance with an illustrative embodiment.

As depicted in FIG. 35, robotic arm 110 may move tool changer 1902 in direction 3000 towards crawler robot 104. Robotic arm 110 may position second set of grippers 1910 relative to crawler robot 104. Tool changer 1902 may have a sensor system, such as sensor system 906 of FIG. 9, that detects a location of crawler robot 104. In some illustrative examples, robotic arm 110 may have a sensor system that detects a location of crawler robot 104. In some illustrative examples, the sensor system may be a three-dimensional camera system, such as three-dimensional camera system 4006 of FIG. 40. In some illustrative examples, robotic arm 110 may move tool changer 1902 in direction 3000 towards crawler robot 104 until second set of grippers 1910 reach a position relative to the location of crawler robot 104 detected using a sensor system (not depicted) associated with either tool changer 1902 or robotic arm 110. Robotic arm 110 may move tool changer 1902 in direction 3000 towards crawler robot 104 until second set of tools 2302 and second set of grippers 1910 are positioned such that second set of tools 2302 may be inserted into crawler robot 104.

After moving tool changer 1902 in direction 3000 towards crawler robot 104, second set of tools 2302 may be inserted into crawler robot 104. After inserting second set of tools 2302 into crawler robot 104, second set of grippers 1910 may be placed into an open position.

After inserting second set of tools 2302 into crawler robot 104, robotic arm 110 may move tool changer 1902 away from crawler robot 104. Afterwards, crawler robot 104 may perform operations on wing 100 using set of new tools 1102 as shown in FIG. 11. After inserting set of new tools 1102 into crawler robot 104, robotic arm 110 may move tool changer 1902 towards tool rack 112. Tool changer 1902 may then store set of old tools 302 as shown in FIG. 13 in tool rack 112.

Figure 36:
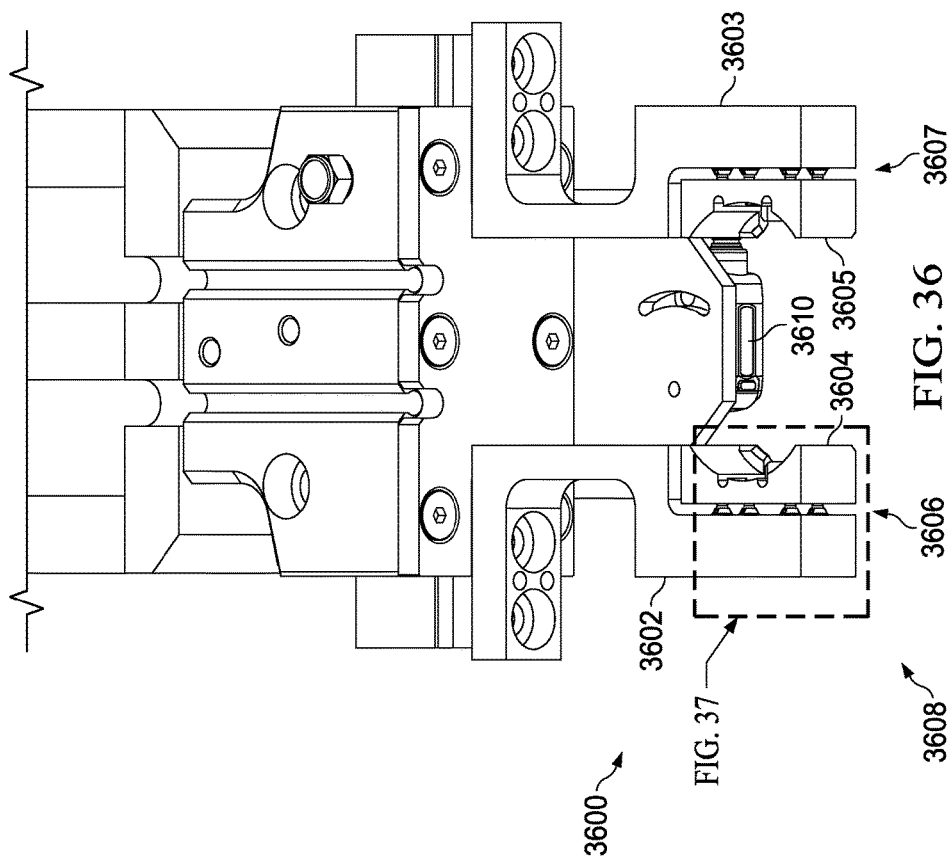
FIG. 36 is an illustration of a front view of a gripper in accordance with an illustrative embodiment.

Turning now to FIG. 36, an illustration of a front view of a gripper is depicted in accordance with an illustrative embodiment. Gripper 3600 may be a physical implementation of first gripper 248 of FIG. 2. As depicted, gripper 3600 may have arm 3602, arm 3603, tool interface portion 3604, and tool interface portion 3605. Tool interface portion 3604 may be associated with arm 3602 through biasing members 3606. Tool interface portion 3605 may be associated with arm 3603 through biasing members 3607. As illustrated, biasing members 3606 and biasing members 3607 may take the form of ball plungers 3608. Biasing members 3606 and biasing members 3607 may allow for movement after gripper 3600 engages a tool. For example, biasing members 3606 and biasing members 3607 may compensate for the tolerances in movements of at least one of a tool changer or a robotic arm. For example, biasing members 3606 and biasing members 3607 may compensate for tolerances of at least one of a sliding section of a tool changer, a rotating section of the tool changer, or the movement of the robotic arm. Biasing members 3606 and biasing members 3607 may be used to allow for some compliance when gripping a tool.

Gripper 3600 may have sensor 3610. Sensor 3610 may be a physical implementation of a sensor of sensor system 4338 of FIG. 43. Sensor 3610 may detect when a tool is in range of gripper 3600. Sensor 3610 may detect when gripper 3600 is in an open position or a closed position. Sensor 3610 may detect when a tool is held by gripper 3600. Sensor 3610 may take the form of at least one of a piezoelectric sensor, an inductive sensor, a capacitive sensor, a laser sensor, or a magnetic sensor. In some illustrative examples, gripper 3600 may have a second sensor such that sensor 3610 may detect a first condition and the second sensor may detect a second condition. For example, a second sensor may detect at least one of when a tool is positioned within gripper 3600, when gripper 3600 is open, or other desirable condition. The second sensor may be at least one of a pressure sensor, a piezoelectric sensor, an inductive sensor, a capacitive sensor, a laser sensor, a magnetic sensor, or other desirable type of sensor. As one illustrative example, a second sensor may sense when a tool is positioned within gripper 3600 by a change in force need to bring the arms of gripper 3600 together.

Figure 37:
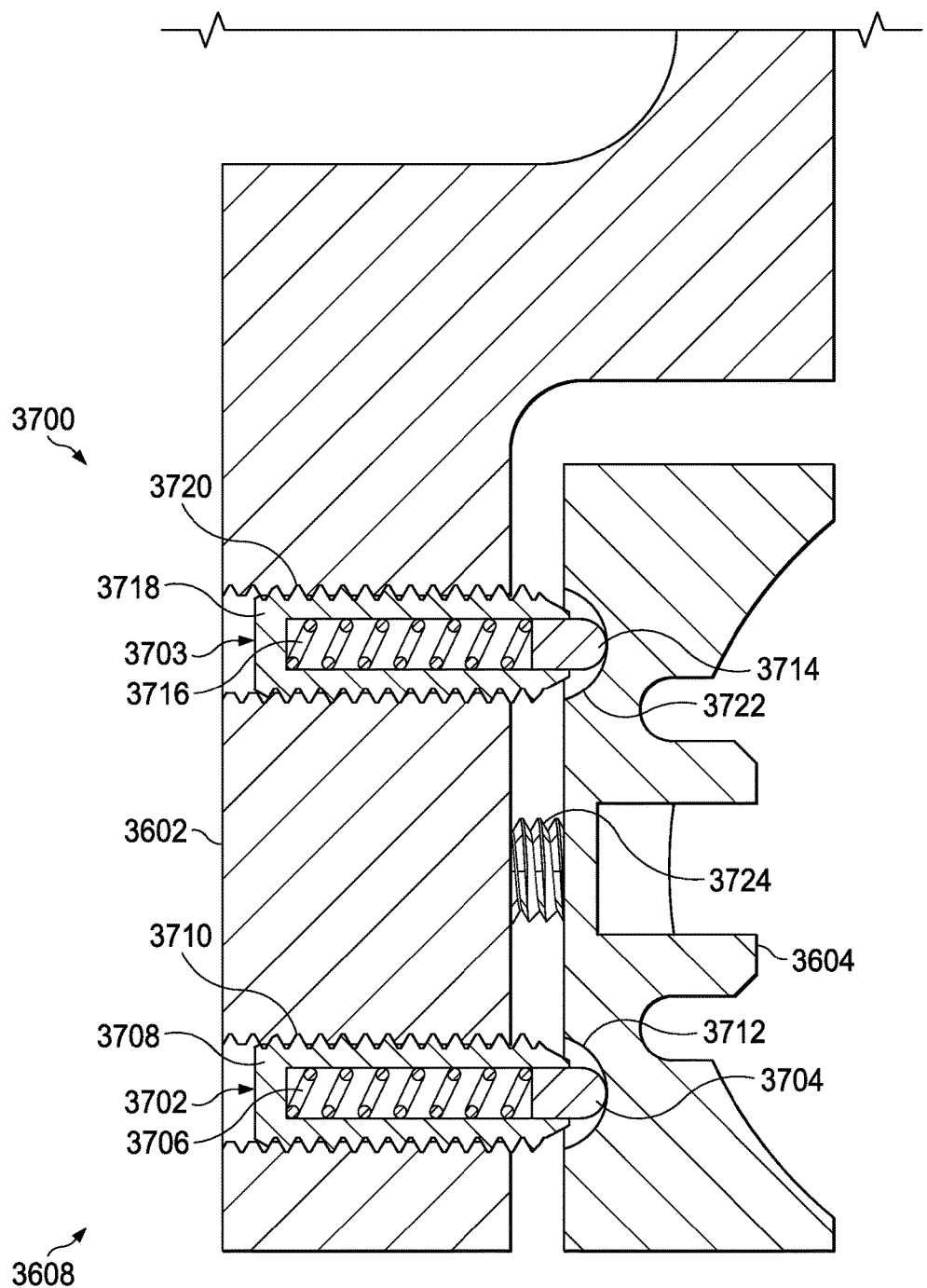
FIG. 37 is an illustration of a cross-sectional view of a gripper in accordance with an illustrative embodiment.

Turning now to FIG. 37, an illustration of a horizontal section cut view of a gripper is depicted in accordance with an illustrative embodiment. View 3700 may be a view of gripper 3600 along cross-section 37-37 and within the box labeled FIG. 37 shown in FIG. 36.

In one illustrative example, ball plungers 3608 may include ball plunger 3702 and ball plunger 3703. Ball plunger 3702 may include ball 3704 biased towards tool interface portion 3604 by spring 3706. Spring 3706 may be contained within housing 3708. Housing 3708 may have threads 3710 which may interact with arm 3602. Housing 3708 may facilitate installation of spring 3706 and ball 3704 relative to arm 3602.

Ball 3704 may interface with tool interface portion 3604 at ball detent 3712. Ball detent 3712 may be a mating hole for ball 3704. Ball detent 3712 may be formed into the material of tool interface portion 3604. In some illustrative examples, ball detent 3712 may be formed into tool interface portion 3604 through machining. In some illustrative examples, ball detent 3712 may be formed into tool interface portion 3604 through die forming. In some illustrative examples, ball detent 3712 may be a component which is coupled to tool interface portion 3604.

Ball plunger 3703 may also include similar components to ball plunger 3702. For example, ball plunger 3703 may include ball 3714 biased towards tool interface portion 3604 by spring 3716. Spring 3716 may be contained within housing 3718. Housing 3718 may have threads 3720 which may interact with arm 3602. Ball 3714 may interface with tool interface portion 3604 at ball detent 3722. Ball detent 3722 may be a mating hole for ball 3704. Fastener 3724 may limit the distance that tool interface portion 3604 may move away from arm 3602.

Figure 38:
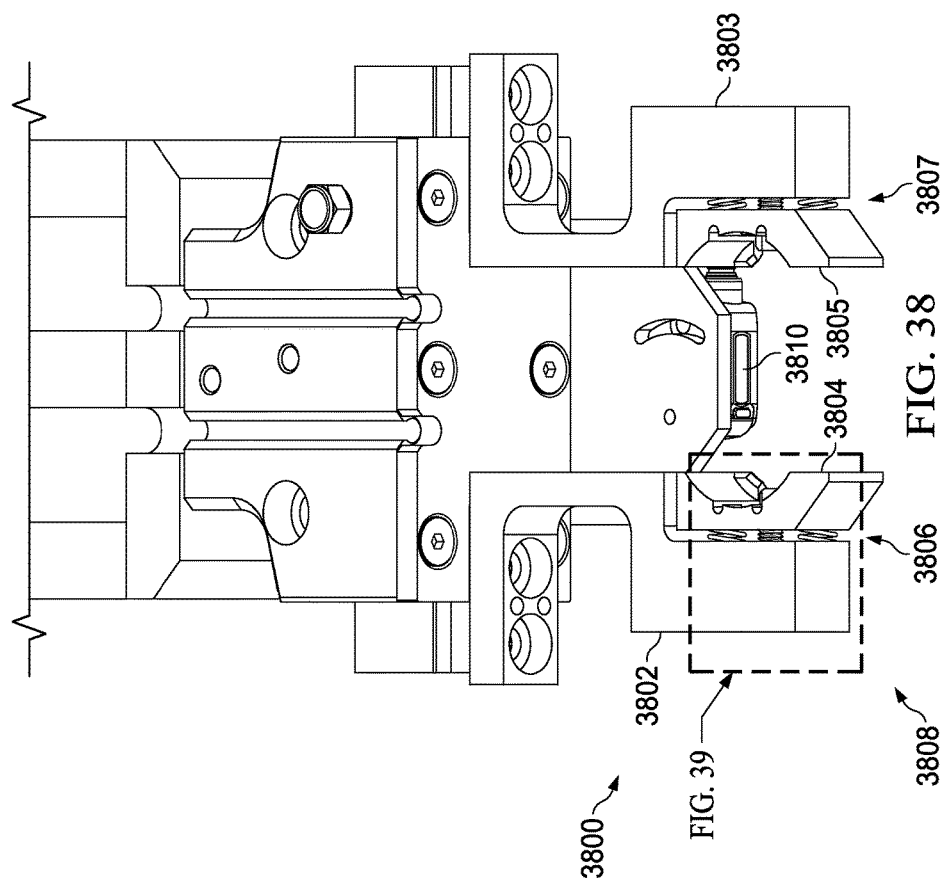
FIG. 38 is an illustration of a front view of a gripper in accordance with an illustrative embodiment.

Turning now to FIG. 38, an illustration of a front view of a gripper is depicted in accordance with an illustrative embodiment. Gripper 3800 may be a physical implementation of first gripper 248 of FIG. 2. As depicted, gripper 3800 may have arm 3802, arm 3803, tool interface portion 3804, and tool interface portion 3805. Tool interface portion 3804 may be associated with arm 3802 through biasing members 3806. Tool interface portion 3805 may be associated with arm 3803 through biasing members 3807. As illustrated, biasing members 3806 and biasing members 3807 may take the form of compression springs 3808. Biasing members 3806 and biasing members 3807 may allow for movement after gripper 3800 engages a tool. For example, biasing members 3806 and biasing members 3807 may compensate for the tolerances in movements of at least one of a tool changer or a robotic arm. For example, biasing members 3806 and biasing members 3807 may compensate for tolerances of at least one of a sliding section of a tool changer, a rotating section of the tool changer, or the movement of the robotic arm.

Gripper 3800 may have sensor 3810. Sensor 3810 may detect when a tool is in range of gripper 3800. Sensor 3810 may detect when gripper 3800 is in an open position or a closed position. Sensor 3810 may detect when a tool is held by gripper 3800. Sensor 3810 may take the form of at least one of a piezoelectric sensor, an inductive sensor, a capacitive sensor, a laser sensor, or a magnetic sensor. In some illustrative examples, gripper 3800 may have a second sensor such that sensor 3810 may detect a first condition and the second sensor may detect a second condition.

Figure 39:
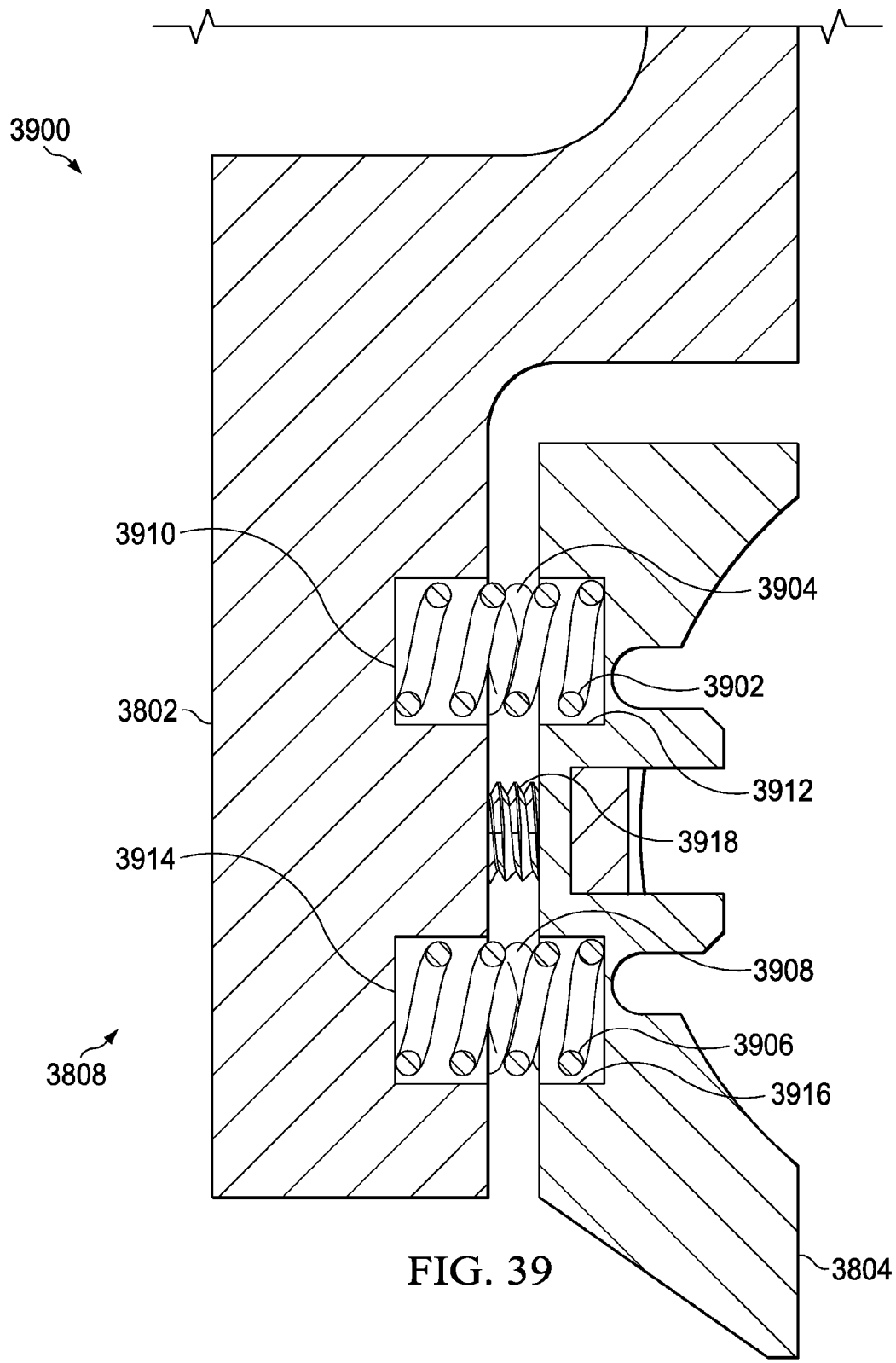
FIG. 39 is an illustration of a cross-sectional view of a gripper in accordance with an illustrative embodiment.

Turning now to FIG. 39, an illustration of a cross-sectional view of a gripper is depicted in accordance with an illustrative embodiment. View 3900 may be a view of gripper 3800 along cross-section 39-39 and within the box labeled FIG. 39 shown in FIG. 38.

In one illustrative example, compression springs 3808 may include compression spring 3902, compression spring 3904, compression spring 3906, and compression spring 3908. Compression spring 3902 may be associated with arm 3802 via hole 3910. Compression spring 3902 may be associated with tool interface portion 3804 via hole 3912. Compression spring 3906 may be associated with arm 3802 via hole 3914. Compression spring 3906 may be associated with tool interface portion 3804 via hole 3916. (Fastener 3918 may limit the distance that tool interface portion 3804 may move away from arm 3802.

Figure 40:
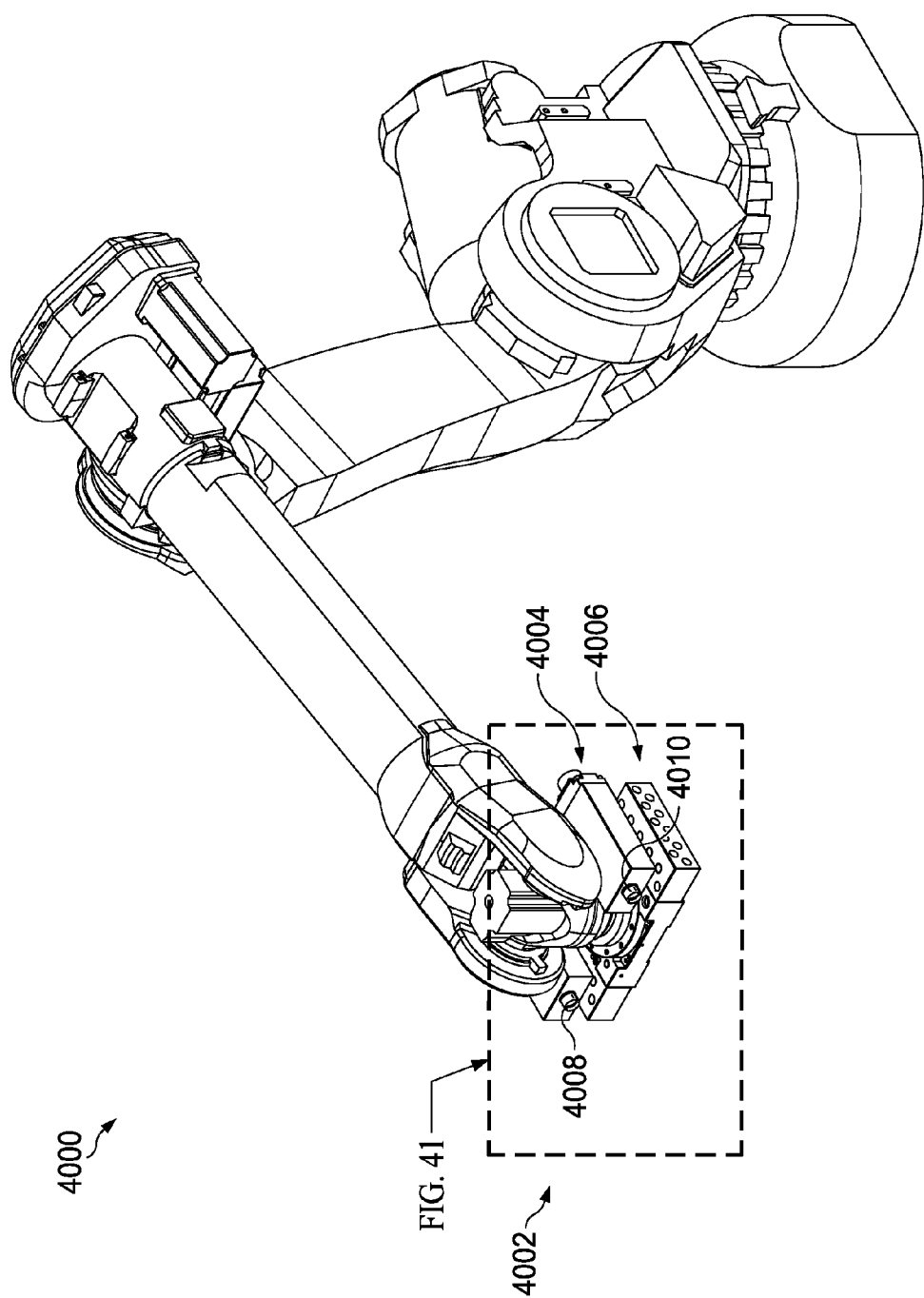
FIG. 40 is an illustration of an isometric view of a robotic arm in accordance with an illustrative embodiment.

Turning now to FIG. 40, an illustration of an isometric view of a robotic arm is depicted in accordance with an illustrative embodiment. Robotic arm 4000 may be a physical implementation of robotic arm 210 of FIG. 2. Robotic arm 4000 may be a depiction of robotic arm 110 with an additional sensor system.

Robotic arm 4000 may have connector 4002. Connector 4002 may connect robotic arm 4000 to an end effector. Connector 4002 may connect robotic arm 4000 to a tool changer such as tool changer 108 in FIG. 1, tool changer 1902 in FIG. 19, or tool changer 204 shown in block form in FIG. 2.

Robotic arm 4000 may also have sensor system 4004. Sensor system 4004 may be a physical implementation of sensor system 284 of FIG. 2. Sensor system 4004 may include three-dimensional camera system 4006. Three-dimensional camera system 4006 may be used to determine a location of a crawler or another object within a manufacturing environment.

Three-dimensional camera system 4006 may have first camera 4008 and second camera 4010. First camera 4008 and second camera 4010 may be positioned so that each of first camera 4008 and second camera 4010 has a different perspective. By first camera 4008 and second camera 4010 having different perspectives, three-dimensional camera system 4006 may mimic depth perception. Each of first camera 4008 and second camera 4010 may be positioned such that they have a specific focal length.

First camera 4008 and second camera 4010 may be used to locate a reference point such as a vision target. The vision target may take the form of a fiducial. A fiducial may be an object placed in the field of view of three-dimensional camera system 4006. A fiducial may appear in the image produced. A fiducial may be used as a point of reference. A fiducial may be placed onto the crawler robot, such as crawler robot 104 in FIG. 1.

Although three-dimensional camera system 4006 is depicted as having two cameras, three-dimensional camera system 4006 may have any desirable number of cameras. In some illustrative examples, three-dimensional camera system 4006 may have two or more cameras.

Three-dimensional camera system 4006 may be used to determine the location of crawler robot 104 on wing 100 prior to moving a tool changer, such as tool changer 108 or tool changer 1902 towards crawler robot 104. Three-dimensional camera system 4006 may be directed generally towards crawler robot 104 based on other sensor data. For example, a location of crawler robot 104 may be determined by a real-time locating system. The real-time locating system may use at least one of radio frequency communication, optical technology, infrared technology, acoustic technology, or ultrasound tags. Fixed reference points such as transmitters, receivers, or both may be attached to crawler robot 104.

The location of crawler robot 104 determined using the real-time locating system may not be accurate enough to move and position tool changer 108 or tool changer 1902 relative to crawler robot 104. Three-dimensional camera system 4006 may be directed towards the location determined using the real-time locating system. In some illustrative examples, the real-time locating system may be a form of a global positioning system (GPS). In some illustrative examples, the real-time locating system uses a signal from crawler robot 104 to determine the location. Three-dimensional camera system 4006 may then be used to determine a more accurate location of crawler robot 104. The location determined by three-dimensional camera system 4006 may be used to position tool changer 108 or tool changer 1902 relative to crawler robot 104. In some illustrative examples, three-dimensional camera system 4006 may perform a frame adjustment routine multiple times before determining the more accurate location of crawler robot 104. This more accurate location may then be used to position the tool changer to exchange a set of old tools from crawler robot 104. In one illustrative example, three-dimensional camera system 4006 may perform a frame adjustment routine three times before determining the more accurate location of crawler robot 104.

Figure 41:
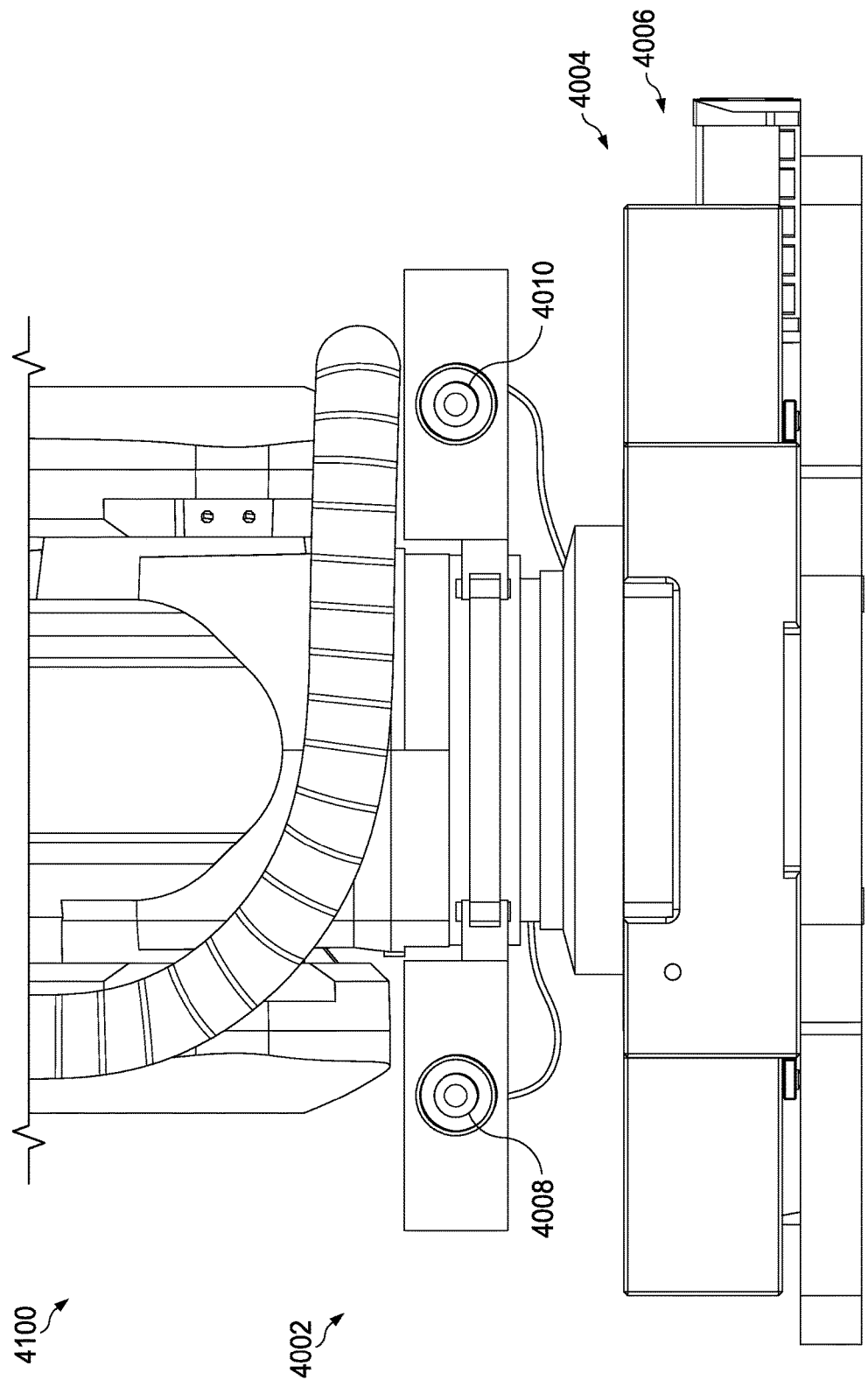
FIG. 41 is an illustration of a front view of a portion of a robotic arm in accordance with an illustrative embodiment.

Turning now to FIG. 41, an illustration of a front view of a portion of a robotic arm is depicted in accordance with an illustrative embodiment. View 4100 may be a view of robotic arm 4000 within the box labeled FIG. 41 in FIG. 40. Robotic arm 4000 may be a physical implementation of robotic arm 210 of FIG. 2. View 4100 may be a depiction of a portion of robotic arm 110 with an additional sensor system.

Figure 42:
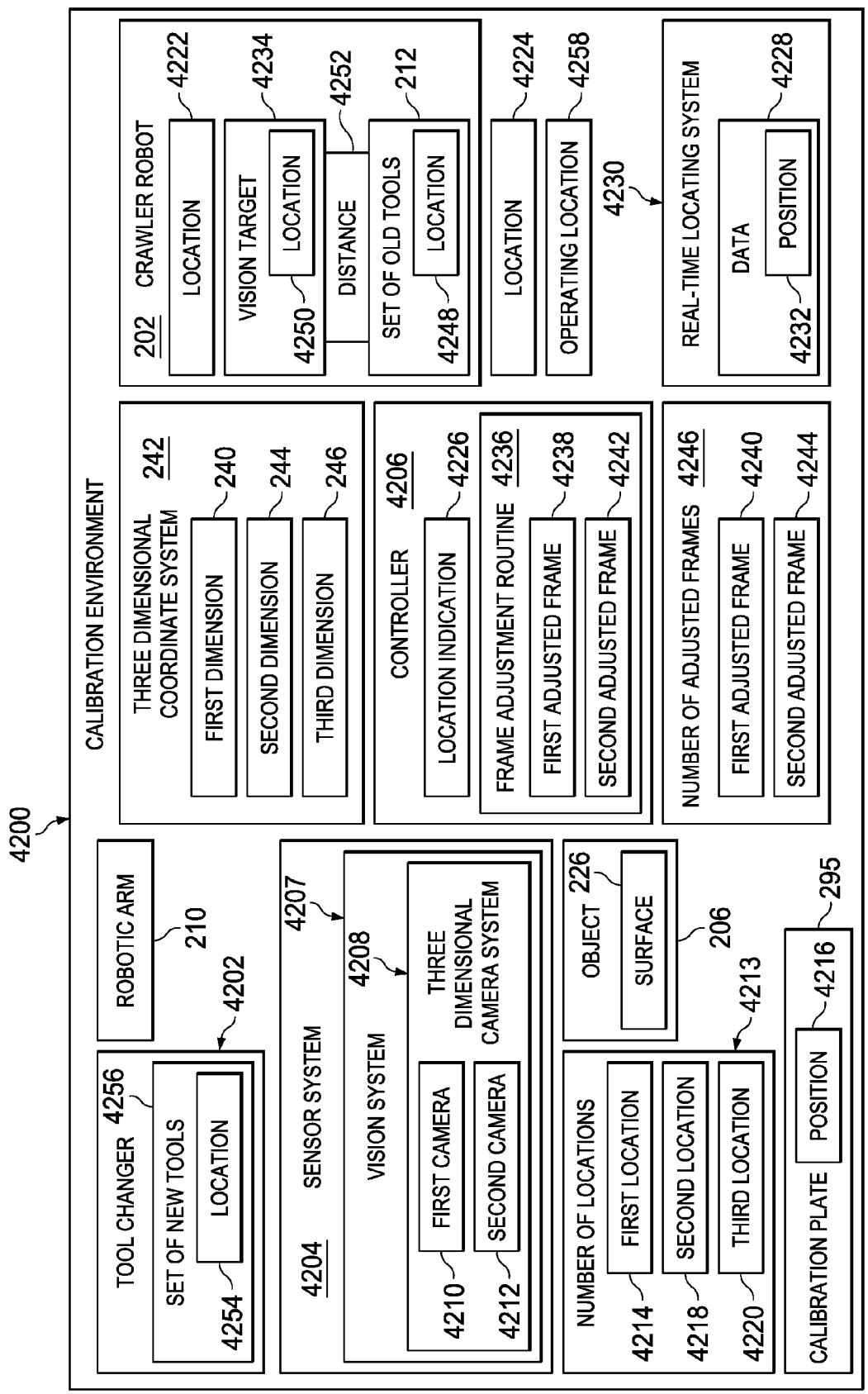
FIG. 42 is an illustration of a block diagram of a calibration environment in accordance with an illustrative embodiment.

Turning now to FIG. 42, an illustration of a block diagram of a calibration environment is depicted in accordance with an illustrative embodiment. Calibration environment 4200 is an example of an environment in which a sensor system, such as three-dimensional camera system 289 of FIG. 2 may be calibrated. Calibration environment 4200 may be a part of manufacturing environment 200 of FIG. 2.

Calibration environment 4200 may include robotic arm 210, tool changer 4202, sensor system 4204, controller 4206, crawler robot 202, three-dimensional coordinate system 242, and calibration plate 295. Tool changer 4202 may be an example of tool changer 204 of FIG. 2, tool changer 4300 of FIG. 43, or another desirable tool changer. Tool changer 4202 may be an end effector of robotic arm 210. Sensor system 4204 may be an example of either sensor system 284 or sensor system 285 of FIG. 2. Sensor system may be associated with either robotic arm 210 or tool changer 4202. Sensor system 4204 may take the form of vision system 4207. Vision system 4207 may be implemented as three-dimensional camera system 4208. Three-dimensional camera system may have first camera 4210 and second camera 4212. Three-dimensional camera system 4208 may be calibrated within calibration environment 4200.

To calibrate three-dimensional camera system 4208, three-dimensional camera system 4208 may locate calibration plate 295 while three-dimensional camera system 4208 is a number of locations 4213. Three-dimensional camera system 4208 may be initially positioned at first location 4214. Calibration plate 295 may be positioned within calibration environment 4200 at position 4216. Position 4216 may not change. To locate calibration plate 295 using three-dimensional camera system 4208, three-dimensional camera system 4208 may be turned to face calibration plate 295.

After locating calibration plate 295 while three-dimensional camera system 4208 is at first location 4214, three-dimensional camera system 4208 may be moved to second location 4218. Three-dimensional camera system 4208 may then locate calibration plate 295 while three-dimensional camera system 4208 is at second location 4218. After locating calibration plate 295 while three-dimensional camera system 4208 is at second location 4218, three-dimensional camera system 4208 may be moved to third location 4220. Three-dimensional camera system 4208 may then locate calibration plate 295 while three-dimensional camera system 4208 is at third location 4220.

Although number of locations 4213 is depicted as having three locations, number of locations 4213 may contain any desirable number of locations. In one illustrative example, number of locations 4213 may include eight locations. In another illustrative example, number of locations 4213 may include more than eight locations.

Robotic arm 210 may move three-dimensional camera system 4208. Three-dimensional camera system 4208 may be moved to number of locations 4213 by moving robotic arm 210 to a respective number of locations.

After three-dimensional camera system 4208 is calibrated, three-dimensional camera system 4208 may be used to determine location 4222 of crawler robot 202 within calibration environment 4200. Location 4222 of crawler robot 202 may change within calibration environment 4200 as crawler robot 202 moves across surface 226 of object 206.

To determine location 4222 of crawler robot 202, tool changer 4202 may be moved to location 4224. In some illustrative examples, location 4224 may also be referred to as a reference frame location. Location 4224 may be a location within calibration environment 4200. By moving tool changer 4202 within calibration environment 4200, three-dimensional camera system 4208 may also move within calibration environment 4200. Tool changer 4202 may be moved to location 4224 based on location indication 4226. Location indication 4226 may be an indication of location 4224 using three-dimensional coordinate system 424. Location indication 4226 may be received by controller 4206. Controller 4206 may be associated with at least one of robotic arm 210 or tool changer 4202.

Location indication 4226 may be based on data 4228 from real-time locating system 4230. Real-time locating system 4230 may use at least one of radio frequency communication, optical technology, infrared technology, acoustic technology, or ultrasound tags. Data 4228 of real-time locating system 4230 may include position 4232. Position 4232 may be an estimated position for crawler robot 202. Position 4232 may not be accurate enough for tool changer 4202 to exchange set of old tools 212 without tool changer 4202 undesirably impacting crawler robot 202.

To determine location 4222 of crawler robot 202, tool changer 4202 may be moved to location 4224. Location 4224 may be referred to as a first frame for tool changer 4202. A frame may describe six measurements for an element within three-dimensional coordinate system 242. For example, a frame may describe a position of an element in first dimension 240, second dimension 244, and third dimension 246 as well as the rotation of element relative to first dimension 240, second dimension 244, and third dimension 246. Three-dimensional camera system 4208 may be directed generally towards crawler robot 202. Three-dimensional camera system 4208 may be directed generally towards crawler robot 202 based on data 4228. Three-dimensional camera system 4208 may locate vision target 4234. Frame adjustment routine 4236 may then be activated. Frame adjustment routine 4236 may be a routine within a software program. Frame adjustment routine 4236 may be a routine for determining a distance from a first position to desired position.

Frame adjustment routine 4236 may generate first adjusted frame 4238. Based on first adjusted frame 4238, tool changer 4202 may be moved to first adjusted frame 4240 within calibration environment 4200. First adjusted frame 4238 may be a virtual representation of first adjusted frame 4240.

Three-dimensional camera system 4208 may be directed generally towards crawler robot 202. Three-dimensional camera system 4208 may locate vision target 4234 while tool changer 4202 is at first adjusted frame 4240. Frame adjustment routine 4236 may then be activated. Frame adjustment routine 4236 may generate second adjusted frame 4242. Based on second adjusted frame 4242, tool changer 4202 may be moved to second adjusted frame 4244 within calibration environment 4200. Second adjusted frame 4242 may be a virtual representation of second adjusted frame 4244. First adjusted frame 4240 and second adjusted frame 4244 may be number of adjusted frames 4246. Number of adjusted frames 4246 may be a number of locations tool changer 4202 may be moved to within calibration environment 4200 to determine location 4222 of crawler robot 202 with a desired accuracy. Number of adjusted frames 4246 may contain any desired number of locations. In some illustrative examples, number of adjusted frames 4246 may only be a single location. In other illustrative examples, number of adjusted frames 4246 may be two or more locations.

Once location 4222 is determined using three-dimensional camera system 4208, tool changer 4202 may exchange set of old tools 212. Set of old tools 212 may be positioned at location 4248 on crawler robot 202. Vision target 4234 may have location 4250 on crawler robot 202. Location 4248 and location 4250 may change within calibration environment 4200 as location 4222 changes. Location 4248 and location 4250 may be constant relative to location 4222 of crawler robot 202. As a result, distance 4252 between location 4248 and location 4250 may be constant.

Location 4248 of set of old tools 212 relative to location 4222 of crawler robot 202 may be based on a model, make, or design of crawler robot 202. Likewise, location 4248 of set of old tools 212 relative to location 4250 of vision target 4234 may be based on a model, make, or design of crawler robot 202. Location 4248 of set of old tools 212 relative to location 4222 may be a known value.

Location 4254 of set of new tools 4256 in tool changer 4202 may be constant relative to tool changer 4202. By determining location 4222 of crawler robot 202, location 4248 of set of old tools 212 within calibration environment 4200 may also be determined.

Operating location 4258 may be set based on second adjusted frame 4244. Operating location 4258 may be a position relative to location 4222 of crawler robot 202. Operating location 4258 may be a location for operating tool changer 4202 to exchange set of old tools 212. Tool changer 4202 may move to operating location 4258 and exchange set of old tools 212 for set of new tools 4256 based on location 4248.

Figure 43:
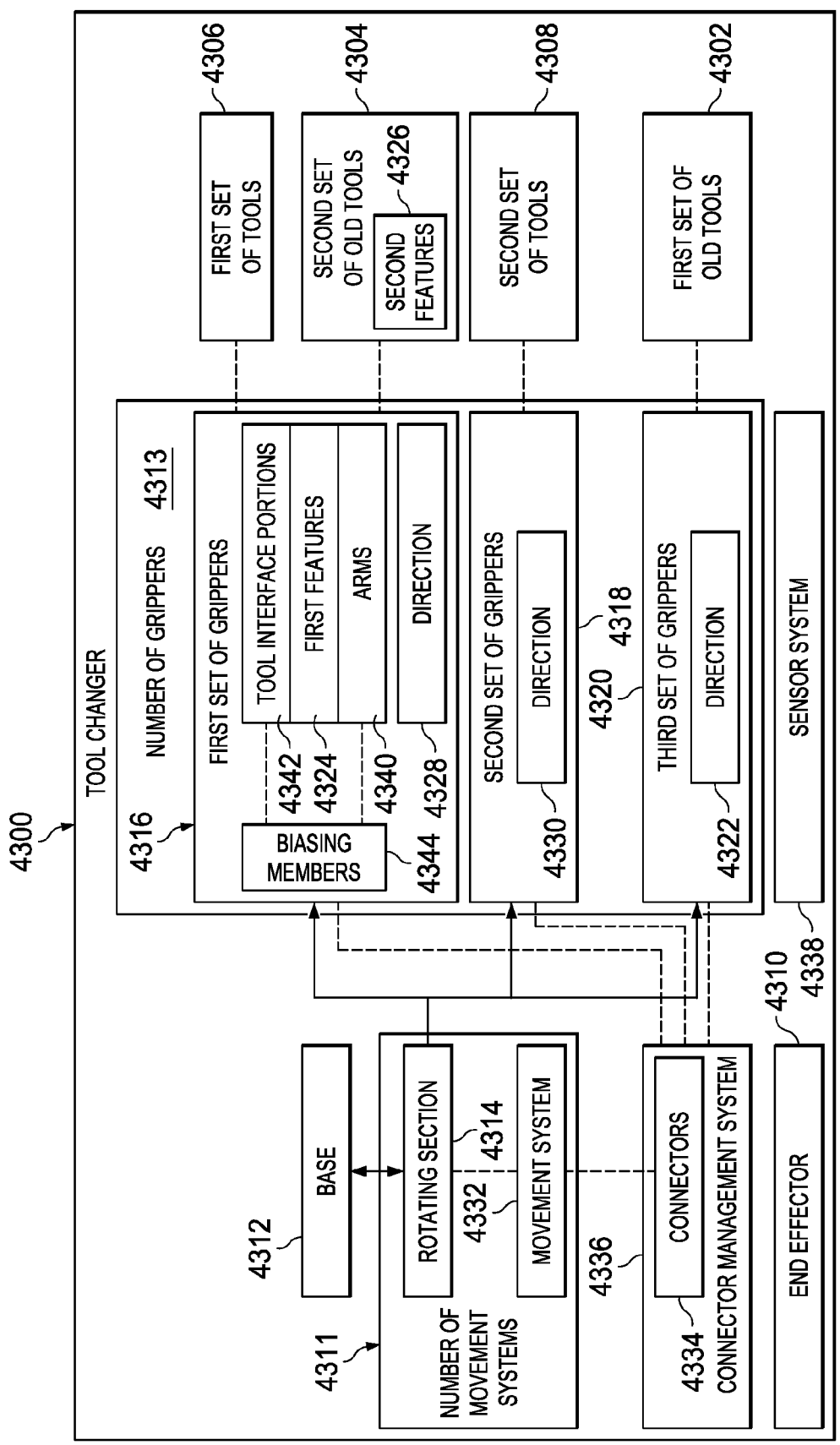
FIG. 43 is an illustration of a block diagram of a tool changer in accordance with an illustrative embodiment.

Turning now to FIG. 43, an illustration of a block diagram of a tool changer is depicted in accordance with an illustrative embodiment. Tool changer 4300 may be an example of one implementation of a tool changer which may be used in manufacturing environment 200 in FIG. 2. Tool changer 4300 may be an alternative illustrative embodiment to tool changer 204 of FIG. 2.

Tool changer 4300 may change out first set of old tools 4302 and second set of old tools 4304. Tool changer 4300 may exchange first set of old tools 4302 and second set of old tools 4304 for first set of tools 4306 and second set of tools 4308. For example, tool changer 4300 may exchange first set of old tools 4302 so that crawler robot 202 may drill a desired sized hole in surface 226 of object 206 using drilling system 222 of FIG. 2. In another example, tool changer 4300 may exchange second set of old tools 4304 so that crawler robot 202 may inspect a hole in surface 226 of object 206 for a desired size using inspection system 220 of FIG. 2.

Tool changer 4300 may be end effector 4310 for robotic arm 210 of FIG. 2. Tool changer 4300 may have number of movement assemblies 4311, base 4312, and number of grippers 4313. Number of movement assemblies 4311 may include rotating section 4314. Number of grippers 4313 may include first set of grippers 4316, second set of grippers 4318, and third set of grippers 4320. Rotating section 4314 may be moveably connected to base 4312. Further, rotating section 4314 may be rotatable relative to base 4312. Specifically, rotating section 4314 may be configured to rotate in a plane formed by first dimension 240 and second dimension 244 of FIG. 2.

To position tool changer 4300 relative to crawler robot 202, robotic arm 210 may move tool changer 4300 in at least one of first dimension 240, second dimension 244, and third dimension 246 of FIG. 2. Once tool changer 4300 is positioned relative to crawler robot 202, third set of grippers 4320 may remove first set of old tools 4302 from crawler robot 202 of FIG. 2. Third set of grippers 4320 may be associated with rotating section 4314. Third set of grippers 4320 may face direction 4322.

First set of grippers 4316 may be associated with rotating section 4314. First set of grippers 4316 may insert first set of tools 4306 into crawler robot 202. First set of grippers 4316 may remove second set of old tools 4304 from crawler robot 202 of FIG. 2.

First set of grippers 4316 may have first features 4324. First features 4324 may engage second features 4326 of second set of old tools 4304. In some illustrative examples, second set of old tools 4304 may be old tool 214 in set of old tools 212 shown in FIG. 2. In some illustrative examples, third set of grippers 4320 may have features that engage features in first set of old tools 4302. In some illustrative examples, first features 4324 may engage features of first set of tools 4306.

First set of grippers 4316 may face direction 4328. Direction 4328 may be about 120 degrees from direction 4322. As a result, in those illustrative examples, first set of grippers 4316 faces about 120 degrees from third set of grippers 4320.

Second set of grippers 4318 may be associated with rotating section 4314. Second set of grippers 4318 may insert second set of tools 4308 into crawler robot 202 of FIG. 2. Second set of grippers 4318 may face direction 4330. Direction 4322, direction 4328, and direction 4330 may each be in the same plane. In some illustrative examples, direction 4330 may be about 120 degrees from direction 4328. As a result, in those illustrative examples, second set of grippers 4318 faces about 120 degrees from first set of grippers 4316. Second set of grippers 4318 may have features that engage features in second set of tools 4308.

Tool rack 208 of FIG. 2 may store sets of tools. First set of tools 4306 and second set of tools 4308 may be stored in tool rack 208 prior to being inserted into crawler robot 202 of FIG. 2. Prior to moving tool changer 4300 towards crawler robot 202, second set of grippers 4318 may take second set of tools 4308 from tool rack 208 of FIG. 2. Prior to moving tool changer 4300 towards crawler robot 202, first set of grippers 4316 may take first set of tools 4306 from tool rack 208 of FIG. 2. After inserting first set of tools 4306 and second set of tools 4308 into crawler robot 202 of FIG. 2, first set of old tools 4302 and second set of old tools 4304 may be placed into tool rack 208 into crawler robot 202. Tool rack 208 may store additional sets of tools other than just set of new tools 219 and set of old tools 212.

Tool changer 4300 may have movement system 4332. Movement system 4332 may be associated with rotating section 4314. Movement system 4332 may move rotating section 4314. Movement system 4332 may comprise at least one of a number of belts, a number of motors, a number of gears, or any other desirable components.

Number of power sources 274 of FIG. 2 may provide power to movement system 4332. Connectors 4334 may connect number of power sources 274 and movement system 4332. Connectors 4334 may be conduits to channel power from number of power sources 274 to at least one of movement system 4332, robotic arm 210, first set of grippers 4316, second set of grippers 4318, and third set of grippers 4320. Connectors 4334 may take the form of wires, cables, tubes, channels, pipes, or other suitable power conduits.

Connectors 4334 may be managed by connector management system 4336. Connector management system 4336 may keep connectors 4334 from obstructing or interfering with movement of at least one of rotating section 4314, first set of grippers 4316, second set of grippers 4318, or third set of grippers 4320. Further, connector management system 4336 may protect connectors 4334 from damage during movement of at least one of rotating section 4314, first set of grippers 4316, second set of grippers 4318, or third set of grippers 4320. Portions of connectors 4334 may be encompassed by connector management system 4336. Portions of connector management system 4336 may be flexible. By portions of connector management system 4336 being flexible, portions of connector management system 4336 may move as at least one of rotating section 4314, first set of grippers 4316, second set of grippers 4318, third set of grippers 4320, or robotic arm 210 of FIG. 2 moves.

Tool changer 4300 may have sensor system 4338. Sensor system 4338 may detect at least one of when a tool is in range of a gripper in one of first set of grippers 4316, second set of grippers 4318, third set of grippers 4320; a position of rotating section 4314; or a location of crawler robot 202 of FIG. 2. Further, sensor system 4338 may detect when a gripper in first set of grippers 4316, second set of grippers 4318, or third set of grippers 4320 is open or closed. Sensor system 4338 may contain any number of sensors. Further, sensor system 4338 may contain any number of types of sensors. For example, sensor system 4338 may contain at least one of an optical sensor, a piezoelectric sensor, an inductive sensor, a capacitive sensor, a laser sensor, or a magnetic sensor.

In some illustrative examples, first set of grippers 4316 may have arms 4340 which may directly interact with second set of old tools 4304. In these illustrative examples, arms 4340 may have first features 4324.

In other illustrative examples, first set of grippers 4316 may have arms 4340 and tool interface portions 4342. In these illustrative examples, tool interface portions 4342 may have first features 4324. In these illustrative examples, arms 4340 may be associated with tool interface portions 4342 through biasing members 4344. Biasing members 4344 may take the form of at least one of ball plungers, compression springs, or other desirable biasing mechanisms.

Biasing members 4344 may allow for movement of tool interface portions 4342 after first set of grippers 4316 engages second set of old tools 4304. For example, biasing members 4344 may compensate for the tolerances in movements of at least one of tool changer 4300 or robotic arm 210 of FIG. 2. For example, biasing members 4344 may compensate for tolerances of at least one of rotating section 4314 of tool changer 4300, or the movement of robotic arm 210 of FIG. 2.

The illustrations of FIGS. 1-43 including illustrations of manufacturing environments in FIGS. 1-3, 11-18, and 21-35; robotic arm tools in FIGS. 1, 3-4, 11-18, 21-35, and 40-41; tool changers in FIGS. 2-8, 11-35, and 43; and grippers in FIGS. 9, 10, 36-37, and 38-39 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, number of movement assemblies 229 may also include a number of actuators to move at least one gripper in number of grippers 231. In this example, number of movement assemblies 229 may include an actuator that moves an arm of a gripper in number of grippers 231. As another example, third gripper 260 may have a number of features that engage features of new tool 268. As a further example, fourth gripper 262 may have a number of features that engage features of new tool 270. As yet a further example, each of first set of grippers 236 and second set of grippers 238 may have more than two grippers. For example, each of first set of grippers 236 and second set of grippers 238 may have three grippers.

The different components shown in FIGS. 1 and 3-42 may be combined with components in FIG. 2, used with components in FIG. 2, or a combination of the two. Additionally, some of the components in FIGS. 1 and 3-42 may be illustrative examples of how components shown in block form in FIG. 2 can be implemented as physical structures.

The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Figure 44:
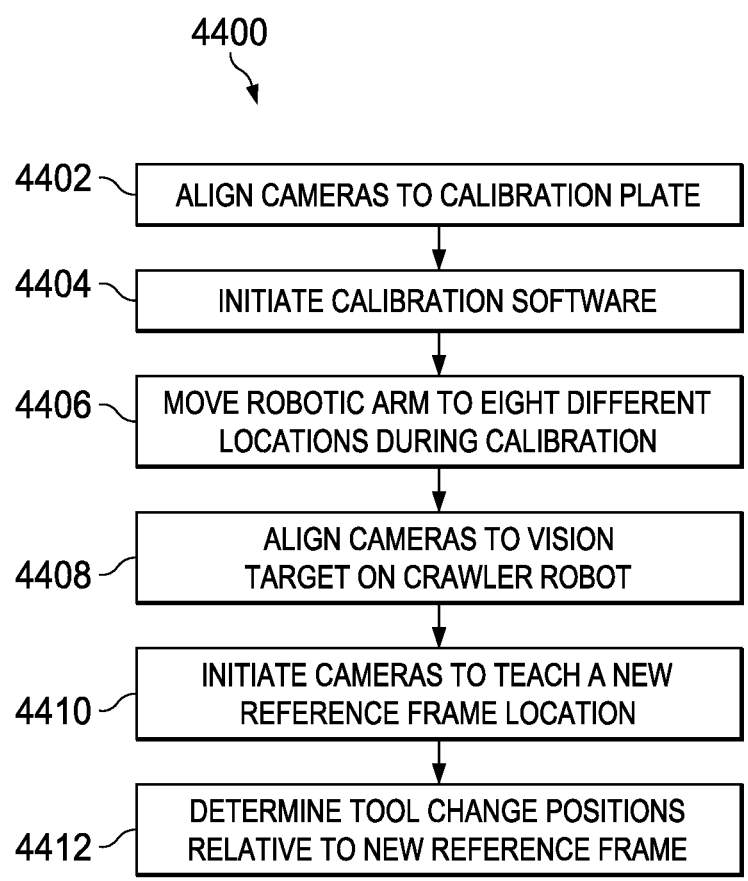
FIG. 44 is an illustration of a flowchart of a process for calibrating a three-dimensional camera system in accordance with an illustrative embodiment.

Turning now to FIG. 44, an illustration of a flowchart of a process for calibrating a three-dimensional camera system is depicted in accordance with an illustrative embodiment. The flowchart may be used to calibrate a three-dimensional camera system, such as three-dimensional camera system 4006 of FIG. 40.

Calibration process 4400 may begin by aligning cameras to calibration plate (operation 4402). For example, first camera 4008 and second camera 4010 of three-dimensional camera system 4006 may be aligned to a calibration plate, such as calibration plate 295 of FIG. 2. The calibration plate may be positioned in the manufacturing environment, such as manufacturing environment 200 of FIG. 2 or manufacturing environment 102 of FIG. 1. The calibration plate, such as calibration plate 295 of FIG. 2, may be an optical measuring tool used as a basis for calibrating an X-Y-Z table. In other words, the calibration plate may be used to calibrate three-dimensional camera system 4006 in all three dimensions.

Calibration process 4400 may also initiate calibration software (operation 4404). The calibration software may direct the three-dimensional camera system and the robotic arm to perform several processes. For example, robotic arm 110 may be directed to move within manufacturing environment 102 of FIG. 1.

Calibration process 4400 may also move robotic arm to eight different locations during calibration (operation 4406). By moving the robotic arm to eight different locations, the three-dimensional camera system may be able to align to the calibration plate from different viewpoints within the manufacturing environment. By moving to eight different locations, a six degree of freedom calibration for the three-dimensional camera system may be determined.

Calibration process 4400 may also align cameras to a vision target on the crawler robot (operation 4408). Calibration process 4400 may also initiate cameras to teach a new reference frame location (operation 4410). The new reference frame location may be a location of the crawler robot. Calibration process 4400 may also determine tool change positions relative to new reference frame (operation 4412). By determining tool change positions, the robotic arm may determine a location within the crawler robot for a set of tools. By determining tool change positions, the robotic arm may determine a location of robotic arm relative to the crawler robot for inserting a set of tools.

Figure 45A:
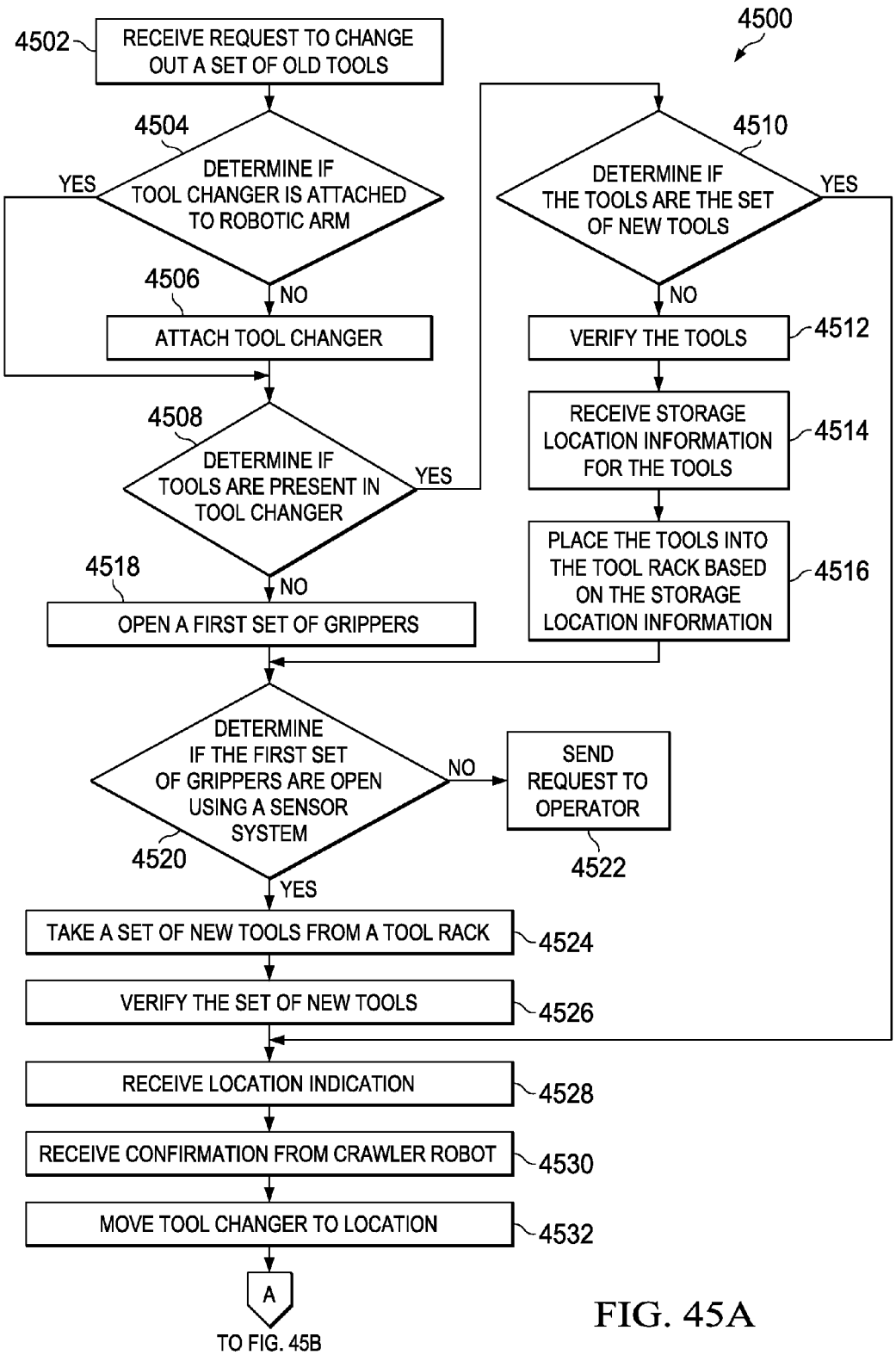
FIGS. 45A, 45B, and 45C are an illustration of a flowchart of a process for changing a set of old tools for a set of new tools in accordance with an illustrative embodiment.
Figure 45B:
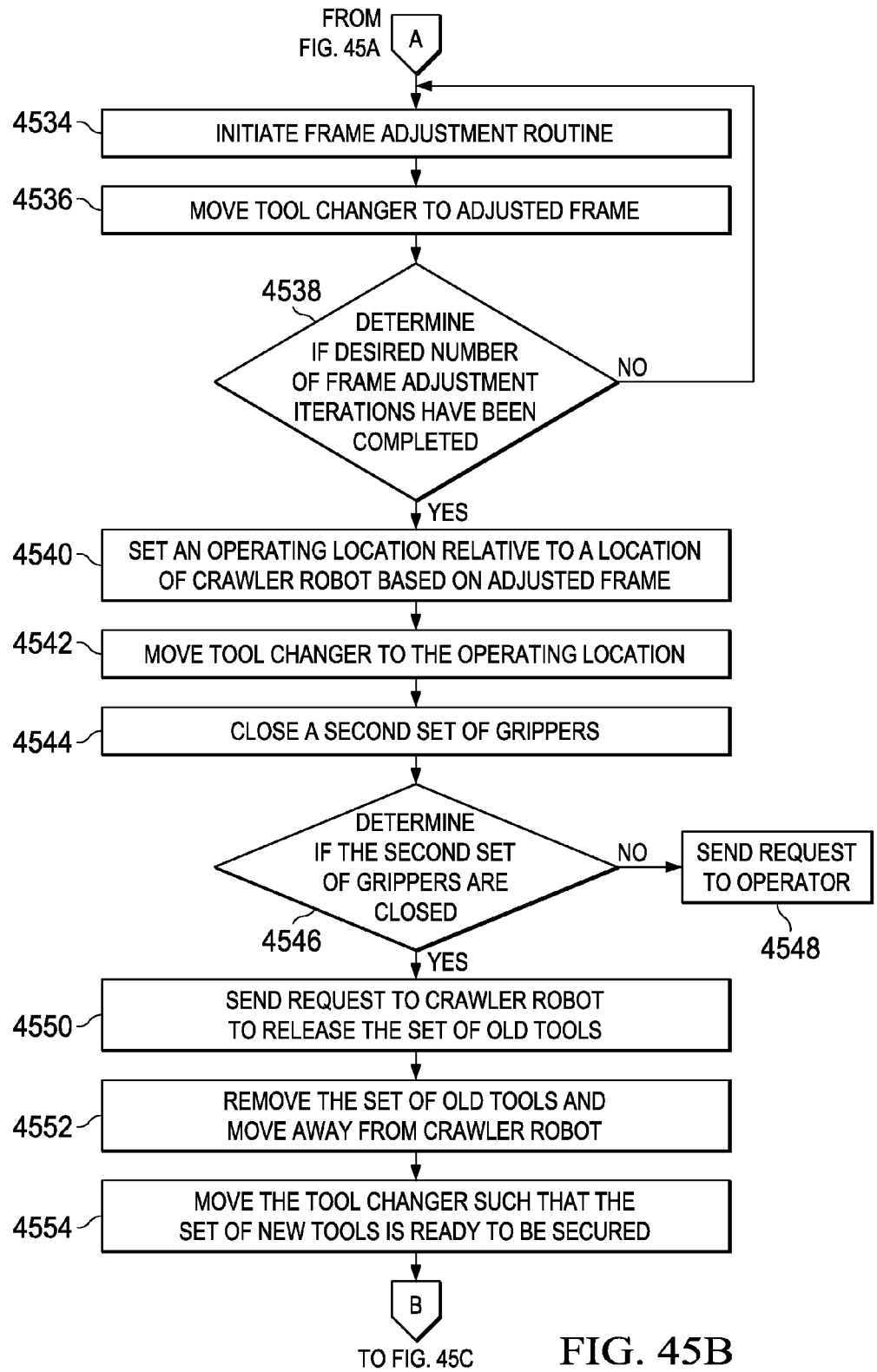
Figure 45C:
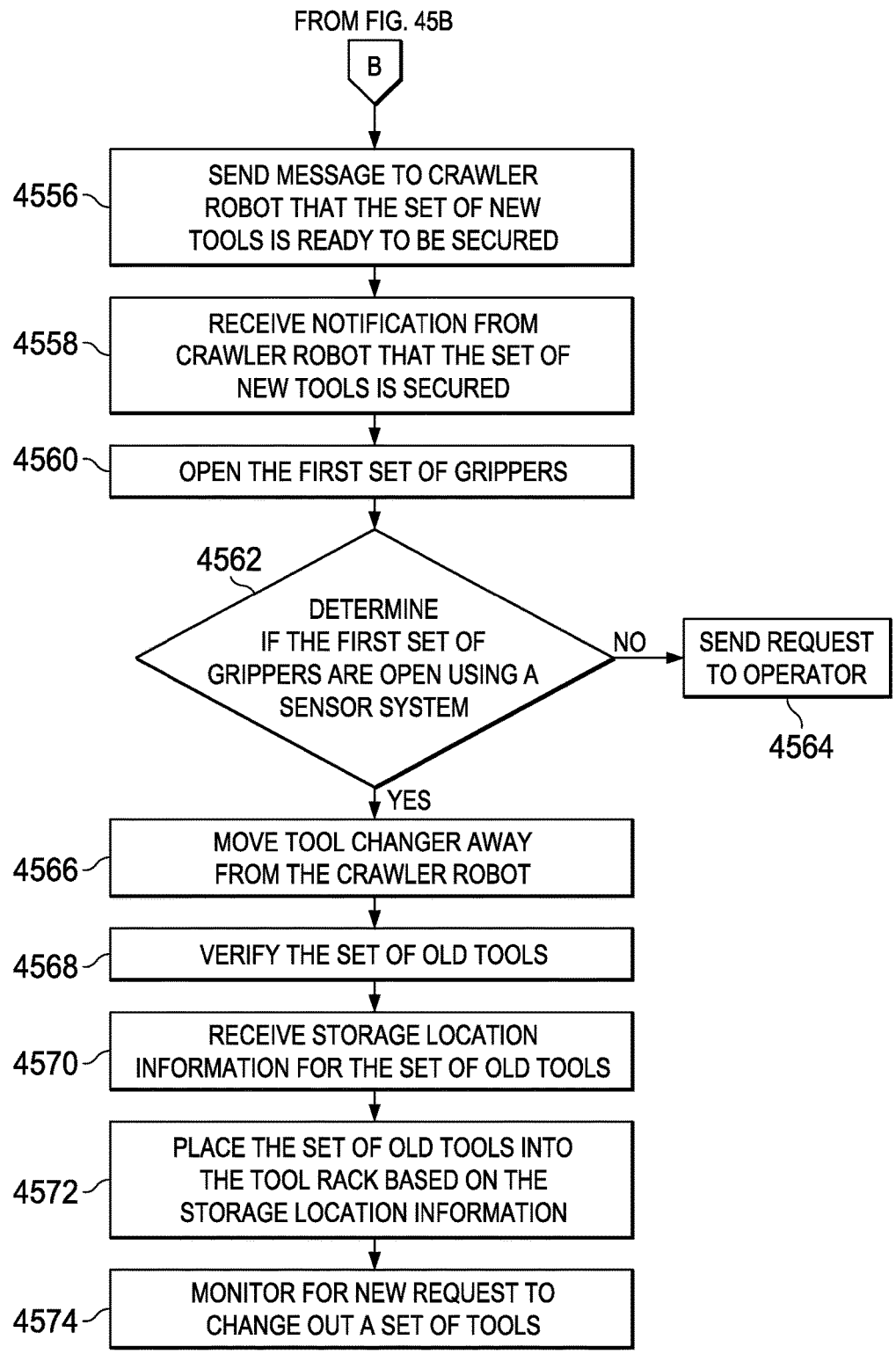

Turning now to FIGS. 45A, 45B, and 45C, illustrations of a flowchart of a process for changing a set of old tools for a set of new tools is depicted in accordance with an illustrative embodiment. Process 4500 may be performed by robotic arm 110 and utilizing at least one of tool changer 108 of FIG. 6 or tool changer 1902 of FIG. 19.

Process 4500 may begin by receiving a request to change out a set of old tools (operation 4502). In some illustrative examples, the request may be sent by the crawler robot itself. In some illustrative examples, the request may be sent by a controller which is in communication with both the robotic arm and the crawler robot. In some illustrative examples, the set of old tools may be at least one of a drill bit or an inspection probe. In some illustrative examples, the set of old tools may be exchanged for a set of new tools as a result of a desired size of future holes to be drilled. In some illustrative examples, a desired set of new tools may be a drill bit or an inspection probe having at least one of a larger or a smaller diameter than the set of old tools. The set of new tools may have a larger diameter or a smaller diameter than the set of old tools such that the set of new tools may drill or inspect future holds to be drilled. The future holes to be drilled may have a smaller or a larger diameter which may be drilled or inspected by using set of old tools.

Process 4500 may also determine if a tool changer is attached to the robotic arm (operation 4504). The robotic arm may use a sensor system, such as sensor system 284 of FIG. 2, to determine if the tool changer is attached. If it is not determined that a tool changer is not attached to the robotic arm, process 4500 may attach the tool changer (operation 4506). The tool changer may be an end effector of the robotic arm. The tool changer may have a quick install or quick release attachment.

If it is determined that a tool changer is attached to the robotic arm, process 4500 may determine if tools are present in the tool changer (operation 4508). If it is determined that there are tools present in the tool changer, process 4500 may determine if the tools are the set of new tools (operation 4510). It may be determined if the tools are the set of new tools by verifying the tools. The tools may be verified by using at least one of optical verification, RFID verification, or other desirable type of verification.

If it is determined that the tools are the set of new tools, process 4500 may continue on to operation 4528. If it is not determined that the tools are the set of new tools, process 4500 may verify the tools (operation 4512). By verifying the tools, process 4500 may determine a storage location for the tools. By verifying the tools, process 4500 may identify storage location information for the tools. In some illustrative examples, operation 4512 and operation 4510 may be performed substantially simultaneously. Process 4500 may then receive storage location information for the tools (operation 4514). The storage location information may identify a desired location within a tool rack for storing the tools. Process 4500 may also place the tools into the tool rack based on the storage location information (operation 4516). Process 4500 may place the tools in the desired location within the tool rack. After placing the tools into the tool rack, process 4500 may then proceed to operation 4520.

If, at operation 4508, it is not determined that tools are present in tool changer, process 4500 may open a first set of grippers (operation 4518). Process 4500 may also determine if the first set of grippers are open using a sensor system (operation 4520). The sensor system may be sensor system 284 of FIG. 2.

If it is not determined that the first set of grippers are open, process 4500 may send a request to an operator (operation 4522). By sending a request, robotic arm may request an operator to resolve the error. The request may take the form of an error indicator, an email, a text message, a flashing light, a graphic displayed on a screen, or other desirable request.

If it is determined that the first set of grippers are open, process 4500 may take a set of new tools from a tool rack (operation 4524). Process 4500 may also verify the set of new tools (operation 4526). By verifying the set of new tools, process 4500 may confirm that the tools taken from the tool rack are the desired set of new tools. The set of new tools may be verified by using at least one of optical verification, RFID verification, or other desirable type of verification. If the set of new tools are the desired set of new tools, process 4500 may continue to operation 4528. If the set of new tools are not the desired set of new tools, process 4500 may either send a request to an operator or proceed to operation 4514 to return the set of new tools to the tool rack. Afterwards, the robotic arm may then continue through process 4500 to pick up another set of new tools.

If the set of new tools are the desired set of new tools, process 4500 may continue on to operation 4528. Process 4500 may also receive location indication (operation 4528). In some illustrative examples, the location indication may be an indication of a location relative to the crawler robot. The location indication may be based on a position of the crawler robot. In some illustrative examples, the location indication may include an indication of a direction for the sensor system. The direction for the sensor system may be towards the position of the crawler robot. The location indication may not have the desired accuracy for the position of the crawler robot. As a result, the tool changer may not be able to change out the set of old tools based on the location indication alone.

Process 4500 may also receive confirmation from crawler robot (operation 4530). The confirmation from the crawler robot may be in response to a request sent by at least one of the robotic arm or a controller. The confirmation from the crawler robot may be a confirmation of the crawler robot being ready to have the set of old tools changed out.

Process 4500 may move tool changer to the location (operation 4532). The location may be the location indicated in location indication. In some illustrative examples, the location may be a location relative to the crawler robot.

Process 4500 may initiate a frame adjustment routine (operation 4534). The frame adjustment routine may use a sensor system and a target on the crawler robot. In some illustrative examples, the frame adjustment routine may use three-dimensional camera system 4006 of FIG. 40.

Process 4500 may move the tool changer to an adjusted frame (operation 4536). The adjusted frame may be determined based on the vision target on the crawler robot. The adjusted frame may be determined based on data received from the sensor system.

Process 4500 may determine if a desired number of frame adjustment iterations have been completed (operation 4538). In some illustrative examples, the desired number of frame adjustment iterations may be about three iterations. If it is not determined that the desired number of frame adjustment iterations have been completed, process 4500 may repeat operation 4534 and operation 4536. If it is determined that the desired number of adjustment iterations have been completed, process 4500 may set an operating location relative to a location of a crawler robot based on the adjusted frame (operation 4540). The location of the crawler robot may first be determined based on the adjusted frame. The location of the crawler robot may have a better accuracy than the position of the crawler robot used as a basis for the received location indication.

Process 4500 may move the tool changer to the operating location (operation 4542). Process 4500 may close a second set of grippers (operation 4544). Process 4500 may determine if the second set of grippers are closed (operation 4546). If it is not determined that the second set of grippers are closed, process 4500 may send a request to an operator (operation 4548). By sending a request, robotic arm may request an operator to resolve the error. The request may take the form of an error indicator, an email, a text message, a flashing light, a graphic displayed on a screen, or other desirable request.

If it is determined that the second set of grippers are closed, process 4500 may send a request to the crawler robot to release the set of old tools (operation 4550). In some illustrative examples, the request may be sent directly to the crawler robot. In some other illustrative examples, the request may be sent through a controller that communicates with both the robotic arm and the crawler robot.

Process 4500 may also remove the set of old tools and move the tool changer away from the crawler robot (operation 4552). Process 4500 may move the tool changer such that the set of new tools is ready to be secured (operation 4554). In some illustrative examples, the tool changer may be moved using the robotic arm. In illustrative examples, portions of the tool changer itself may move relative to the crawler robot. For example, one of a rotating section or a sliding section of the tool changer may move relative to the crawler robot.

Process 4500 may also send a message to the crawler robot that the set of new tools is ready to be secured (operation 4556). The message may be sent directly to the crawler robot or sent through a controller that communicates with both the crawler robot and the robotic arm. Process 4500 may receive a notification from crawler robot that the set of new tools is secured (operation 4558). The notification may be received directly from the crawler robot or through a controller that communicates with both the crawler robot and the robotic arm.

Process 4500 may also open the first set of grippers (operation 4560). Process may determine if the first set of grippers are open using a sensor system (operation 4562). The sensor system may be sensor system 284 of FIG. 2. If it is not determined the first set of grippers are open, process 4500 may send a request to an operator (operation 4564). By sending a request, robotic arm may request an operator to resolve the error. The request may take the form of an error indicator, an email, a text message, a flashing light, a graphic displayed on a screen, or other desirable request. If it is determined that the first set of grippers are open, process 4500 may move tool changer away from the crawler robot (operation 4566).

Process 4500 may also verify the set of old tools (operation 4568). The set of old tools may be verified by using at least one of optical verification, RFID verification, or other desirable type of verification. By verifying the set of old tools, process 4500 may determine a storage location for the set of old tools. By verifying the set of old tools, process 4500 may identify storage location information for the set of old tools. Storage location information may be data that could be used by the tool changer to store the set of old tools in a desired storage location.

Process 4500 may also receive storage location information for the set of old tools (operation 4570). The storage location information may identify a desired location within a tool rack for storing the tools. Process 4500 may place the set of old tools into the tool rack based on the storage location information (operation 4572). Process 4500 may also monitor for a new request to change out a set of tools (operation 4574). Afterwards process 4500 may terminate.

Figure 46:
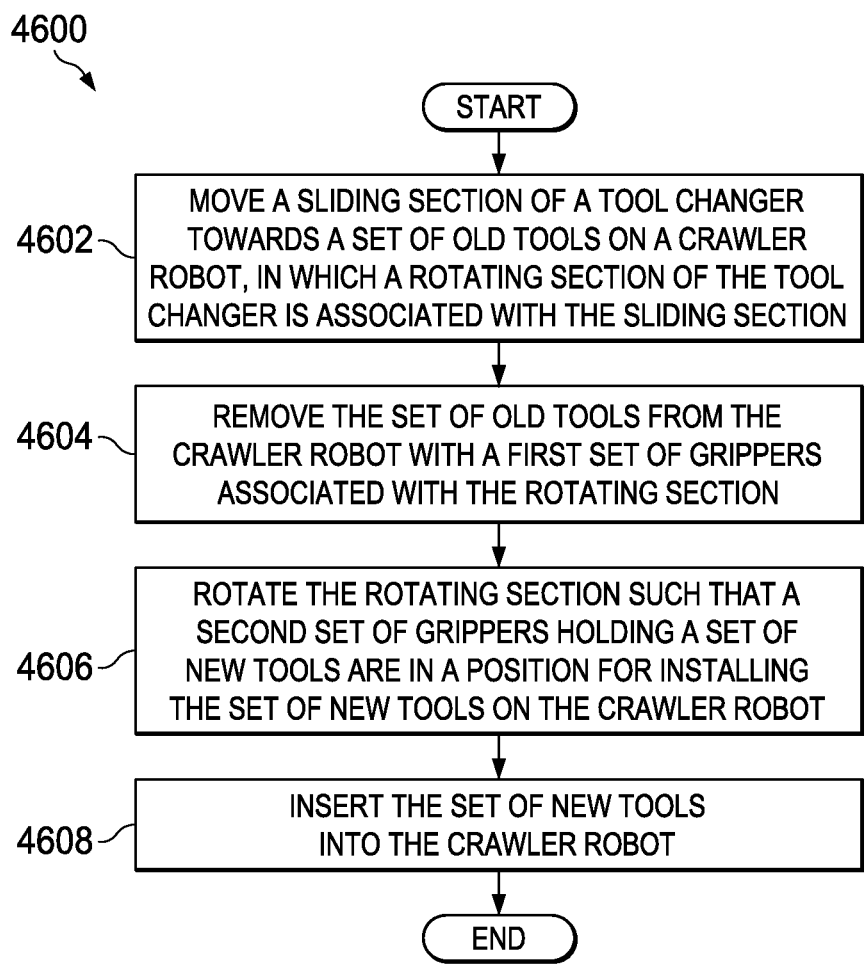
FIG. 46 is an illustration of a flowchart of a process for changing a set of old tools for a set of new tools in accordance with an illustrative embodiment.

Turning now to FIG. 46, an illustration of a flowchart of a process for changing a set of old tools for a set of new tools is depicted in accordance with an illustrative embodiment. Process 4600 may be implemented in manufacturing environment 200 of FIG. 2. Process 4600 may be used to change a set of old tools, such as set of old tools 302, for a set of new tools, such as set of new tools 1102 of FIG. 11.

Process 4600 may begin by moving sliding section 232 of tool changer 204 towards set of old tools 212 on crawler robot 202, in which rotating section 234 of tool changer 204 is associated with sliding section 232 (operation 4602). By moving sliding section 232 of tool changer 204 towards set of old tools 212, first set of grippers 236 may be positioned relative to set of old tools 212.

Process 4600 may also remove set of old tools 212 from crawler robot 202 with first set of grippers 236 associated with rotating section 234 (operation 4604). To remove set of old tools 212, first set of grippers 236 may move from an open position to a closed position. First set of grippers 236 may have a number of features, such as first features 256, that engage a number of features in an old tool, such as second features 258 of old tool 214.

Process 4600 may also rotate rotating section 234 such that second set of grippers 238 holding set of new tools 219 are in a position for installing set of new tools 219 on crawler robot 202 (operation 4606). In some illustrative examples, first set of grippers 236 faces about 180 degrees from second set of grippers 238. In these illustrative examples, rotating section 234 may rotate about 180 degrees such that second set of grippers 238 faces crawler robot 202 rather than first set of grippers 236. In some illustrative examples, first set of grippers 236 faces about 90 degrees from second set of grippers 238. In these illustrative examples, rotating section 234 may rotate about 90 degrees such that second set of grippers 238 faces crawler robot 202 rather than first set of grippers 236.

Process 4600 may also insert set of new tools 219 into crawler robot 202 (operation 4608). Afterwards, the process terminates. In some illustrative examples, inserting set of new tools 219 may include moving sliding section 232 towards crawler robot 202. In some illustrative examples, set of new tools 219 may be inserted into crawler robot 202 using second set of grippers 238.

Figure 47:
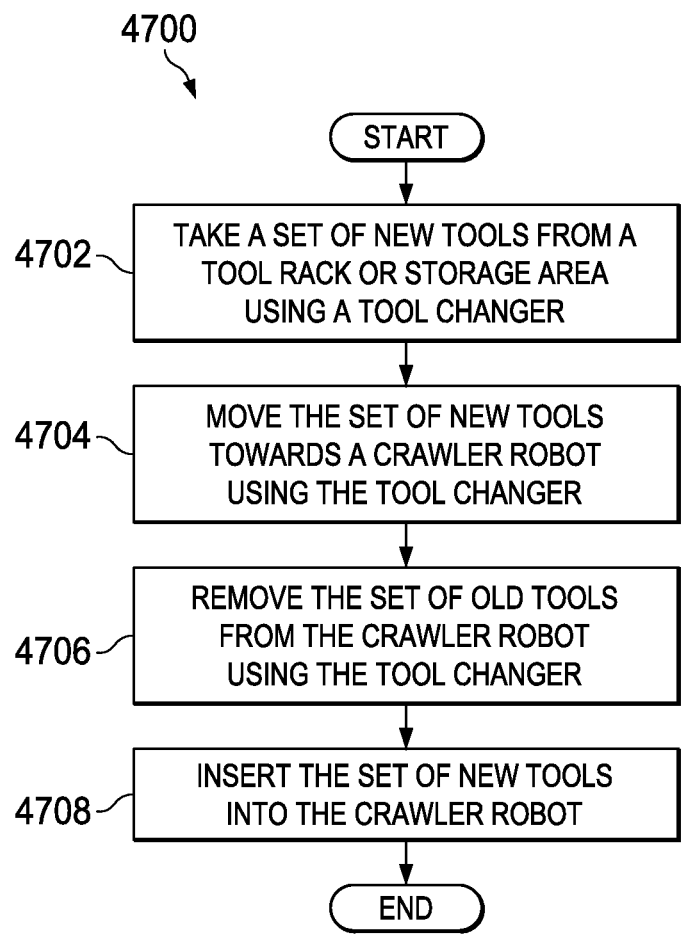
FIG. 47 is an illustration of a flowchart of a process for changing a set of old tools for a set of new tools in accordance with an illustrative embodiment.

Turning now to FIG. 47, an illustration of a flowchart of a process for changing a set of old tools for a set of new tools is depicted in accordance with an illustrative embodiment. Process 4700 may be implemented in manufacturing environment 200 of FIG. 2. Process 4700 may be used to change a set of old tools, such as set of old tools 302, for a set of new tools, such as set of new tools 1102 of FIG. 11.

Process 4700 may begin by taking set of new tools 219 from tool rack 208 or a storage area using tool changer 204 (operation 4702). Set of new tools 219 may be a set of interchangeable tools. Set of new tools 219 may include one or more tools. Second set of grippers 238 may include one or more grippers. In some illustrative examples, taking set of new tools 219 from tool rack 208 or storage area comprises taking set of new tools 219 from tool rack 208 or storage area using second set of grippers 238 of tool changer 204. In some illustrative examples, the number of grippers in second set of grippers 238 and the number of tools in set of new tools 219 is not the same.

Process 4700 may then move set of new tools 219 towards crawler robot 202 using tool changer 204 (operation 4704). A location of crawler robot 202 may be determined using a sensor system associated with at least one of crawler robot 202, robotic arm 210, or tool changer 204. Tool changer 204 may be moved to a position relative to crawler robot 202 using robotic arm 210. In some illustrative examples, tool changer 204 may be an end effector for robotic arm 210.

In some illustrative examples, moving set of new tools 219 towards a crawler robot 202 using tool changer 204 comprises moving sliding section 232 of tool changer 204 towards set of old tools 212 on crawler robot 202, in which rotating section 234 of tool changer 204 is associated with sliding section 232. By moving sliding section 232 towards set of old tools 212, first set of grippers 236 may be moved towards set of old tools 212. Set of old tools 212 may be interchangeable.

A location of set of old tools 212 may be known relative to the location of crawler robot 202. Sliding section 232 may be moved based on the location of set of old tools 212 determined based on the location of crawler robot 202 from the sensor system.

Process 4700 may also remove set of old tools 212 from crawler robot 202 using tool changer 204 (operation 4706). In some illustrative examples, removing set of old tools 212 from crawler robot 202 using tool changer 204 comprises removing set of old tools 212 from crawler robot 202 with first set of grippers 236 associated with rotating section 234. First set of grippers 236 may be one or more grippers. First set of grippers 236 may move from an open position to a closed position to remove set of old tools 212. A gripper in first set of grippers 236 may have first features 256 that engage second features 258 in an old tool in set of old tools 212.

First set of grippers 236 may be moved away from crawler robot 202 to remove set of old tools 212 from crawler robot 202. First set of grippers 236 may be moved away from crawler robot 202 by moving sliding section 232 of tool changer 204. First set of grippers 236 may be moved away from crawler robot 202 by moving robotic arm 210. First set of grippers 236 may be moved a designated distance away from crawler robot 202. The designated distance may be a distance such that rotating section 234 may be rotated without tool changer 204 undesirably impacting crawler robot 202.

Process 4700 may also insert set of new tools 219 into crawler robot 202 (operation 4708). Afterwards, the process terminates. In some illustrative examples, inserting set of new tools 219 may include moving sliding section 232 towards crawler robot 202. In some illustrative examples, set of new tools 219 may be inserted into crawler robot 202 using second set of grippers 238.

In some illustrative examples, process 4700 may also rotate rotating section 234 such that second set of grippers 238 holding set of new tools 219 are in a position for installing set of new tools 219 on crawler robot 202. In some illustrative examples, first set of grippers 236 faces about 180 degrees from second set of grippers 238. In these illustrative examples, rotating section 234 may rotate about 180 degrees such that second set of grippers 238 faces crawler robot 202 rather than first set of grippers 236. In some illustrative examples, first set of grippers 236 faces about 90 degrees from second set of grippers 238. In these illustrative examples, rotating section 234 may rotate about 90 degrees such that second set of grippers 238 faces crawler robot 202 rather than first set of grippers 236.

Figure 48:
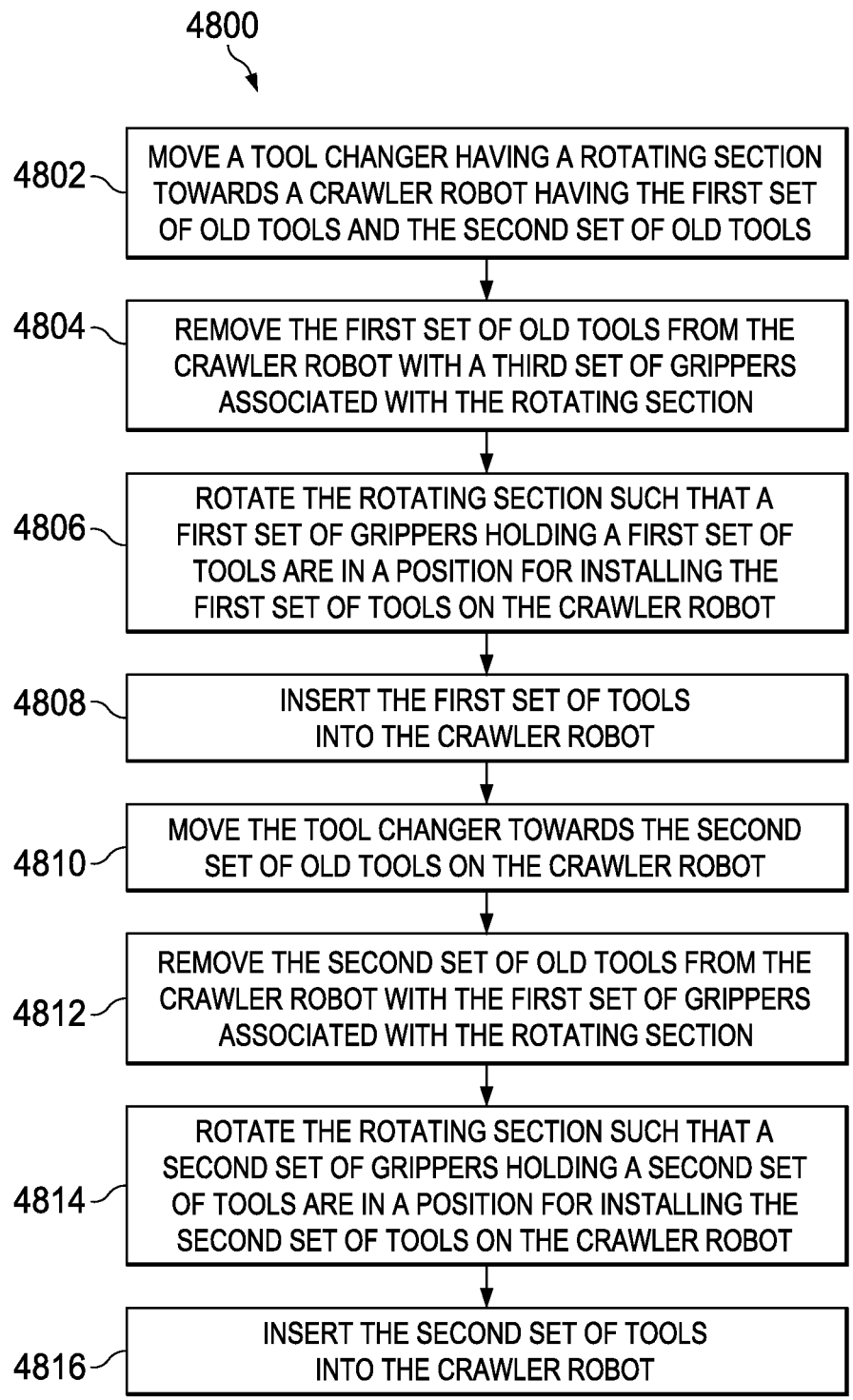
FIG. 48 is an illustration of a flowchart of a process for changing out a first set of old tools and a second set of old tools.

Turning now to FIG. 48, an illustration of a flowchart of a process for changing out a first set of old tools and a second set of old tools is depicted in accordance with an illustrative embodiment. Process 4800 may be implemented in manufacturing environment 200 of FIG. 2. Process 4800 may be performed using a tool changer, such as tool changer 1902 of FIG. 19.

Process 4800 may begin by moving a tool changer having a rotating section towards a crawler robot having the first set of old tools and the second set of old tools (operation 4802). Process 4800 may also remove the first set of old tools from the crawler robot with a third set of grippers associated with the rotating section (operation 4804). The third set of grippers may be third set of grippers 2001 of FIG. 20.

Removing the first set of old tools from the crawler robot may include moving the tool changer away from the crawler robot.

Process 4800 may also rotate the rotating section such that a first set of grippers holding a first set of tools are in a position for installing the first set of tools on the crawler robot (operation 4806). Process 4800 may further insert the first set of tools into the crawler robot (operation 4808). Inserting the first set of tools into the crawler robot may include moving the tool changer towards the crawler robot.

Process 4800 may also move the tool changer towards the second set of old tools on the crawler robot (operation 4810). To move the tool changer towards the second set of old tools, the tool changer may in multiple locations. For example, the tool changer may first move away from the crawler robot and then towards the crawler robot such that first set of grippers are positioned relative to the second set of old tools.

Process 4800 may further remove the second set of old tools from the crawler robot with the first set of grippers associated with the rotating section (operation 4812). The tool changer may move away from the crawler robot to remove the second set of old tools. Process 4800 may also rotate the rotating section such that a second set of grippers holding a second set of tools are in a position for installing the second set of tools on the crawler robot (operation 4814). Process 4800 may also insert the second set of tools into the crawler robot (operation 4816). The tool changer may move towards the crawler robot to insert the second set of tools into the crawler robot.

Figure 49:
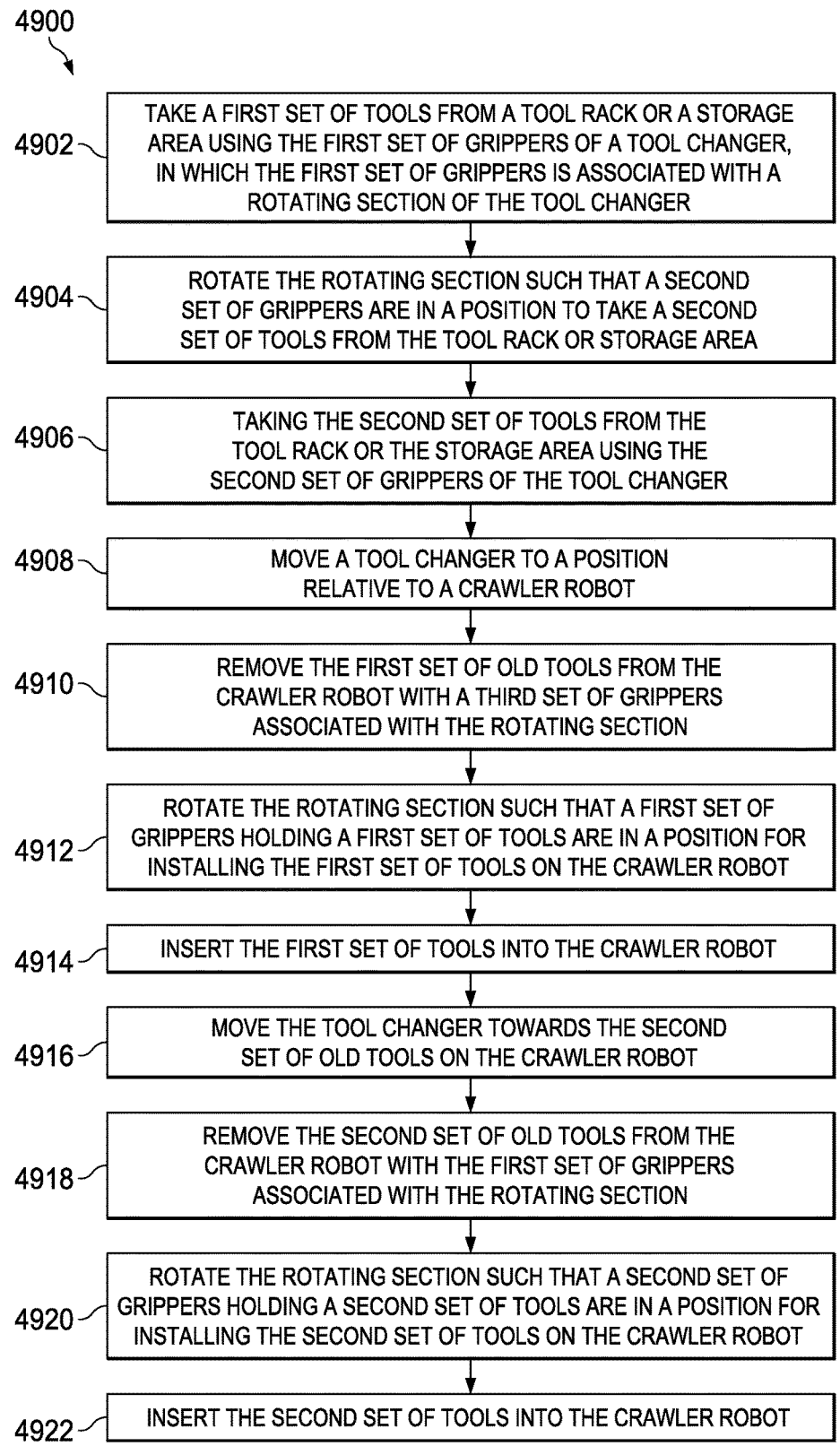
FIG. 49 is an illustration of a flowchart of a process for changing out a first set of old tools and a second set of old tools.

Turning now to FIG. 49, an illustration of a flowchart of a process for changing out a first set of old tools and a second set of old tools is depicted in accordance with an illustrative embodiment. Process 4900 may be implemented in manufacturing environment 200 of FIG. 2. Process 4900 may be performed using a tool changer, such as tool changer 1902 of FIG. 19.

Process 4900 may begin by taking a first set of tools from a tool rack or a storage area using a first set of grippers of a tool changer, in which the first set of grippers is associated with a rotating section of the tool changer (operation 4902). The tool changer may take the first set of tools by moving away from the tool rack or storage area. Process 4900 may also rotate the rotating section such that a second set of grippers are in a position to take a second set of tools from the tool rack or storage area (operation 4904).

Process 4900 may also take the second set of tools from the tool rack or the storage area using the second set of grippers of the tool changer (operation 4906). The tool changer may take the second set of tools by moving away from the tool rack or storage area. Process 4900 may also move the tool changer to a position relative to a crawler robot (operation 4908). The position relative to the crawler robot may be determined using a sensor system. In some illustrative examples, the sensor system may be a three-dimensional camera system. Process 4900 may also remove the first set of old tools from the crawler robot with a third set of grippers associated with the rotating section (operation 4910).

Process 4900 may also rotate the rotating section such that a first set of grippers holding the first set of tools are in a position for installing the first set of tools on the crawler robot (operation 4912). Process 4900 may also insert the first set of tools into the crawler robot (operation 4914). Process 4900 may also move the tool changer towards the second set of old tools on the crawler robot (operation 4916). The tool changer may move in multiple directions to position the tool changer relative to the second set of old tools.

Process 4900 may also remove the second set of old tools from the crawler robot with the first set of grippers associated with the rotating section (operation 4918). Process 4900 may also rotate the rotating section such that the second set of grippers holding the second set of tools are in a position for installing the second set of tools on the crawler robot (operation 4920). Process 4900 may also insert the second set of tools into the crawler robot (operation 4922). Afterwards the process may terminate.

Figures 50, 51:
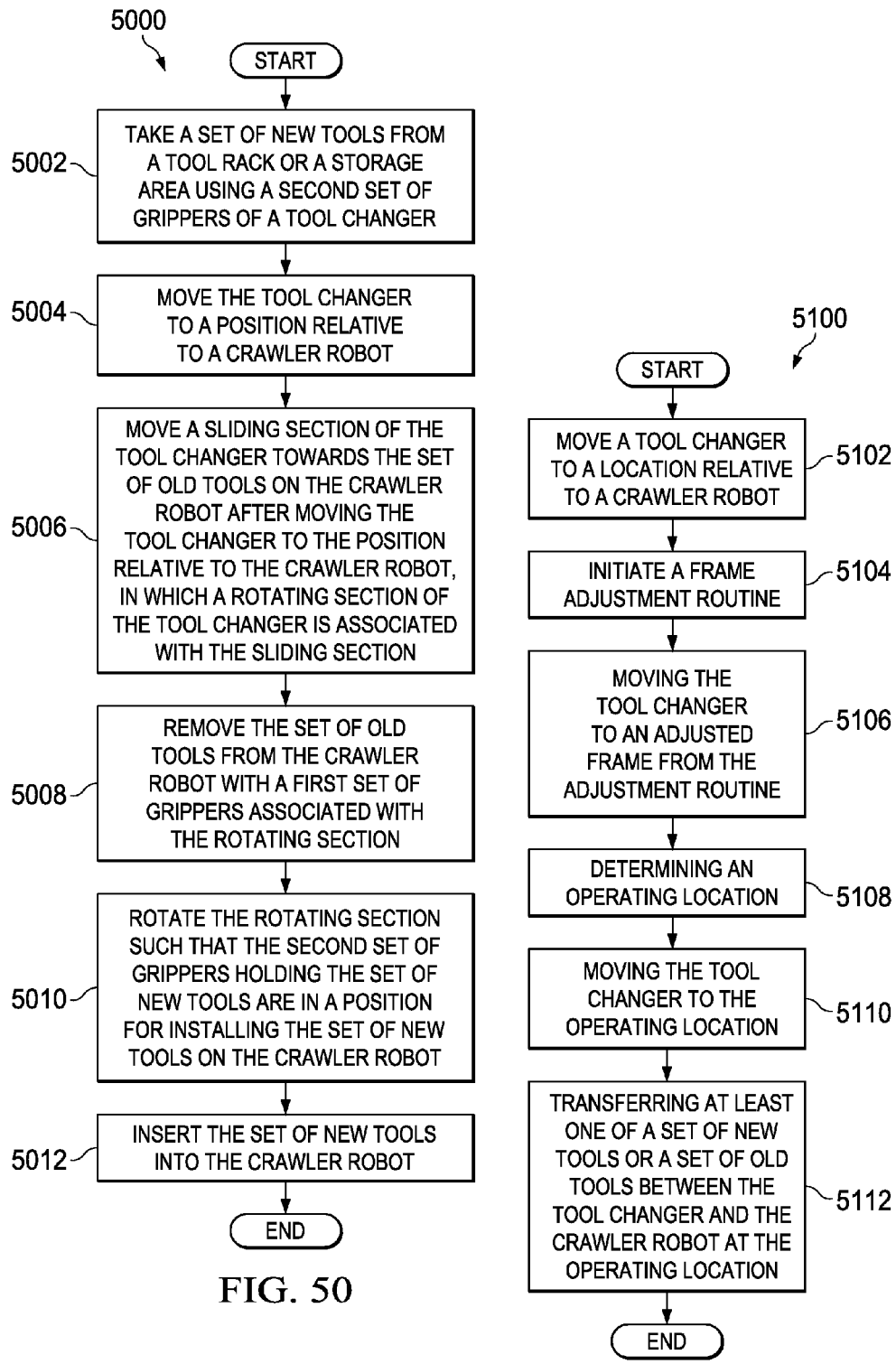
FIG. 50 is an illustration of a flowchart of a process for changing a set of old tools for a set of new tools in accordance with an illustrative embodiment.
FIG. 51 is an illustration of a flowchart of a process for changing a set of old tools for a set of new tools in accordance with an illustrative embodiment.

Turning now to FIG. 50, an illustration of a flowchart of a process for changing a set of old tools for a set of new tools is depicted in accordance with an illustrative embodiment. Process 5000 may be implemented in manufacturing environment 200 of FIG. 2. Process 5000 may be used to change a set of old tools, such as set of old tools 302, for a set of new tools, such as set of new tools 1102 of FIG. 11.

Process 5000 may begin by taking set of new tools 219 from tool rack 208 or a storage area using tool changer 204 (operation 5002). Set of new tools 219 may be a set of interchangeable tools. Set of new tools 219 may include one or more tools. Second set of grippers 238 may include one or more grippers. In some illustrative examples, taking set of new tools 219 from tool rack 208 or storage area comprises taking set of new tools 219 from tool rack 208 or storage area using second set of grippers 238 of tool changer 204. In some illustrative examples, the number of grippers in second set of grippers 238 and the number of tools in set of new tools 219 is not the same.

Process 5000 may then move set of new tools 219 towards crawler robot 202 using tool changer 204 (operation 5004). A location of crawler robot 202 may be determined using a sensor system associated with at least one of crawler robot 202, robotic arm 210, or tool changer 204. Tool changer 204 may be moved to a position relative to crawler robot 202 using robotic arm 210. In some illustrative examples, tool changer 204 may be an end effector for robotic arm 210.

In some illustrative examples, moving set of new tools 219 towards a crawler robot 202 using tool changer 204 comprises moving sliding section 232 of tool changer 204 towards set of old tools 212 on crawler robot 202, in which rotating section 234 of tool changer 204 is associated with sliding section 232. By moving sliding section 232 towards set of old tools 212, first set of grippers 236 may be moved towards set of old tools 212. Set of old tools 212 may be interchangeable.

A location of set of old tools 212 may be known relative to the location of crawler robot 202. Sliding section 232 may be moved based on the location of set of old tools 212 determined based on the location of crawler robot 202 from the sensor system.

Process 5000 may also remove set of old tools 212 from crawler robot 202 using tool changer 204 (operation 5006). In some illustrative examples, removing set of old tools 212 from crawler robot 202 using tool changer 204 comprises removing set of old tools 212 from crawler robot 202 with first set of grippers 236 associated with rotating section 234. First set of grippers 236 may be one or more grippers. First set of grippers 236 may move from an open position to a closed position to remove set of old tools 212. A gripper in first set of grippers 236 may have first features 256 that engage second features 258 in an old tool in set of old tools 212.

First set of grippers 236 may be moved away from crawler robot 202 to remove set of old tools 212 from crawler robot 202. First set of grippers 236 may be moved away from crawler robot 202 by moving sliding section 232 of tool changer 204. First set of grippers 236 may be moved away from crawler robot 202 by moving robotic arm 210. First set of grippers 236 may be moved a designated distance away from crawler robot 202. The designated distance may be a distance such that rotating section 234 may be rotated without tool changer 204 undesirably impacting crawler robot 202.

Process 5000 may also insert set of new tools 219 into crawler robot 202 (operation 5008). Afterwards, the process terminates. In some illustrative examples, inserting set of new tools 219 may include moving sliding section 232 towards crawler robot 202. In some illustrative examples, set of new tools 219 may be inserted into crawler robot 202 using second set of grippers 238.

In some illustrative examples, process 5000 may also rotate rotating section 234 such that second set of grippers 238 holding set of new tools 219 are in a position for installing set of new tools 219 on crawler robot 202. In some illustrative examples, first set of grippers 236 faces about 180 degrees from second set of grippers 238. In these illustrative examples, rotating section 234 may rotate about 180 degrees such that second set of grippers 238 faces crawler robot 202 rather than first set of grippers 236. In some illustrative examples, first set of grippers 236 faces about 90 degrees from second set of grippers 238. In these illustrative examples, rotating section 234 may rotate about 90 degrees such that second set of grippers 238 faces crawler robot 202 rather than first set of grippers 236.

Turning now to FIG. 51, an illustration of a flowchart of a process for changing a set of old tools for a set of new tools is depicted in accordance with an illustrative embodiment. Process 5100 may be implemented in manufacturing environment 200 of FIG. 2. Process 5100 may be performed using a tool changer, such as tool changer 1902 of FIG. 19.

Process 5100 may begin by moving a tool changer 204 to a location relative to a crawler robot 202 (operation 5102). The location may be a location indicated in location indication. The location indication may be based on a position of crawler robot 202. In some illustrative examples, the location indication may include an indication of a direction for the sensor system.

Process 5100 may also initiate a frame adjustment routine (operation 5104). The frame adjustment routine may use a sensor system 285 and a target on the crawler robot. In some illustrative examples, the frame adjustment routine may use three-dimensional camera system 4006 of FIG. 40.

Process 5100 may further move the tool changer 204 to an adjusted frame from the frame adjustment routine (operation 5106). The adjusted frame may be determined based on the vision target on the crawler robot. The adjusted frame may be determined based on data received from the sensor system.

Process 5100 may also determine an operating location (operation 5108). Process 5100 may further move the tool changer 204 to the operating location (operation 5110). Process 5100 may also transfer at least one of a set of new tools 219 or a set of old tools 212 between the tool changer 204 and the crawler robot 202 at the operating location (operation 5112).

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram. Further, some blocks may not be implemented.

For example, in some illustrative examples, process 4700 may also store set of old tools 212 in tool rack 208. In some other illustrative examples, process 4600 may not move sliding section 232 towards set of old tools 212. Instead, tool changer 204 may be moved towards crawler robot 202 using robotic arm 210, with sliding section 232 already positioned.

As another example, tool changer 1902 may be used to exchange a single set of old tools. For example, tool changer 1902 may only change out a first set of old tools and process 4700 may terminate after inserting the first set of tools.

As yet another example, process 4500 may also inspect the set of old tools to determine if it would be desirable for the set of old tools to be serviced or replaced. As yet another example, process 4500 may inspect the set of new tools to determine if the set of new tools are of desired quality (this could also be triggered by poor performance of the tools while in service. For examples, poor feed rates for drill bits may prompt drill bit replacement on the assumption that the drill bit was dull or otherwise out of tolerance).

Figure 52:
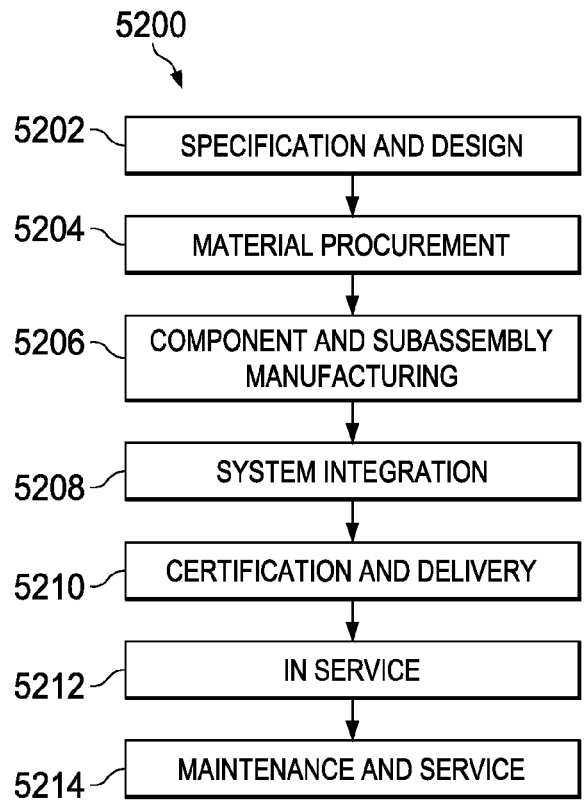
FIG. 52 is an illustration of a block diagram of an aircraft manufacturing and service method in accordance with an illustrative embodiment.
Figure 53:
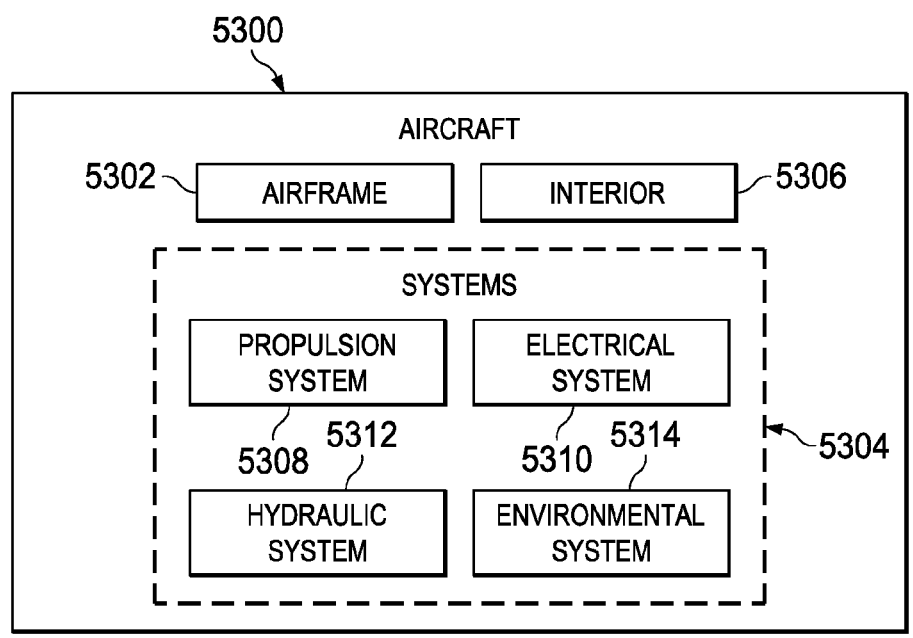
FIG. 53 is an illustration of a block diagram of an aircraft in which an illustrative embodiment may be implemented.

The illustrative embodiments of the disclosure may be described in the context of aircraft manufacturing and service method 5200 as shown in FIG. 52 and aircraft 5300 as shown in FIG. 53. Turning first to FIG. 52, an illustration of a block diagram of an aircraft manufacturing and service method is depicted in accordance with an illustrative embodiment. During pre-production, aircraft manufacturing and service method 5200 may include specification and design 5202 of aircraft 5300 in FIG. 53 and material procurement 5204.

During production, component and subassembly manufacturing 5206 and system integration 5208 of aircraft 5300 in FIG. 53 takes place. Thereafter, aircraft 5300 in FIG. 53 may go through certification and delivery 5210 in order to be placed in service 5212. While in service 5212 by a customer, aircraft 5300 in FIG. 53 is scheduled for routine maintenance and service 5214, which may include modification, reconfiguration, refurbishment, and other maintenance or service.

Each of the processes of aircraft manufacturing and service method 5200 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 53, an illustration of a block diagram of an aircraft is depicted in which an illustrative embodiment may be implemented. In this example, aircraft 5300 is produced by aircraft manufacturing and service method 5200 in FIG. 52 and may include airframe 5302 with plurality of systems 5304 and interior 5306. Examples of systems 5304 include one or more of propulsion system 5308, electrical system 5310, hydraulic system 5312, and environmental system 5322. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 5200 in FIG. 52. One or more illustrative embodiments may be used during component and subassembly manufacturing 5206. For example, tool changer 204 in FIG. 2 may be used during component and subassembly manufacturing 5206 to change tools for crawler robot 202. Further, tool changer 204 may also be used to perform replacements during maintenance and service 5214.

A method and apparatus for changing a set of old tools for a set of new tools is presented. The tool changer may eliminate the need for human operators to change a set of old tools for a set of new tools on a crawler robot. The tool changer may reduce manufacturing time by reducing the time to exchange a set of old tools for a set of new tools. The tool changer may reduce the likelihood of undesirably dropping a tool while exchanging sets of tools in a crawler robot. Further, the tool changer may reduce the likelihood of installing incorrect tools for a desired operation into a crawler robot.

The tool changer may comprise a number of movement assemblies and a number of grippers. The movement system may include at least one of a sliding section and a rotating section. The number of grippers may include a first set of grippers and a second set of grippers. The sliding section may be moveably connected to a base and slidable relative to the base. The rotating section may be moveably connected to the sliding section and is rotatable relative to the base. The first set of grippers may be associated with the rotating section. The first set of grippers may remove a set of old tools from a crawler. The second set of grippers may be associated with the rotating section. The second set of grippers may insert a set of new tools into the crawler robot.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A system comprising:
a crawler robot;
a robotic arm;
a tool changer that is an end effector of the robotic arm, the tool changer comprising:
a number of grippers, in which the number of grippers performs at least one of moving a set of new tools to the crawler robot or removing a set of old tools from the crawler robot; and
a number of movement assemblies associated with the number of grippers;
a vision system associated with at least one of the robotic arm and the tool changer; and
at least one of a tool rack or storage area.

2. The system of claim 1, wherein the vision system may determine a location of the crawler robot.

3. The system of claim 1, wherein the number of movement assemblies are configured to move the number of grippers relative to the crawler robot.

4. The system of claim 1, wherein the at least one of the tool rack or storage area comprises a location to store the set of old tools after the set of old tools are removed from the crawler robot.

5. The system of claim 1, wherein the at least one of the tool rack or storage area contains the set of new tools to be placed on the crawler robot.

6. The system of claim 1, wherein the vision system comprises a three-dimensional camera system.

7. The system of claim 6, wherein the three-dimensional camera system includes a first camera and a second camera.

8. A method of changing a set of old tools for a set of new tools, the method comprising:
moving a tool changer to a location relative to a crawler robot;
initiating a frame adjustment routine;
moving the tool changer to an adjusted frame from the frame adjustment routine;
determining a location of the crawler robot using the frame adjustment routine and a three-dimensional camera system;
determining an operating location based on the location of the crawler robot;
moving the tool changer to the operating location; and
transferring at least one of a set of new tools or a set of old tools between the tool changer and the crawler robot at the operating location.

9. The method of claim 8 further comprising:
aligning a three-dimensional camera system to a calibration plate;
initiating calibration software; and
moving the three-dimensional camera system to a number of different locations during calibration using a robotic arm.

10. The method of claim 9 further comprising:
aligning the three-dimensional camera system to a vision target on the crawler robot after calibration.

11. The method of claim 10 further comprising:
determining the location relative to the crawler robot using the three-dimensional camera system after aligning the three-dimensional camera system to the vision target on the crawler robot.

12. A tool changer comprising:
a number of grippers; and
a number of movement assemblies configured to move the number of grippers relative to a crawler robot;
wherein the number of movement assemblies comprises a rotating section;
wherein the number of grippers comprises:
a first set of grippers associated with the rotating section, in which the first set of grippers remove a set of old tools from the crawler robot; and
a second set of grippers associated with the rotating section, in which the second set of grippers inserts a set of new tools into the crawler robot.

13. The tool changer of claim 12, wherein:
the number of movement assemblies further comprises:
a sliding section moveably connected to a base and to slidable relative to the base;
wherein the rotating section is moveably connected to the sliding section and rotatable relative to the base.

14. The tool changer of claim 13, wherein the first set of grippers comprises a first gripper and a second gripper separated by a first distance.

15. The tool changer of claim 14, wherein the second set of grippers comprises a third gripper and a fourth gripper separated by a second distance, and wherein the first distance and the second distance are substantially the same.

16. The tool changer of claim 13, wherein the first set of grippers faces about 180 degrees from the second set of grippers.

17. The tool changer of claim 13, wherein the first set of grippers faces about 90 degrees from the second set of grippers.

18. The tool changer of claim 13, wherein a gripper in the first set of grippers has first features that engage second features in an old tool in the set of old tools.

19. The tool changer of claim 13, wherein a gripper in the first set of grippers comprises arms, interface portions, and biasing members.

20. A method of changing a set of old tools for a set of new tools, the method comprising:
taking a set of new tools from a tool rack or storage area using a tool changer;
moving the set of new tools towards a crawler robot using the tool changer;
removing the set of old tools from the crawler robot using a first set of grippers associated with a rotating section of the tool changer;
rotating the rotating section such that a second set of grippers holding the set of new tools are in a position for installing the set of new tools on the crawler robot; and
inserting the set of new tools into the crawler robot using the second set of grippers.

21. The method of claim 20, wherein the tool changer is an end effector for a robotic arm.

22. The method of claim 20 further comprising:
placing the set of old tools in a tool rack or a storage area after inserting the set of new tools into the crawler robot.

23. The method of claim 20:
wherein moving the set of new tools towards a crawler robot using the tool changer comprises moving a sliding section of the tool changer towards the set of old tools on the crawler robot, in which the rotating section of the tool changer is associated with the sliding section.

24. The method of claim 23 further comprising:
moving the tool changer to a position relative to the crawler robot after taking the set of new tools from the tool rack or the storage area and prior to moving the sliding section of the tool changer.

25. The method of claim 23 further comprising:
detecting at least one of when a tool is in range of a gripper in one of the first set of grippers and the second set of grippers, a position of at least one of the sliding section or the rotating section, or a location of the crawler robot with a sensor system.

26. The method of claim 23, wherein a movement system moves at least one of the sliding section or the rotating section.

27. The method of claim 23, wherein a gripper in the first set of grippers has first features that engage second features in an old tool in the set of old tools.

28. The method of claim 23, wherein the sliding section slides in a first direction towards the crawler robot and slides in a second direction away from the crawler robot when the tool changer is positioned relative to the crawler robot.

* * * * *